US010828570B2

(12) United States Patent
Hardy et al.

(10) Patent No.: US 10,828,570 B2
(45) Date of Patent: Nov. 10, 2020

(54) SYSTEM AND METHOD FOR VISUALIZING SYNTHETIC OBJECTS WITHIN REAL-WORLD VIDEO CLIP

(71) Applicant: Nautilus, Inc., Vancouver, WA (US)

(72) Inventors: Marc Scott Hardy, Singapore (SG); Andrei Richard Frank, Toronto (CA)

(73) Assignee: Nautilus, Inc., Vancouver, WA (US)

( * ) Notice: Subject to any disclaimer, the term of this patent is extended or adjusted under 35 U.S.C. 154(b) by 0 days.

(21) Appl. No.: 15/451,100

(22) Filed: Mar. 6, 2017

(65) Prior Publication Data

US 2017/0173472 A1    Jun. 22, 2017

Related U.S. Application Data

(63) Continuation of application No. 14/343,378, filed as application No. PCT/IB2012/002195 on Sep. 10, 2012, now Pat. No. 9,586,141.

(Continued)

(51) Int. Cl.
*A63F 9/24* (2006.01)
*A63F 13/655* (2014.01)
(Continued)

(52) U.S. Cl.
CPC .......... *A63F 13/655* (2014.09); *A63F 13/213* (2014.09); *A63F 13/245* (2014.09);
(Continued)

(58) Field of Classification Search
CPC ......... A63F 13/655; A63F 13/53; A63F 13/35
See application file for complete search history.

(56) References Cited

U.S. PATENT DOCUMENTS 5,943,096 A   8/1999 Choo
6,111,582 A   8/2000 Jenkins
(Continued)

FOREIGN PATENT DOCUMENTS

CN   1957378 A   5/2007
EP   1006732 A2  6/2000
(Continued)

OTHER PUBLICATIONS

Breen, D. E., Whitaker, R. T., Rose, E. and Tuceryan, M. (1996), Interactive Occlusion and Automatic Object Placement for Augmented Reality. Computer Graphics Forum, 15: 11-22.*
(Continued)

*Primary Examiner* — Dmitry Suhol
*Assistant Examiner* — Carl V Larsen
(74) *Attorney, Agent, or Firm* — Perkins Coie LLP

(57) ABSTRACT

Embodiments of the present invention provide a system and a method for visualizing synthetic objects within a real-world video clip. The embodiments allow interactive, synthetic objects or characters to appear as if they are "embedded" inside or form part of a video clip. These objects move independently of the environment within the video clip and are controlled by a user. In one embodiment the video frames are set as textures in the furthermost layer in a 3D environment viewer or 3D "engine". In another embodiment separate layers of video frames are superimposed with the synthetic objects on an output screen and synchronizing the movements and the field of view settings to give the perception that only one camera is used.

20 Claims, 61 Drawing Sheets

Related U.S. Application Data

(60) Provisional application No. 61/532,422, filed on Sep. 8, 2011.

(51) Int. Cl.
*A63F 13/213* (2014.01)
*A63F 13/52* (2014.01)
*A63F 13/245* (2014.01)
*A63F 13/816* (2014.01)
*A63F 13/65* (2014.01)
*A63F 13/335* (2014.01)
*A63F 13/53* (2014.01)
*G06T 19/00* (2011.01)
*A63F 13/35* (2014.01)

(52) U.S. Cl.
CPC .......... *A63F 13/335* (2014.09); *A63F 13/35* (2014.09); *A63F 13/52* (2014.09); *A63F 13/53* (2014.09); *A63F 13/65* (2014.09); *A63F 13/816* (2014.09); *G06T 19/006* (2013.01); *A63F 2300/203* (2013.01); *A63F 2300/303* (2013.01); *A63F 2300/6009* (2013.01); *A63F 2300/66* (2013.01); *A63F 2300/6653* (2013.01); *A63F 2300/69* (2013.01); *A63F 2300/8005* (2013.01)

(56) References Cited

U.S. PATENT DOCUMENTS

| | | | |
|---|---|---|---|
| 6,130,911 A | 10/2000 | Lei | |
| 6,266,068 B1 | 7/2001 | Kang et al. | |
| 6,272,179 B1 | 8/2001 | Kadono | |
| 6,356,297 B1 | 3/2002 | Cheng et al. | |
| 6,442,203 B1 | 8/2002 | Demos | |
| 6,473,458 B1 | 10/2002 | Shimizu et al. | |
| 6,560,372 B1 | 5/2003 | Kadono | |
| 6,621,864 B1 | 9/2003 | Choo | |
| 6,811,617 B2 | 11/2004 | Elick et al. | |
| 6,985,126 B2 | 1/2006 | Hoppenbrouwers et al. | |
| 7,022,048 B1 * | 4/2006 | Fernandez | A63B 71/0622 482/51 |
| 7,555,043 B2 | 6/2009 | Sato et al. | |
| 7,676,081 B2 | 3/2010 | Blake et al. | |
| 7,978,770 B2 | 7/2011 | Luo et al. | |
| 8,064,523 B2 | 11/2011 | Togo | |
| 8,160,390 B1 | 4/2012 | Sandrew et al. | |
| 8,265,151 B1 | 9/2012 | Wang et al. | |
| 8,514,939 B2 | 8/2013 | Chen et al. | |
| 8,629,886 B2 | 1/2014 | Michail et al. | |
| 8,994,790 B2 * | 3/2015 | Ganapathi | G06K 9/00342 348/46 |
| 9,131,202 B1 | 9/2015 | Espeset et al. | |
| 9,153,073 B2 | 10/2015 | Langlotz et al. | |
| 9,317,962 B2 | 4/2016 | Morato et al. | |
| 9,566,517 B2 | 2/2017 | Hardy et al. | |
| 9,586,141 B2 | 3/2017 | Hardy et al. | |
| 9,659,596 B2 | 5/2017 | Espeset et al. | |
| 9,704,298 B2 | 7/2017 | Espeset et al. | |
| 2002/0158873 A1 | 10/2002 | Williamson et al. | |
| 2002/0164067 A1 | 11/2002 | Askey et al. | |
| 2002/0172288 A1 | 11/2002 | Kwon | |
| 2003/0091112 A1 | 5/2003 | Chen | |
| 2004/0062439 A1 | 4/2004 | Cahill et al. | |
| 2004/0077393 A1 * | 4/2004 | Kim | A63F 13/10 463/2 |
| 2004/0109023 A1 | 6/2004 | Tsuchiya et al. | |
| 2005/0013498 A1 | 1/2005 | Srinivasan et al. | |
| 2005/0140626 A1 | 6/2005 | Doyen et al. | |
| 2006/0073882 A1 | 4/2006 | Rozkin et al. | |
| 2006/0148546 A1 | 7/2006 | Inoue et al. | |
| 2006/0223635 A1 | 10/2006 | Rosenberg | |
| 2007/0060359 A1 | 3/2007 | Smith | |
| 2007/0076796 A1 | 4/2007 | Shi et al. | |
| 2007/0183499 A1 | 8/2007 | Kimata et al. | |
| 2007/0197285 A1 * | 8/2007 | Kamijo | A63F 13/10 463/31 |
| 2007/0248331 A1 | 10/2007 | Hamada et al. | |
| 2007/0260984 A1 | 11/2007 | Marks et al. | |
| 2007/0265087 A1 * | 11/2007 | Akahori | A63F 13/10 463/37 |
| 2008/0031512 A1 * | 2/2008 | Mundermann | G06K 9/00342 382/154 |
| 2008/0095519 A1 | 4/2008 | You et al. | |
| 2008/0097830 A1 | 4/2008 | Kim | |
| 2008/0102947 A1 | 5/2008 | Hays et al. | |
| 2008/0150965 A1 | 6/2008 | Bischoff et al. | |
| 2008/0246759 A1 | 10/2008 | Summers | |
| 2008/0253669 A1 | 10/2008 | Hamada et al. | |
| 2009/0027494 A1 | 1/2009 | Cavallaro et al. | |
| 2009/0129630 A1 | 5/2009 | Gloudemans et al. | |
| 2009/0141966 A1 | 6/2009 | Chen et al. | |
| 2009/0148058 A1 | 6/2009 | Dane et al. | |
| 2009/0221368 A1 | 9/2009 | Yen et al. | |
| 2009/0291761 A1 | 11/2009 | Hata et al. | |
| 2009/0295791 A1 * | 12/2009 | Aguera y Arcas | G06T 15/205 345/419 |
| 2010/0062840 A1 | 3/2010 | Herrmann et al. | |
| 2010/0105473 A1 | 4/2010 | Murphy | |
| 2010/0182340 A1 | 7/2010 | Bachelder et al. | |
| 2010/0208033 A1 | 8/2010 | Edge et al. | |
| 2010/0214422 A1 | 8/2010 | Iwamura et al. | |
| 2010/0271367 A1 | 10/2010 | Vaden et al. | |
| 2010/0277468 A1 | 11/2010 | Lefevre et al. | |
| 2010/0302247 A1 * | 12/2010 | Perez | G06K 9/00201 345/440 |
| 2011/0205226 A1 | 8/2011 | Gremse et al. | |
| 2011/0267344 A1 * | 11/2011 | Germann | G06K 9/00201 345/420 |
| 2011/0279475 A1 | 11/2011 | Ikenoue | |
| 2012/0044322 A1 | 2/2012 | Tian et al. | |
| 2012/0133735 A1 | 5/2012 | Boisson et al. | |
| 2012/0236029 A1 | 9/2012 | Newhouse et al. | |
| 2012/0288005 A1 | 11/2012 | Shishido et al. | |
| 2012/0315981 A1 | 12/2012 | Gagner | |
| 2013/0093787 A1 | 4/2013 | Fulks et al. | |
| 2013/0113827 A1 | 5/2013 | Forutanpour et al. | |
| 2013/0147798 A1 | 6/2013 | Karsch et al. | |
| 2013/0222369 A1 | 8/2013 | Huston et al. | |
| 2013/0250045 A1 | 9/2013 | Ki et al. | |
| 2013/0294514 A1 | 11/2013 | Rossato et al. | |
| 2014/0192155 A1 | 7/2014 | Choi et al. | |
| 2014/0228118 A1 | 8/2014 | Hardy et al. | |
| 2014/0240351 A1 | 8/2014 | Scavezze et al. | |
| 2014/0293028 A1 | 10/2014 | Nguyen et al. | |
| 2014/0306995 A1 | 10/2014 | Raheman et al. | |
| 2015/0050997 A1 | 2/2015 | Suzman et al. | |
| 2015/0105155 A1 | 4/2015 | Hardy et al. | |
| 2015/0170256 A1 | 6/2015 | Pettyjohn et al. | |
| 2015/0279103 A1 | 10/2015 | Naegle et al. | |
| 2016/0099022 A1 | 4/2016 | Espeset et al. | |
| 2016/0379415 A1 | 12/2016 | Espeset et al. | |
| 2017/0372523 A1 | 12/2017 | Espeset et al. | |
| 2018/0075878 A1 | 3/2018 | Espeset et al. | |

FOREIGN PATENT DOCUMENTS

| | | | |
|---|---|---|---|
| EP | 1235426 A2 | 8/2002 | |
| EP | 1835746 A2 | 9/2007 | |
| EP | 2317763 A1 | 5/2011 | |
| EP | 2754131 A2 | 7/2014 | |
| WO | 9705926 A1 | 2/1997 | |
| WO | 1997005926 A1 | 2/1997 | |
| WO | 9916012 A1 | 4/1999 | |
| WO | 2005061068 A1 | 7/2005 | |
| WO | 2007003340 A2 | 1/2007 | |
| WO | 2013034981 A2 | 3/2013 | |
| WO | 2015183194 A1 | 12/2015 | |
| WO | 2016209167 A1 | 12/2016 | |

(56) References Cited

OTHER PUBLICATIONS

Smart Navigation for Street View. Youtube.com. Online. May 29, 2009. Accessed via the Internet. Accessed Mar. 21, 2015. <URL: https ://www.youtube.com/watch 7v=yx7arHbQkKA>.*
Star Wars: Rebel Assault. Wikipedia.org. Online. Accessed via the Internet. Accessed Mar. 21, 2015. <URL: http://en.wikipedia.Org/wiki/Star_Wars:_Rebel_Assault>.*
Star Wars—Rebel Assault—Gameplay Part 1/4 . Youtube.com. Online. Nov. 27, 2007. Accessed via the Internet. Accessed Mar. 21, 2015. <URL: https://www.youtube.com/watch?v=359qyiXskCE>.*
Pagel et al. Online Visualization of Noisy 3D Point Clouds: From Monocular Image Sequences to Synthetic Views. 2010 IEEE Intelligent Vehicles Symposium. Jun. 21, 2010. (Year: 2010).*
Strohoff et al. Interactive Generation of Virtual Environments Using MUAVs. IEEE International Symposium on Virtual Reality Innovation. Mar. 19, 2011. (Year: 2011).*
Zhao et al. Alignment of Continuous Video onto 3D Point Clouds. IEEE Transactions of Pattern Analysis and Machine Intelligence, vol. 27, No. 8, Aug. 2005. (Year: 2005).*
International Preliminary Report on Patentability for International Application No. PCT/IB2012/002195, dated Mar. 12, 2014, 7 pgs.
International Search Report and Written Opinion for International Application No. PCT/IB2012/002195, Completed Mar. 22, 2013, dated Mar. 26, 2013, 11 pgs.
Extended European Search Report for European Application EP12830548.9, Report Completed Feb. 27, 2015, dated Mar. 6, 2015, 10 Pgs. 10 Pages.
"DirectShow video in ogre texture", www.ogre3d.org. Online. Oct. 18, 2010. Accessed via the Internet. Accessed Nov. 15, 2015. <URL:http://www.ogre3d.org/tikiwiki/DirectShow+video+in+ogre+texture>, 85 pages.
"Dots 2: What We Know so Far. gamereplays.org.", Online. Jul. 14, 2011. Accessed via the Internet. Accessed Nov. 15, 2015. <URL: http://www.gamereplays.org/dota2/portals.php?show=page&name=dota2-what-we-know-so-far>, 3 pages.
"Free 3d Matchmoving Preview", Youtube.com. Online. Aug. 18, 2010. Accessed via the Internet. Accessed Apr. 1, 2016. <URL:https://www.youtube.com/watch?v=NUqvQLREEds>, 2 pages.
"Smart Navigation for Street View.", Youtube.com. Online. May 29, 2009. Accessed via the Internet. Accessed Mar. 21, 2015. <URL: https://www.youtube.com/watch?v=yx7arHbQkKA>, May 29, 2009, 2 pages.
"Star Wars—Rebel Assault—Gameplay Part 1/4", Youtube.com. Online. Nov. 27, 2007. Accessed via the Internet. Accessed Mar. 21, 2015. <URL: https://www.youtube.com/watch?v=359qyiXskCE>, Nov. 27, 2007, 2 pages.
"Star Wars: Rebel Assault", Wikipedia.org. Online. Accessed via the Internet. Accessed Mar. 21, 2015. <URL:http://en.wikipedia.org/wiki/Star_Wars:_Rebei_Assault>, Mar. 21, 2015, 3 pages.
Anonymous, "Match moving—Wikipedia the free encyclopedia", XP055172728 Retrieved from the Internet: URL:http:jjen.wikipedia.orgjwjindex.php?title=Match moving&oldid=440719131 [retrieved on Feb. 27, 2015], Jul. 20, 2011, 8 Pages.
Bian, Christine et al., "Advanced Rendering and Compositing Tutorial", XP055172698, Retrieved from the Internet: URL:https:jjcourses.cs.washington.edujcoursesjcse459/08wijassignmentsjtdassignments jassignment2/ADVANCED RENDERING AND COMPOSTING TUTORIAL.htm [retrieved on Feb. 27, 2015], Jan. 17, 2008, 7 Pages.
Breen, David E. et al., "Interactive Occlusion and Automatic Object Placement for Augmented Reality", Computer Graphics Forum, 15, 1996, pp. 11-22.
Tromp, Hugo , "Free 3D Match moving Alternative for After Effects", cgi.tutsplus.com. Online. Aug. 12, 2010. Accessed via the Internet. Accessed Apr. 1, 2016. <URL: http://cgi.tutsplus.com/tutorials/free-3d-matchmoving-alternative-for-after-effects--ae-8510>, 19 pages.
International Preliminary Report on Patentability for International Application PCT/SG2016/050283, Report dated Dec. 26, 2017, dated Jan. 4, 2018, 13 Pgs.
International Search Report and Written Opinion for International Application No. PCT/SG2016/050283, Search completed Aug. 9, 2016, dated Oct. 13, 2016, 20 Pgs.
Anguelov et al., "Google Street View: Capturing the World at Street Level", IEEE Computer Society, vol. 43, Issue 6, Jun. 2010, pp. 32-38.
Cote et al., "Live Mobile Panoramic High Accuracy Augmented Reality for Engineering and Construction", Proceedings of the 13th International Conference on Construction Applications of Virtual Reality, Oct. 30-31, 2013, London, UK, 10 pages.
"Motion Blur Shaders", printed May 29, 2014, http://docs.autodesk.com/MENTALRAY/2014/ENU/mentalrayhelp/files/shaders/production/prod_motionblur.html, 16 pgs.
Adsumilli et al., "A Robust Error Concealment Technique Using Data Hiding for Image and Video Transmission over Lossy Channels", IEEE Transactions on Circuits and Systems for Video Technology, 2005, vol. 15, No. 11, 13 pgs.
Chen, Yen-Kuang et al., "Frame-Rate Up-Conversion Using Transmitted True Motion Vectors", Multimedia Signal Processing, 1998 IEEE Second Workshop On Redondo Beach, CA, USA Dec. 7-9, 1998, Piscataway, NJ, USA, pp. 622-627.
Gilvarry, "Extraction of Motion Vectors from an MPEG Stream", Technical Report 1999, Dublin City University, 1999, pp. 1-35.
Huang et al., "Motion Vector Processing Using the Color Information", IEEE, ICIP 2009, pp. 1605-1608.
International Preliminary Report on Patentability for International Application No. PCT/SG2014/000458, dated Dec. 6, 2016, dated Dec. 15, 2016, 9 pgs.
International Search Report and Written Opinion for International Application No. PCT/SG2014/000458, search completed Jan. 16, 2015, dated Jan. 22, 2015, 13 Pgs.
Schoeffmann, Klaus et al., "Visualization of Video Motion in Context of Video Browsing", Multimedia and Expo, 2009. ICME 2009. IEEE International Conference On, IEEE, Piscataway, NJ, USA, Jun. 28, 2009, pp. 658-661.
Vatolin et al., "VirtualDub MSA Motion Estimation Filter", printed May 29, 2014, http://www.compression.ru/video/motionestimation/indexen.html, 7 pgs.

* cited by examiner

SYSTEM AND METHOD FOR VISUALIZING SYNTHETIC OBJECTS WITHIN REAL-WORLD VIDEO CLIP

CROSS REFERENCE TO RELATED APPLICATIONS

This application is continuation application of U.S. patent application Ser. No. 14/343,378 entitled "System and Method for Visualizing Synthetic Objects Within Real-World Video Clip" to Hardy et al., filed Mar. 6, 2014, which application is a 371 filing of PCT Application PCT/162012/002195 filed Sep. 10, 2012, which claims priority to U.S. Provisional application "Fitness Equipment Sensors," filed on Sep. 8, 2011, Ser. No. 61/532,422, which are hereby incorporated by reference in their entirety.

TECHNICAL FIELD

The present application generally relates to video games and computer simulation software and in particular to system and method for merging objects into a real-world video clip.

BACKGROUND ART

Presently "3D" landscapes or environments developed for use in video games, technical or educational simulations can be visually stimulating and entertaining but in a large number of cases have not yet achieved fully life-like, photorealistic representations of the real world. Therefore, for most users and in most uses of these types of applications, while an "immersive" impression is the desired effect, this immersive effect is not achieved because the visual representations of the real world environments are not convincing enough.

One solution may be to use real world video as the backgrounds to these games or technical simulations but in cases where the games or simulations require "players" or other moving objects to appear on the screen and for these to move independently of the video there is a need for a system that allows both external, independent video game-like control of these "players" or objects and the ability to overlay these objects onto the video and to make them appear to be moving correctly within the same environment as is depicted in the video.

Further, the time/cost of production for a 3D representation of a real world environment is relatively high compared to making a video of the same environment. Video game development is a relatively expensive undertaking. Many current games with high production value that are intended for wide market acceptance may have development budgets in the tens and even hundreds of millions of dollars and time frames of 1-4 years to completion. A substantial portion of these development resources are allocated to designing and building the 3D environments that are the backgrounds to the games or simulations.

Alternatively, recording video of a real world location is in most cases a relatively less expensive and faster development process. One solution may be to use recorded video as the background for games and simulations where there is a limited requirement for the degree to which the user can control the viewing angles of the background environment. For example, in commonly called "rail" games or simulations, there is normally no requirements for the user to turn around (panning) and looking up and down (tilt) at the background environment. In these situations using a simple video recording or sets of video recordings with movement in only one direction could be an acceptable method of portraying the background environment.

In many video games and in some cases technical simulations require representations of game characters and other actors to be viewed onscreen. In the film and television industry, these characters and special effects are added or overlaid to the video in what is called the "post production" or VFX process but the result is a new and non-interactive visual representation in which these additions are permanent and can only be viewed in the same way each time the video is played. However, this process cannot be used in the video games or simulations where the requirement is that the characters or special effects are controlled by the user and act differently each time the game or simulation is played.

Accordingly, there is a need for means that can provide the background environment through a real world video and further provide an ability to include actors or characters and special effects which act independently of the movement of the video.

Existing software applications in the fitness and health sectors have been limited in the way they leverage new technologies such as the internet, 3D video games and relatively modern methods of distributing entertainment content. Most entertainment sources available during fitness activities, both indoor and outdoor, are limited to listening to music and watching broadcast TV or video. In a few cases there have been attempts at incorporating video game elements and internet information, but to date these attempts have not been executed in a way to garner mass market acceptance.

Accordingly, there is a need to effectively incorporate entertainment sources such as video games and internet information in a fashion that enhances the fitness activity, motivates users to exercise more and more effectively, and indeed makes the fitness activity more fun.

Further, technologies such as Social Networking, video games, live online multiplayer gaming, and performance data analysis and sharing have proven to be very popular with the general public. Accordingly, there is a need for means by which these technologies are adapted to suit certain fitness activities, in particular exercise on indoor cardio equipment such as the treadmill, elliptical, cycle, rower among others.

DISCLOSURE OF THE EMBODIMENTS

Embodiments of the present invention provide a method of visualizing synthetic objects within a real-world video clip. The method includes extracting information from at least a portion of the real-world video clip. The extracted information may be processed to form a transparent 3D scene reflecting entire route travelled by a camera in the real-world video clip. The method may further include building into the transparent 3D scene at least one of one or more objects and features from the real-world video clip based on the extracted information. The built objects and features may be at least one of static and dynamic based on the real-world video clip. Further, the method includes visualizing, in a 3D player, the built transparent 3D scene and dynamic objects overlaid on a background layer of the real-world video clip. Furthermore, the method adds in the 3D player additional synthetic objects (static or dynamic) within a transparent 3D scene representation of the features in the real-world video clip. The transparent 3D scene representation may be based on the visualization of the built transparent 3D scene. Additionally, the method includes using a 3D transparent layer as an "occlusion" layer. An object or part of the occlusion layer, appeared behind a transparent object, may be occluded and occupying a place with the real-world video clip. The extracted information (from the real-world video clip) may be applied to a camera of the 3D player. Moreover, the method includes controlling the movement of the synthetic objects independent from the movement of the video clip.

Further, embodiments of the present invention provide a system for rendering a visual game or simulation of one or more activities. The system may include a memory, a processor, and a display screen. The memory includes one or more instructions, executable by the processor, to facilitate a plurality of users to select individually at least one of a plurality of real-world video files for visualization. The instructions further provide a background scene in a 3D environment to each user based on the corresponding selected at least one of the plurality of real-world video file. The background scene may include one or more objects corresponding to the selected real-world video file. Further, the instructions may provide on-screen visual representation to each user as an avatar in the 3D environment corresponding to the selected real-world video file. Furthermore, the instructions (executable by the processor) display real-time movement of the user in the 3D environment through the selected avatar based on one or more activities performed by the user. The one or more activities correspond to at least one of playing the visual game and exercising.

Herein above, interactive synthetic objects or characters may be allowed to appear as if they are "embedded" inside or form part of a video or movie clip however these objects move independently of the landscape or environment within the video clip and are controlled by a user or other directions. In one embodiment of the invention the effect is achieved by setting the video frames as textures in the furthermost layer in a 3D environment viewer or 3D "engine" and controlling the separate and independent movement of the objects by an input device and assigning the 3D movement and Field of View settings of the video camera to the 3D application camera to give the perception that only one camera is used. In another embodiment this is achieved by superimposing separate layers of video frames and the synthetic objects or characters on an output screen and syncing the movements and Field of View of the 3D environment camera to the video camera to give the perception that only one camera is used.

The resulting effect is that the 3D or synthetic objects appear to be moving within the video landscape, but independent of the movement of the video. For example, in one embodiment the video may have been recorded from a moving vehicle driving forward at a speed of 10 km/hr on a street. An object or character could appear to run in front of the vehicle and camera, stop a certain distance in the front, turn around, act out a scene, then run backwards out of sight around the corner. The 3D object can be controlled independently by a user of the "game" or application and the 3D interaction and representation can be different every time the same section of video is viewed.

In one embodiment of the invention the technology may be used as a fitness entertainment game or simulation. Movement of the users during the exercise activity may be walking, running or rowing using a treadmill, indoor cycle, elliptical, rower or other equipment. The movement is transmitted to the application using a sensor that tracks the activity on the machine. The user's activity may also be a regular outdoor movement. In this case sensors on the body of the user track the movement type and intensity.

An alternative embodiment might be a car racing game where the back ground environment progresses along a rail track so cars can move from side to side with the track but the background environment only progresses backwards or forwards (including zoom effect).

In another embodiment, when a function is used that allows changing of the background videos as a user turns, an entire virtual world for gaming or simulations can be built where the background is moving video, not images or textured 3D objects.

In one embodiment of the invention users or players can interact in the same screen environment and see each others' movements and actions, through the onscreen representation of avatars or other characters. In this case the users would be connected to each other on the internet, on an intranet or other network.

In one embodiment of the invention information about users' performance or game play or interaction with other users is tracked, stored, analyzed and shared with other users within the application and also non-users using social networks such as Facebook, Twitter, LinkedIn among many others and also game user interfaces and external websites.

Further, in an embodiment of the invention, the video and 3D characters may move independently of each other but may be viewed overlaid on the same screen.

According to another embodiment of the invention, the 3D characters move according to rules that guide onscreen location coordinates that allow them to appear that they are moving in the environment depicted in the video.

In the preferred embodiment of the invention, these rules are directed by a transparent, 3D replica of the key aspects of the environment depicted in the video (Occlusion Layer).

Further, according to an embodiment of the invention, when the video camera changes viewing angles (for example pans or tilts) the same viewing angle changes are applied to the 3D characters.

In the preferred embodiment of the invention there is a software application which comprises a media player that can render the video frames, the 3D independent moving characters and the transparent 3D Occlusion Layer on one screen as separate and overlaid layers.

In one embodiment of the invention the technology is used as a fitness entertainment game or simulation where the exercise activity movement of the user is used as the input control to the game.

In one embodiment of the invention users or players can interact in the same screen environment and see each others' movements and actions, through the onscreen representation of avatars or other characters. Users can also interact with each other using voice over internet technology or various functions built into the application.

In one embodiment of the invention information about users' performance or game play is tracked, stored, analyzed and shared with other users within the application and also non-users using social networks.

One embodiment of the invention may be used as a game, simulation or entertainment application where simple continuous forward movement is required. One example of this would be a fitness related application, where the forward movement is controlled by the user's walking, jogging, running, cycling or rowing movements through sensors or other input devices. An alternative might be a car racing game where the back ground environment progresses along a rail track so cars can move from side to side with the track but the background environment only progresses backwards or forwards (including zoom effect).

A further function facilitated by the present invention may allow players or participants to see each other's actions and movements when they are connected through the internet, an intranet or other network. Further interaction may be communication within the application including voice, video and other signals.

Another function may be that the application will store information about the performance of users which can be analyzed, shared through networks including commonly called "social networks" such as Facebook, Twitter, LinkedIn, shared within the application and on external websites both real-time as the game or simulation is ongoing and after the game or simulations have ended.

BRIEF DESCRIPTION OF THE DRAWINGS

Like reference numerals refer to corresponding parts throughout the drawings.

MODES FOR CARRYING OUT THE INVENTION AND INDUSTRIAL APPLICABILITY

Figure 1:
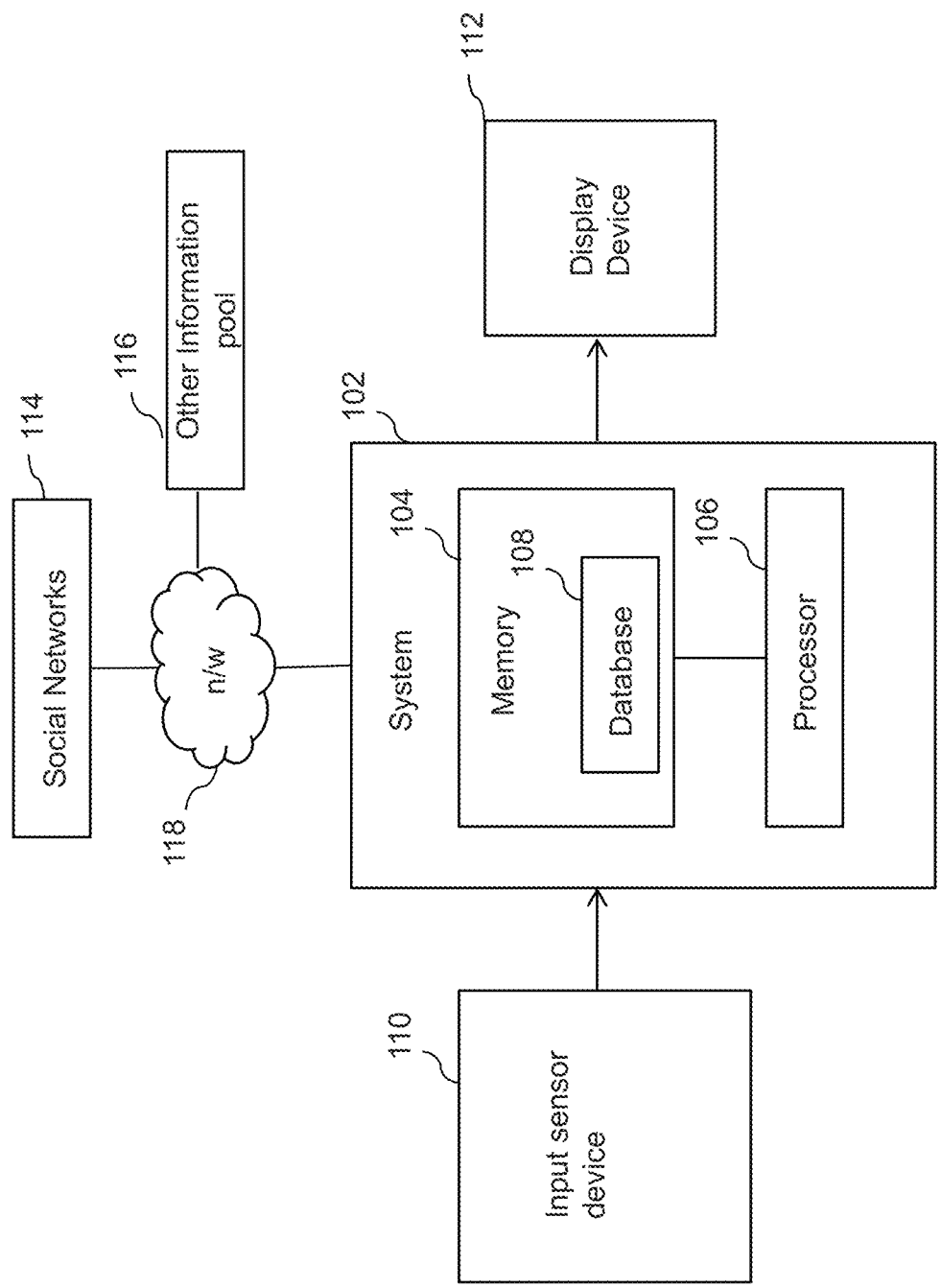
FIG. 1 depicts an exemplary block diagram of a system for visualizing synthetic objects within a real-world video clip, in accordance with one embodiment of the present disclosure.

Illustrative embodiments of the invention now will be described more fully henceforth with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

For the purposes of descriptions of various embodiments, the term "3D" is used in referring to common video gaming objects or software, which can be viewed from multiple angles or aspects, not necessarily the stereoscopic visual method (e.g. using 3D glasses) of displaying separate video feeds to give the impression of depth. Therefore 3D development software may refer to software such as, but is not limited to, Autodesk Maya, Autodesk 3DsMax, Cinema 4D and others. 3D objects or 3D scene would refer to objects created in such types of software packages.

As summarized above, the present invention is directed to video games and computer simulations that may use one or more real world videos in building the background to other interactive moving or static characters which are intended to appear as if they exist, appear or move within the environment depicted in the video. In the case of the invention, the 3D effects are designed to create an interactive real-time gaming environment that may enable a user to see 3D or synthetic and gaming and other (HTML, flash, etc.) events that may happen within the real world video in real time.

In one embodiment of the present disclosure the core application is the interactive 3D-enabled media player/viewer that incorporates a gaming engine. The viewer application may allow interactive 3D objects to appear as if they are "embedded" into but move independently of a landscape or environment within a video clip that in turn may adapt to the users activity.

A screen placed in front of machines along with some form of processor may host a software application with video games that may be triggered by the user's exercise motions, and one that interacts with other users live during the game or simulation, shares (sends and receives) information across social networks and online. The application may also store and analyze data about the users' performance and provide a graphical representation of the user's performance for motivating the user. Further, the user may be facilitated to post their performance's representation on social networks such as Facebook, LinkedIn, Twitter and the like.

In one embodiment, video frames may be shown to the user as the furthermost layer in the 3D environment. Individual frames, when called, are read from disk, decompressed into memory, sent to the 3D video Card memory, and then drawn on the screen as textures on an object that may be the back layer of the 3D environment. The timing that may direct this process may be customized to allow for a more realistic and ultra-smooth video playback experience. On multi-core hardware systems, each video frame may also is rendered in separate sections in each core, enabling the system to achieve extremely efficient performance rates (e.g. 60 fps HD video) with an additional and separate full layer of 3D gaming objects and online live multiplayer connection.

Movement through the video frames may be managed through an input speed from an external controller that may be transformed by an algorithm into a sequence that decides which frames are rendered onscreen and which are skipped to give the effect of changing speed. Smoothening factors may be applied to compensate for the extreme accuracy of an input sensor device. Video frame interpolation may be used for increased accuracy when the existing base of frames per second is not enough to maintain a realistic flow of frames.

Generally, video clip files come with an accompanying stereo sound track of the environmental sound taken at the time of recording of the location or developed separately. The viewer application processes the sound so it does not change pitch with changes in the speed of the video (i.e. the sound of the motorbike that is passing the runner will always sound like a motorbike). In addition the application may support plugging in a user's own music (from any player like an iPod) which may be blended (if the user chooses) with the environment sound (of the video clip) giving the same feeling as moving through the location where you would hear the passing car even when wearing headphones.

Referring now to FIG. 1 that depicts an exemplary block diagram of a system for visualizing synthetic objects within a real-world video clip, in accordance with one embodiment of the present disclosure. As shown, a system 102 may include, but is not limited to, a memory 104 and a processor 106 coupled to the memory 104. The memory 104 may include one or more instructions that may be executed by the processor 106 to visualize synthetic objects within a real-world video clip. In an embodiment, the instructions (stored in the memory 104) may enable a user to utilize a system to render a visual game or simulation of one or more activities performed by the user.

The memory 104 may further include a database 108 to store one or more instructions and information corresponding to the user. The information corresponding to the user may include, but is not limited to, personal information, activities information, and one or more video files and other information, such as rules, for visualization of synthetic objects. The database 108 and corresponding information will be explained further in this disclosure.

In an embodiment, the system 102 may be utilized with other devices as an individual application. For example, as shown, the system 102 may be connected to an external device, such as an input sensor device 110 that may utilize the system 102 to implement the functionality of rendering game or simulation of one or more activities that may be performed by the user on such input sensor device 110. In an embodiment, the input sensor device 110 may include, but is not limited to, a fitness machine such as treadmill, a rower, a cycle and the like.

The input sensor device 110 may have one or more sensors to determine activities of the user. For example, the input sensor device 110 such as a treadmill may measure various characteristics corresponding to activities/movements performed by the user. These characteristics may be provided as an input to the system 102. The input (information corresponding to user's activities) may be utilized by the system 102 in rendering visual games or simulation of one or more activities within a real-world video clip (explained further). Further, the system 102 may provide a real-world video clip with controllable synthetic objects embedded therein as an output to an external display device 112.

In another embodiment, the system 102 may be a computer system that may be implemented to provide the functionality of visualizing synthetic objects within a real-world video clip. For example, the system 102 may by a device for rendering visual game or simulation of one or more activities of a user utilizing the system 102. In this embodiment, the system 102 may be implemented in any suitable hardware component that may have one or more sensors to sense the user's activities (without requiring any additional device) to provide dynamism to synthetic objects that may be embedded in the real-world video clip. The device (that implements the system 102) may have an inbuilt display device to provide real-world video clip with synthetic objects that may be controlled independently based on the movements of the user utilizing the device. Here in this embodiment, the display device 112 may be considered inside the system 102.

Further, the system 102 may be connected to one or more social networks 114 and other online information pool 116 through a communication network 118. The network 118 may be wireless network such as the internet or other wide area network. The system 102 may tag the user with his/her information and provide information to the user corresponding to the performance of the user in performing the activities (exercising, playing games and the like). The system 102 may enable the user to post the activities, performance status on the social networks 114 or on other information pool 116 (such as blogs, websites and the like) through the network 118. Further, the user may receive replies from other users in response to the posting done by the user on the social network 114.

In an embodiment, the system 102 may be connected to other devices for enabling the user to interact with other users using the other devices. For example, a user may connect and compete with other users (performing fitness activities or playing a common game) using other devices (exercise machine or gaming system) locally or word wide. This may enhance motivation among the users to perform fitness activities and yet remain entertained by interacting with the other users.

The memory 104 may include instructions that may be executable by the processor 106 to render a visual game or simulation of one or more activities. The instructions may be a part of various software modules (not shown) that may be implemented by the system 102 to carry out particular functionalities. The system 102 may select a real-world video file that may be a recorded file of the real world location for visualization. The instructions may enable the user to select one or more real-world video files that may be provided as options to the user. In an embodiment, the real world video files may be stored in the memory 104 of the system 102. Alternatively, the user may be allowed to select an external recorded video file that may be stored in a personal file or folder of the user in the system 102.

In an embodiment, the video file may be recorded moving through an environment at constant or varying speeds to cover locations to be used in a video game or simulation. Further, the video file may cover significant distances. Furthermore, length of the video file may be from a few seconds to a few hours. In an embodiment, the length of the video file, and the location covered within it, may be determined by users of the video game or technical simulation.

Further, in an embodiment, the video file may be a compilation of several locations that may be used in the video game or simulation. The video file may also contain different and multiple views of the same location that may allow users or players of the game or simulation, options during game play to choose different routes.

The system 102 may utilize an extraction module (not shown) having instructions that may be executable by the processor for extracting camera information from the real-world video file (hereinafter referred to as 'video file'). The camera information may include camera movement coordinates information, path coordinates information from the video file, and point cloud coordinates information for each frame of the video file. The camera movement coordinates information may include movement of a video camera at each frame relative to static points shown in video images. Further, the point cloud coordinates information may include depth of objects (or distance from lens of the camera) shown in the video file. The camera information may be stored in the memory 104 and may be translated into 3D coordinates. In an embodiment, the stored information may be merged to form a background scene in a 3D environment.

Further, the system 102 may add an occlusion layer in the 3D environment that may include a transparent 3D replica of key objects depicted in the video file. The transparent 3D replica of static features or additional static features may be built, and further existing features from the video file may be refined. In an embodiment of the invention, 3D space locations of objects depicted in the video may be automatically generated based on the point cloud information, and the occlusion layer may be automatically generated either from the 3D space locations of the objects (depicted in the video file) or from the point cloud information.

The transparent occlusion layer may be used by the system 102 to hide any object that may appear behind the transparent occlusion layer (or transparent object). The occlusion layer is explained in detail further in conjunction with FIG. 33. The transparent 3D representation of occlusion layer and moving objects may be visualized in a 3D player or other viewer application. The transparent 3D scene may be provided to the user for providing further facilities to the user. The transparent 3D scene may be referred to as a background scene in 3D environment that may be provided to the user for further modifications therein. For example, the system 102 may allow the user to modify the transparent 3D layer further by embedding objects (static or dynamic) therein.

The user may be facilitated to select an avatar or embed a character/avatar for representation of the user in the 3D environment (background scene/transparent 3D environment) that provides a 3D view of the real-world video file (selected earlier by the user). The system 102 may provide one screen visual representation of the user as the avatar in the 3D environment (created based on the video file(s) selected by the user).

In one embodiment of the invention, the system 102 may include a viewer module (not shown) having instructions that may process the selected video file(s), camera movement and rotation information, 3D "occlusion" static and moving objects, relative movement and rotation paths and any other 3D objects, characters (such as the user's avatar) or assets. In an embodiment, the viewer module (having viewer application) may be a custom software application.

In another embodiment, the viewer application may be an appropriate video "game engine" or software that may allow viewing of 3D objects and the programming of rules of a game, simulation or other activity. Further, in yet another embodiment of the invention, a standard 3D development application may be used. Examples of these applications include, but are not limited to, Autodesk Maya, Autodesk 3DSMax and Cinema 4D.

The video file and 3D objects may be rendered as separate layers that may be managed independently. The video file may include transparent 3D layer without having 3D objects like avatars. The different 3D objects may be shown in their correct relative location in 3D space by the viewer module. In an embodiment of the invention, the 3D objects may be rendered on a top layer and a video frame may be rendered on furthermost layer of the space. The transparent 3D objects and the moving objects may be visualized overlaid on a background layer of the video file.

The system 102 may execute instructions to display real-time movement of the user in the 3D environment through the selected avatar based on one or more activities performed (by the user) corresponding to at least one of playing the visual game and exercising. For example, the user may be shown, as an avatar, on a 3D environment (of the video file) showing a 3D landscape having objects embedded therein. The user's avatar may be functioning independently of the 3D environment of the video file.

It may be appreciated by a person skilled in the art that even though the user's avatar may be working independently of the environment's objects, the activities (such as running) may be represented in synched with the 3D environmental objects of the video file. In one embodiment, the 3D space camera movements may be synched to match the movements of correct frames from the video clip. The video file and the 3D objects may be rendered on screen in separate but synched layers, in the 3D environment. For example, if it is represented that initially the user's avatar is moving straight on a road (corresponding to the video file) and then, based on traffic of the vehicles or presence of any object (on the way of the user's avatar) in the 3D environment (background scene), the direction of the user's avatar may be changed accordingly so as to avoid hitting with any of the other objects of the 3D environment.

Additionally, the system 102 may provide an HTML browser layer that may be displayed on the display screen of the display device 112. This layer may enable placement of objects containing advertisements, images, video files in a way to give appearance that these objects exist in the environment of the video file. Further, the system 102 may provide many additional features that are explained further in conjunction with description of further FIGS. 4-32.

Figure 2:
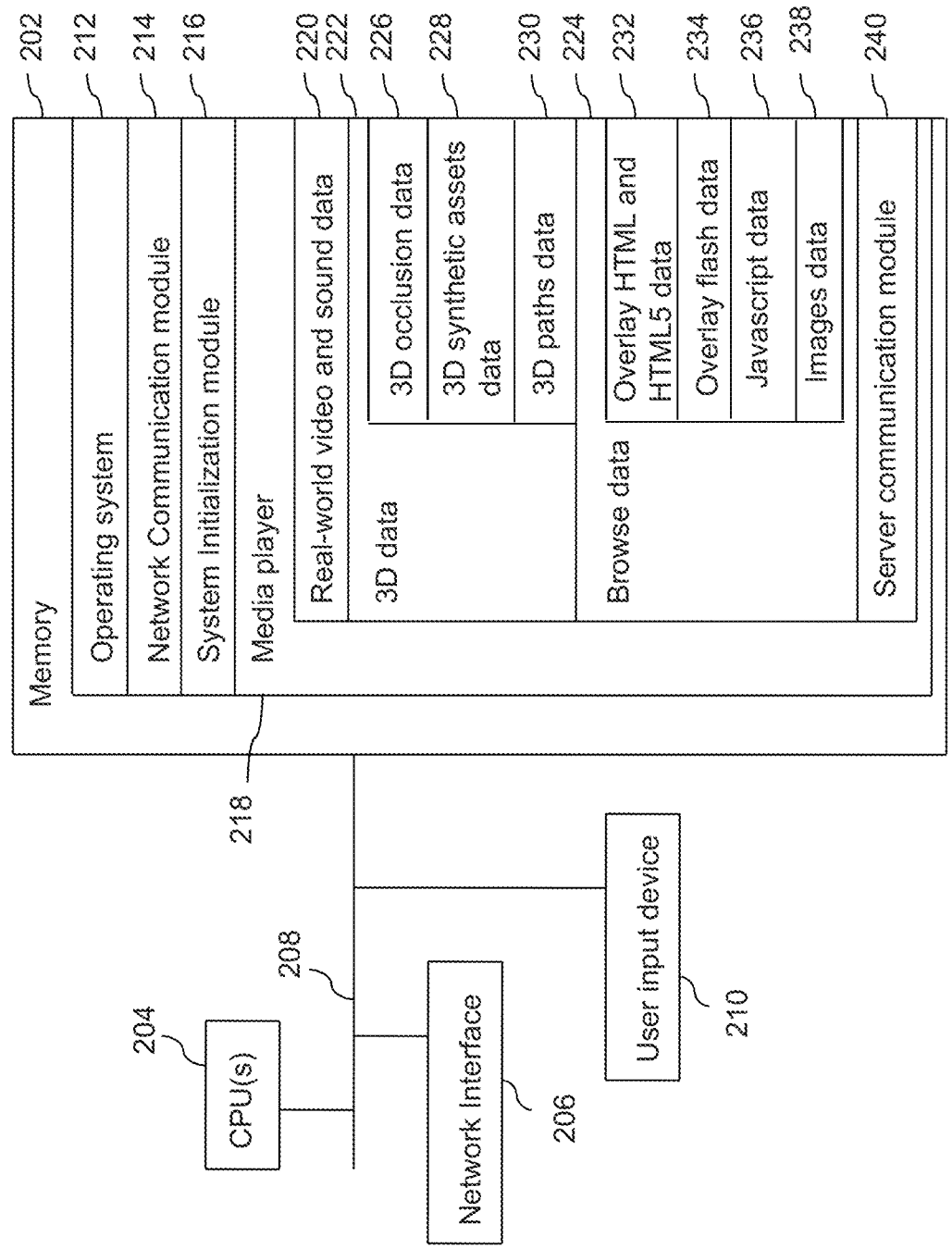
FIG. 2 depicts an exemplary block diagram of a system, in accordance with another embodiment of the present disclosure.

Referring now to FIG. 2 depicting an exemplary block diagram of a system, in accordance with another embodiment of the present disclosure. In an embodiment, the system may be implemented in a client computer. As shown, the client computer may include various components, such as, but are not limited to, a memory 202, one or more processing units (CPU's) 204, one or more network or other communications interfaces 206 and one or more communication buses 208. The communication buses 208 may be used for interconnecting the components of the client computer. The communication buses 208 may include circuitry (may interchangeably be referred to as 'chipse') that may interconnect and control communications between the components.

Further, the client computer may include one or more user input device(s) 210, such as, but not limited to, a display, a keyboard, and other possible interfaces such as a remote control, a USB wireless receiver or a remote sensor. The memory 202 may include, but is not limited to, high speed random access memory and may also include non-volatile memory, such as one or more magnetic disk storage devices. In some embodiments, memory 202 may store one or more programs, modules and data structures, or a subset or superset thereof. The program and modules of the memory 202 may include, but are not limited to, an operating system 212, a network communication module 214, a system initialization module 216, and a media player 218.

The operating system 212 may include procedures for handling various basic system services and for performing hardware dependent tasks. The network communication module 214 may be used for connecting the client computer to other devices (such as personal computers, laptops, smartphones, and the like) via one or more communication networks (wired or wireless), such as the Internet, other wide area networks, local area networks, metropolitan area networks, and so on. Further, a system initialization module 216 may initialize other modules and data structures stored in the memory 202 and required for the appropriate operation of the client computer.

Further, the media player 218 may include, but is not limited to, a real world video and sound data 220, 3D data 222 (or 3D environment viewer and data 222), and browser data 224. The real world video and sound data 220 may be accessed by the media player 218. The 3D data 222 may include 3D transparent occlusion data and files 226 for the landscape environment and moving objects corresponding to the real-world video data 220. Further, the 3D data 222 may include 3D synthetic assets data files 228 that may include avatars or characters representing users or participants within the environment or other additional synthetic objects to be used within the game or simulation. Furthermore, the 3D data 222 may include 3D paths data 2 that may be used to guide the moving synthetic objects within the environment and to help enable the avoidance system.

Further, the browser data 224 may include an Overlay HTML and HTML5 data 232, an Overlay Flash data 234 a Javascript data 236, and an image data 238. The Overlay HTML and HTML5 data 232 may be utilized by the system including menu, mapping, advertising, scoring, etc. Further, the Overlay Flash data 234 may be for systems including systems including menu, mapping, advertising, scoring, etc. The Javascript data 236 may be utilized for communication and control between the browser layer 224 and the media player 218. Further, Images data 238 may be utilized for the HTML and Flash systems.

Additionally, a Server Communication Module 240 may allow access to the media player 218 through the Network Communication Module 214 by a centralized server and software enabling connection between multiple players or users and their respective client computers.

The client computer, as described above, may implement a system, such as the system 202, to visualize synthetic objects within a real-world video clip. The system may enable a user of the client computer to control movements of synthetic objects independently from the movement of the video clip.

Figure 3A:
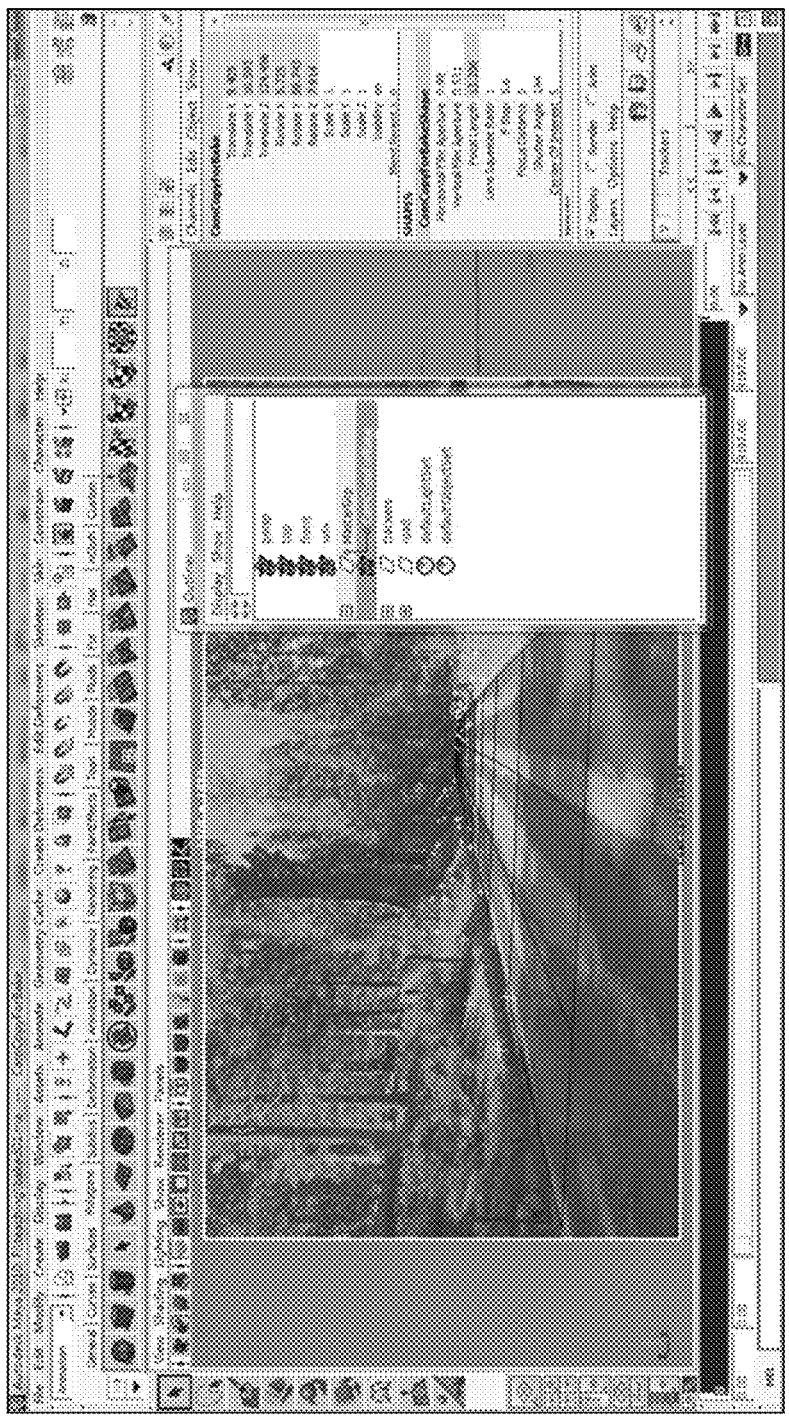
FIGS. 3A to 3Z depict an exemplary process to merge smaller sections of video data (camera and point cloud) into a single longer section in accordance with an embodiment of the present disclosure.
Figure 3B:
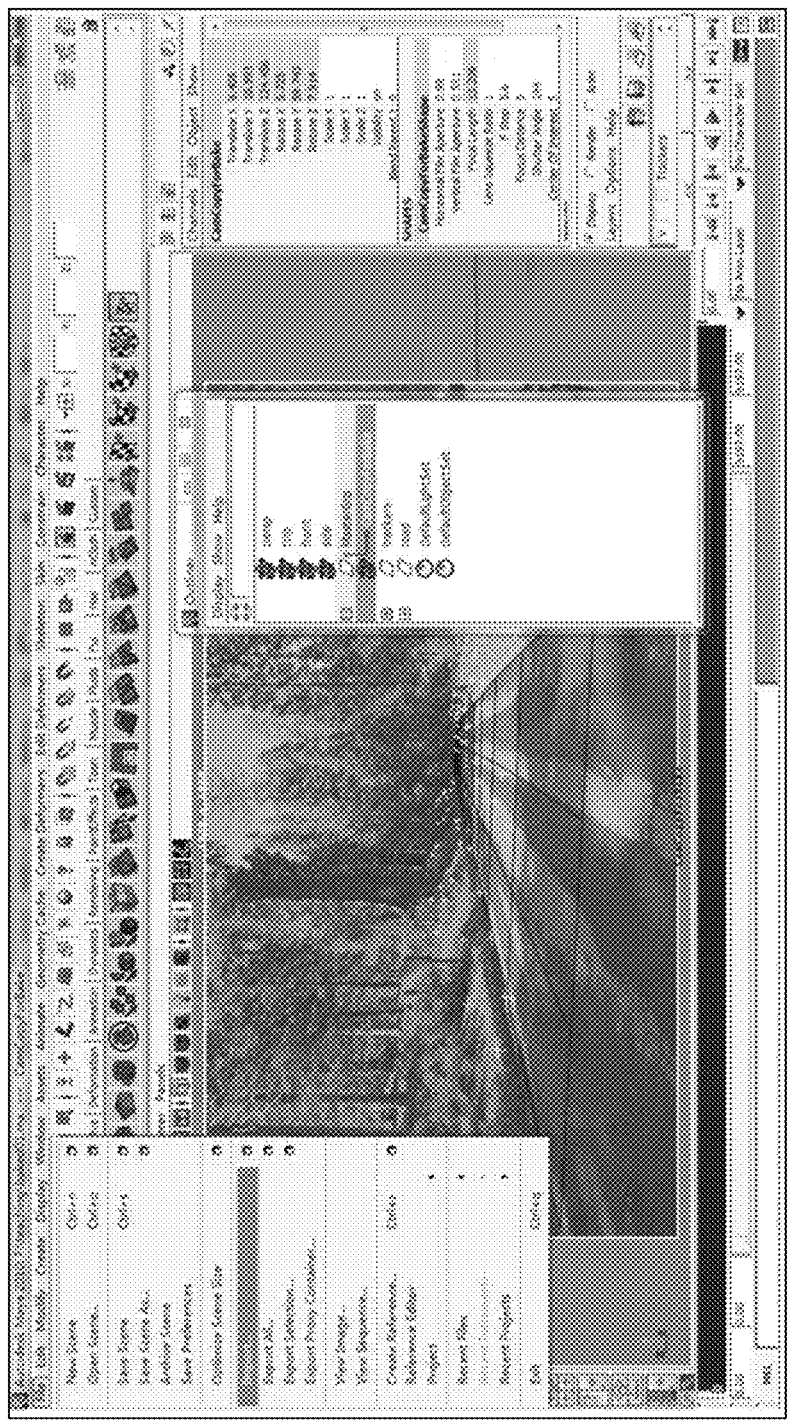
Figure 3C:
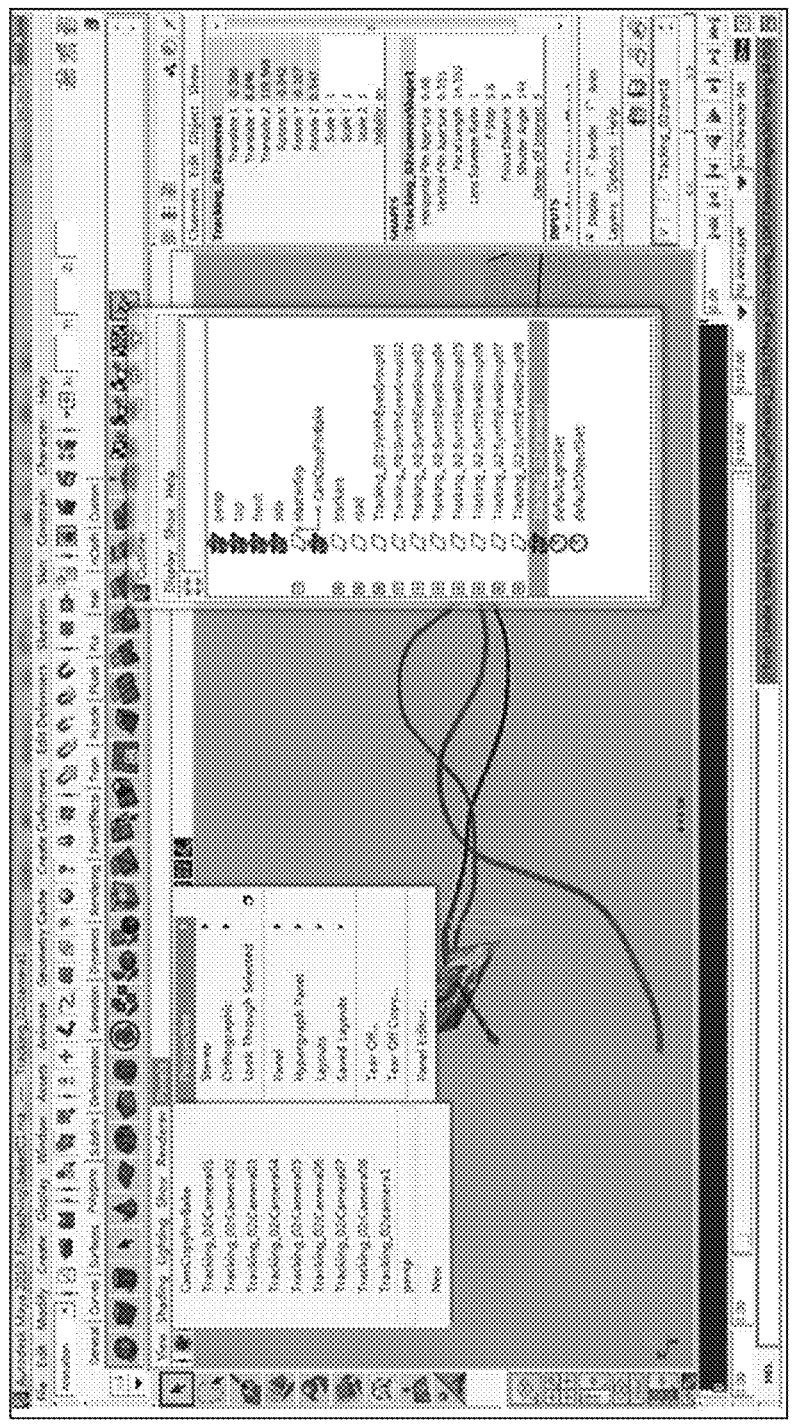
Figure 3D:
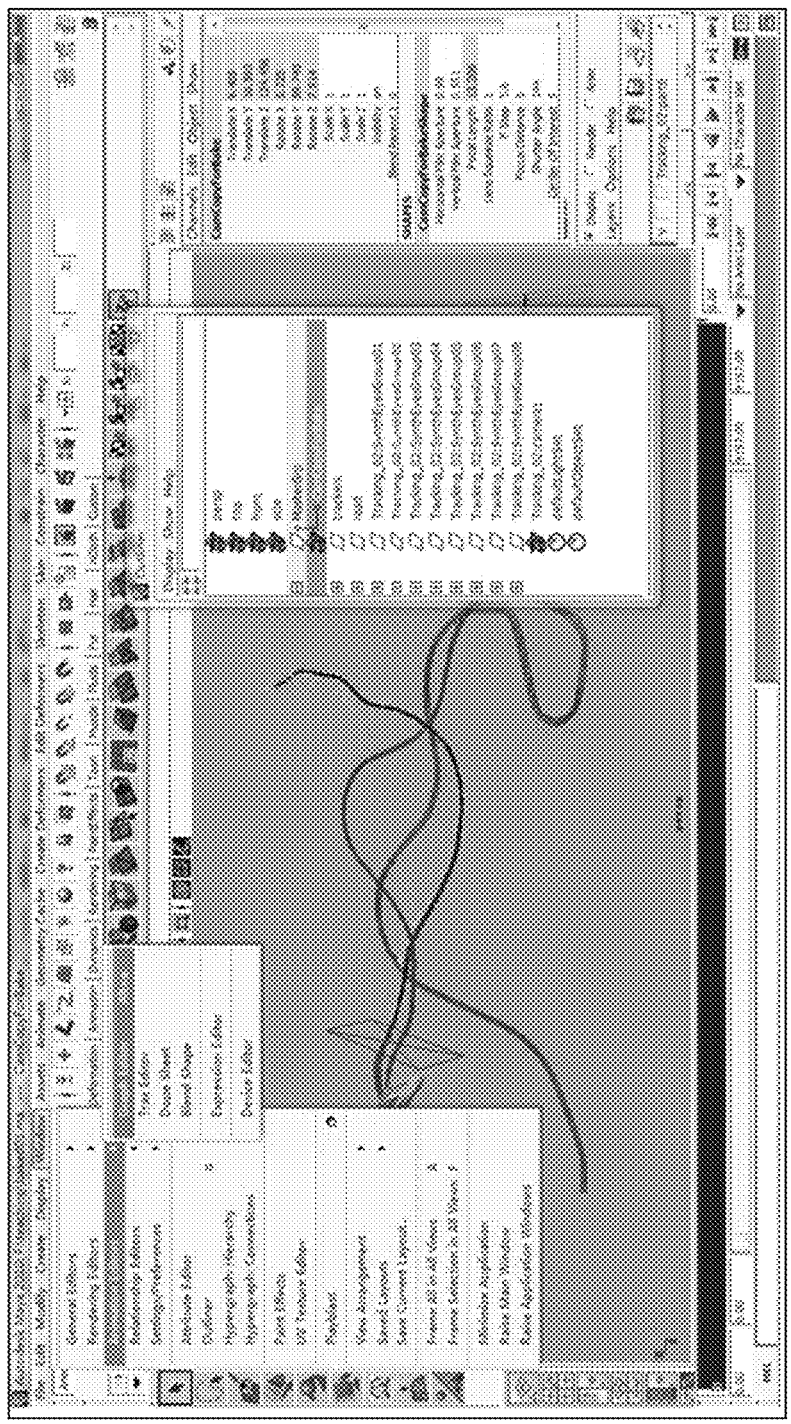
Figure 3E:
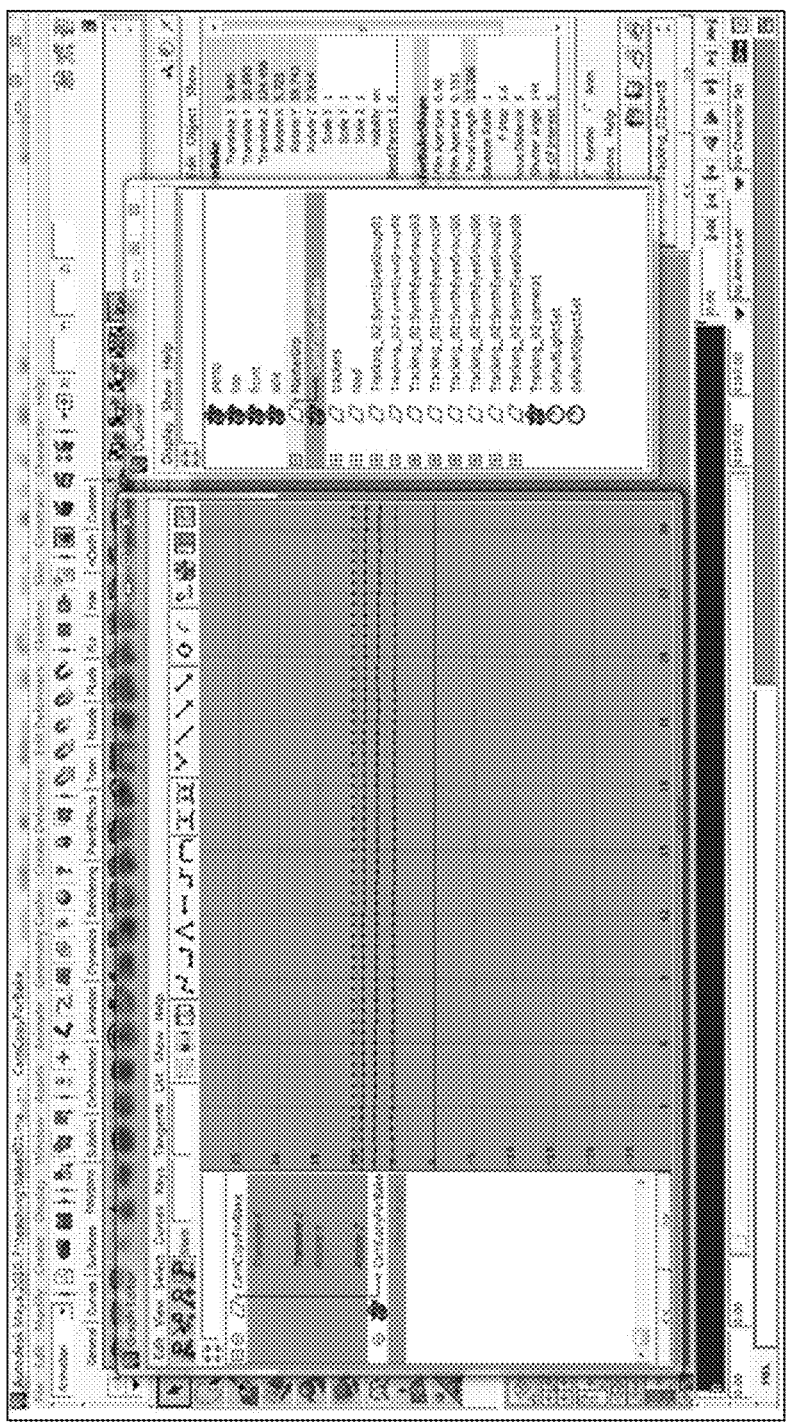
Figure 3F:
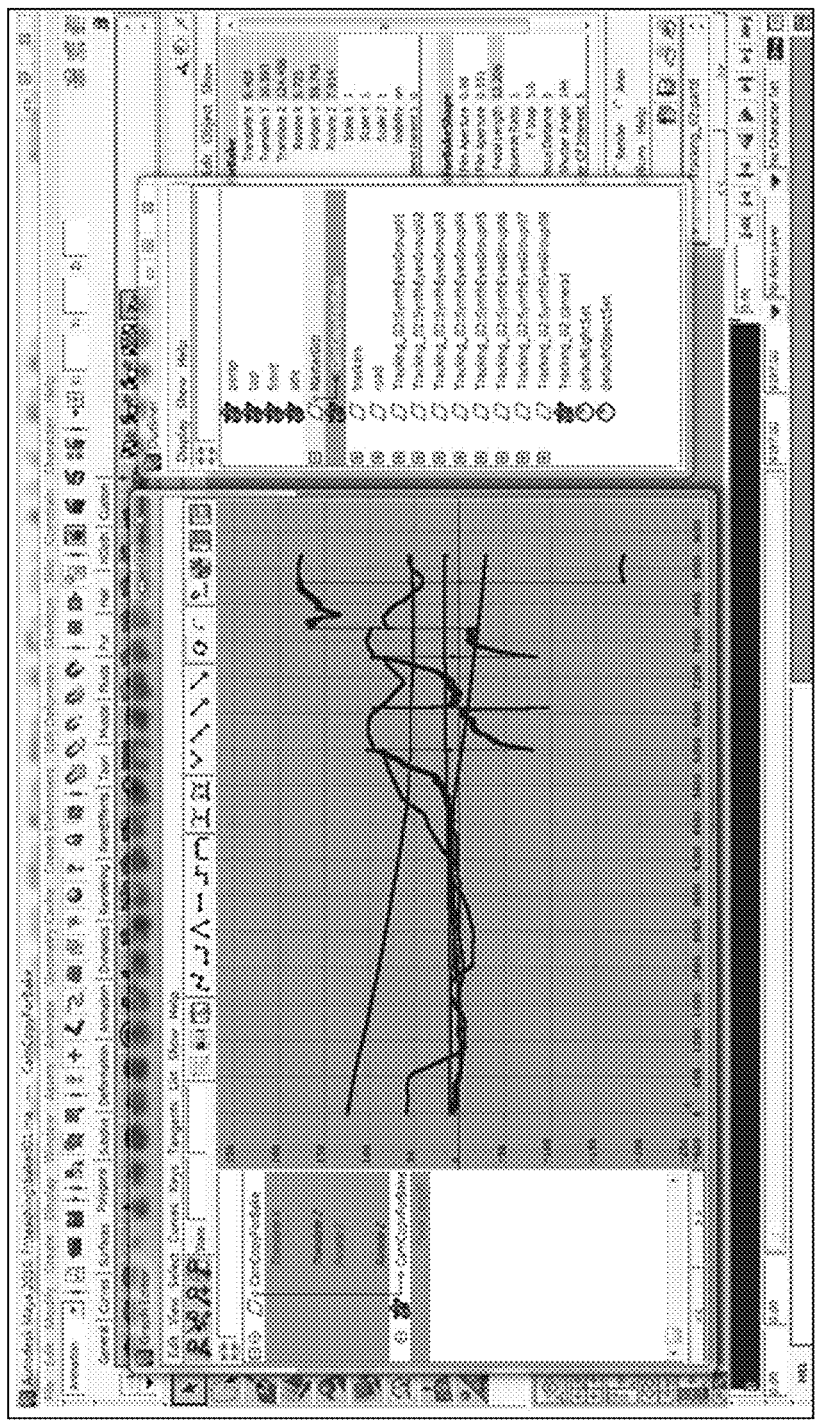
Figure 3G:
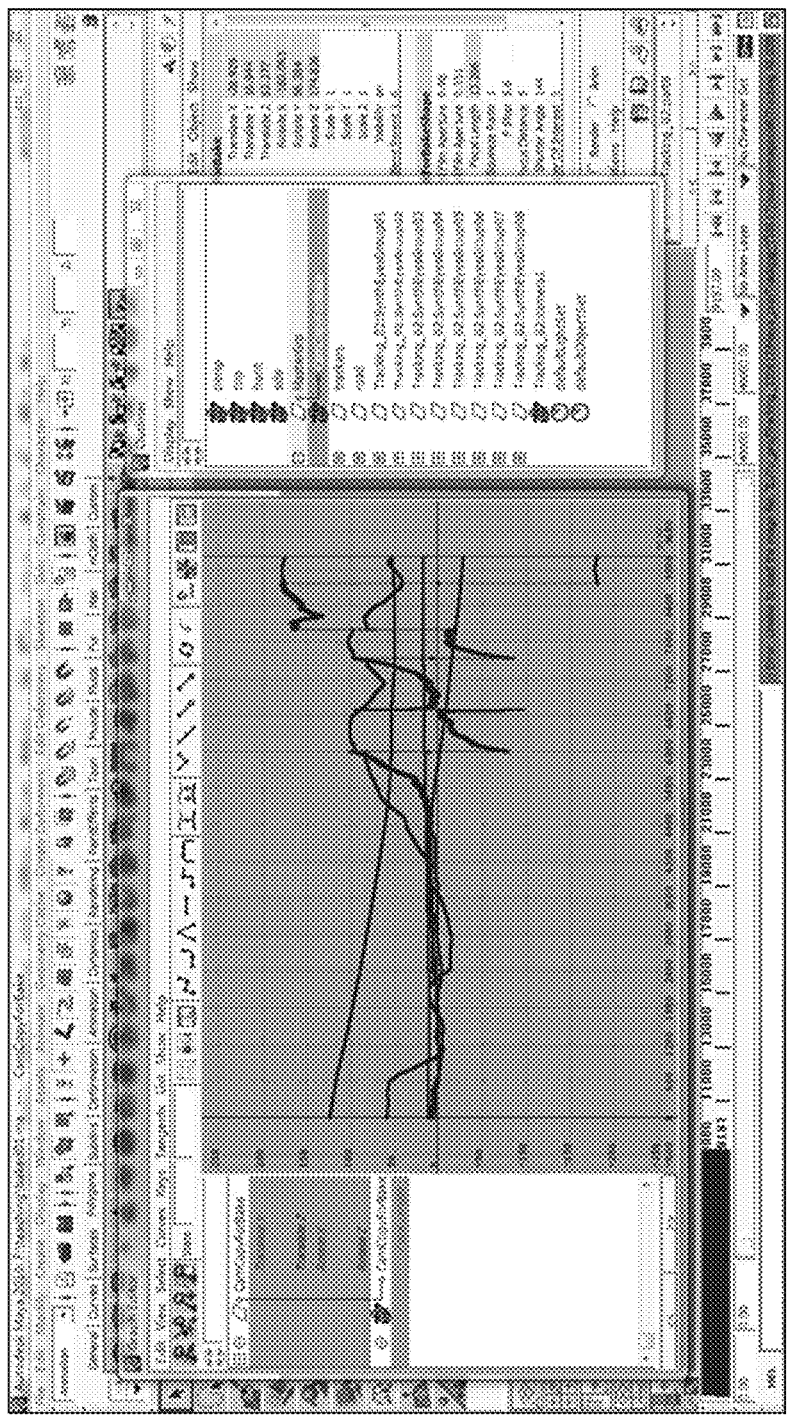
Figure 3H:
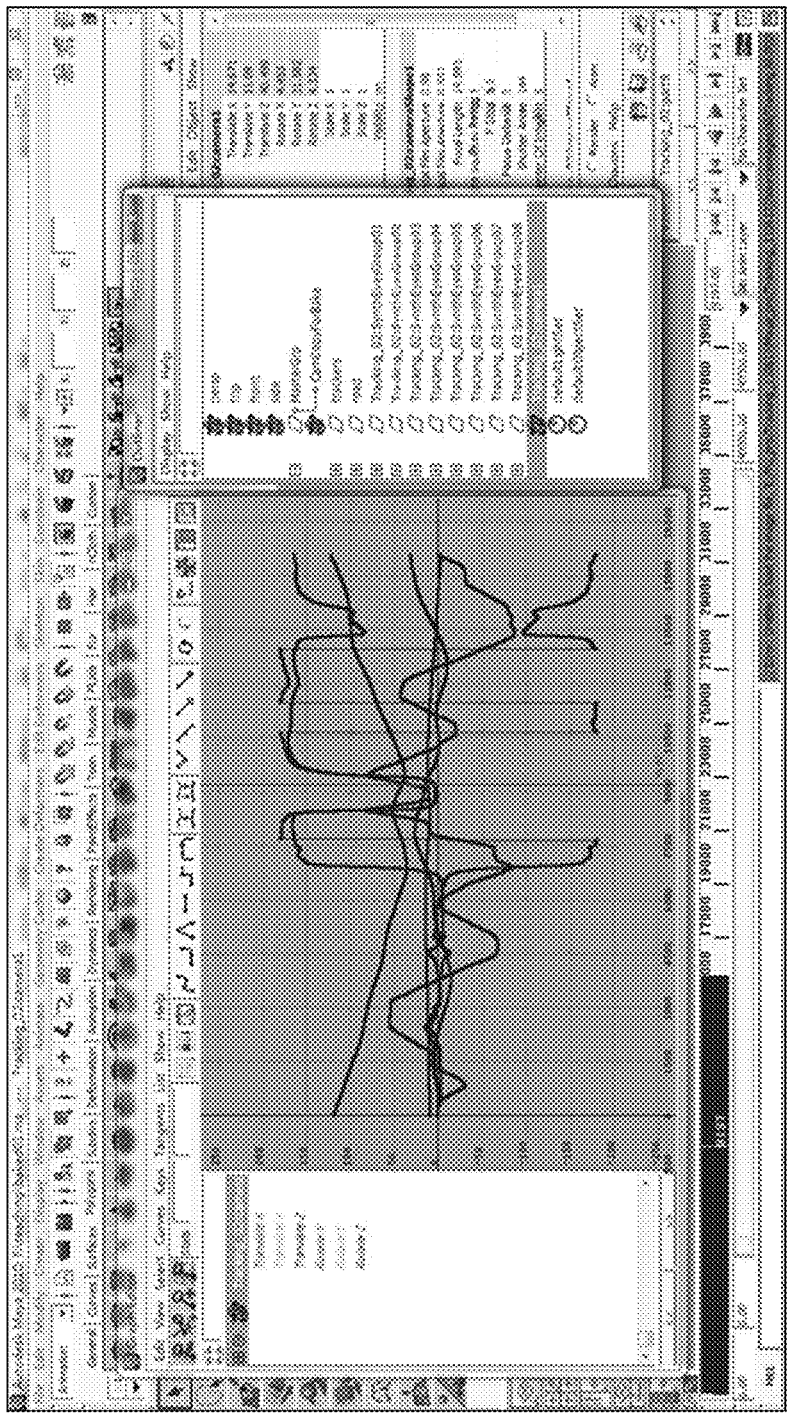
Figure 3J:
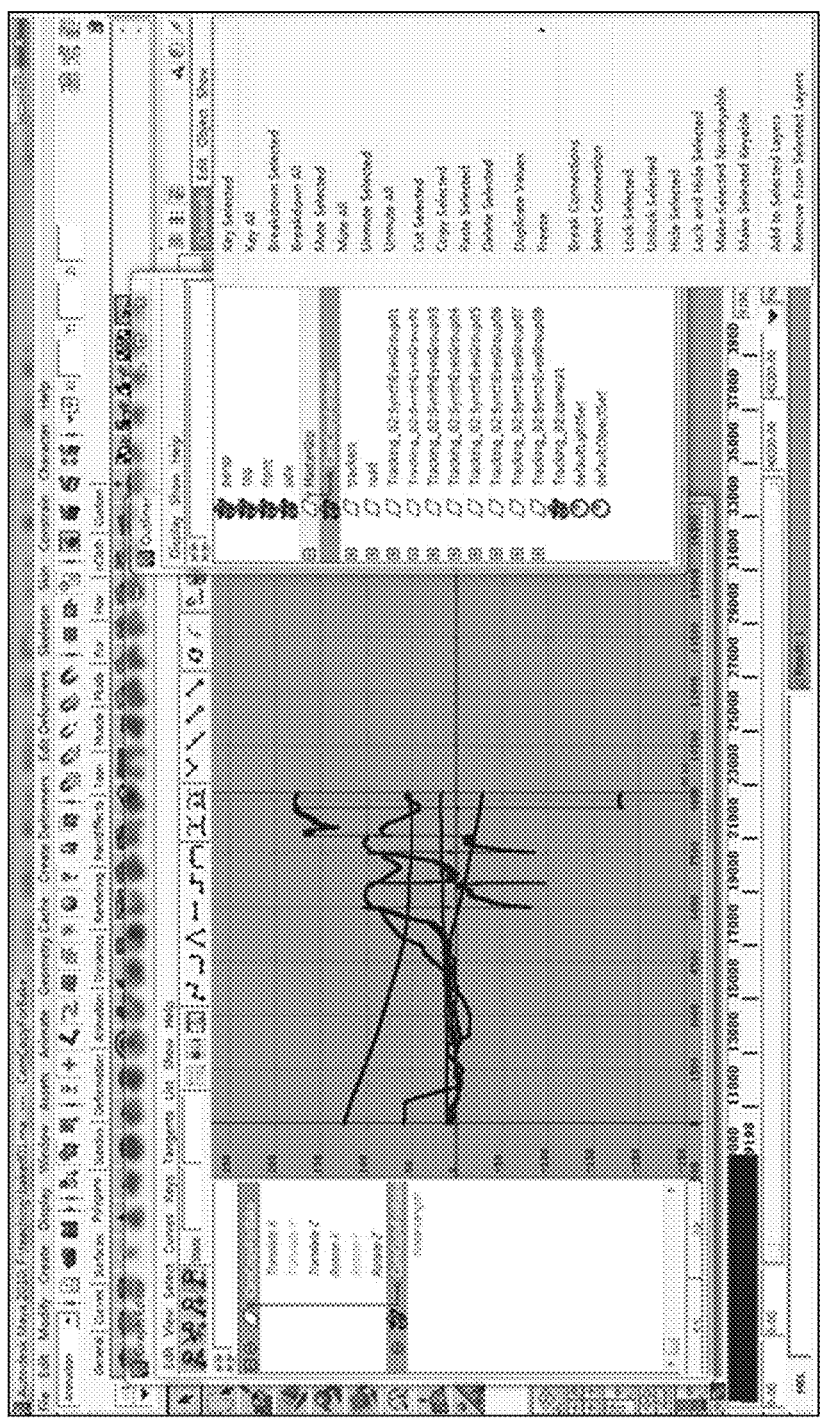
Figure 3K:
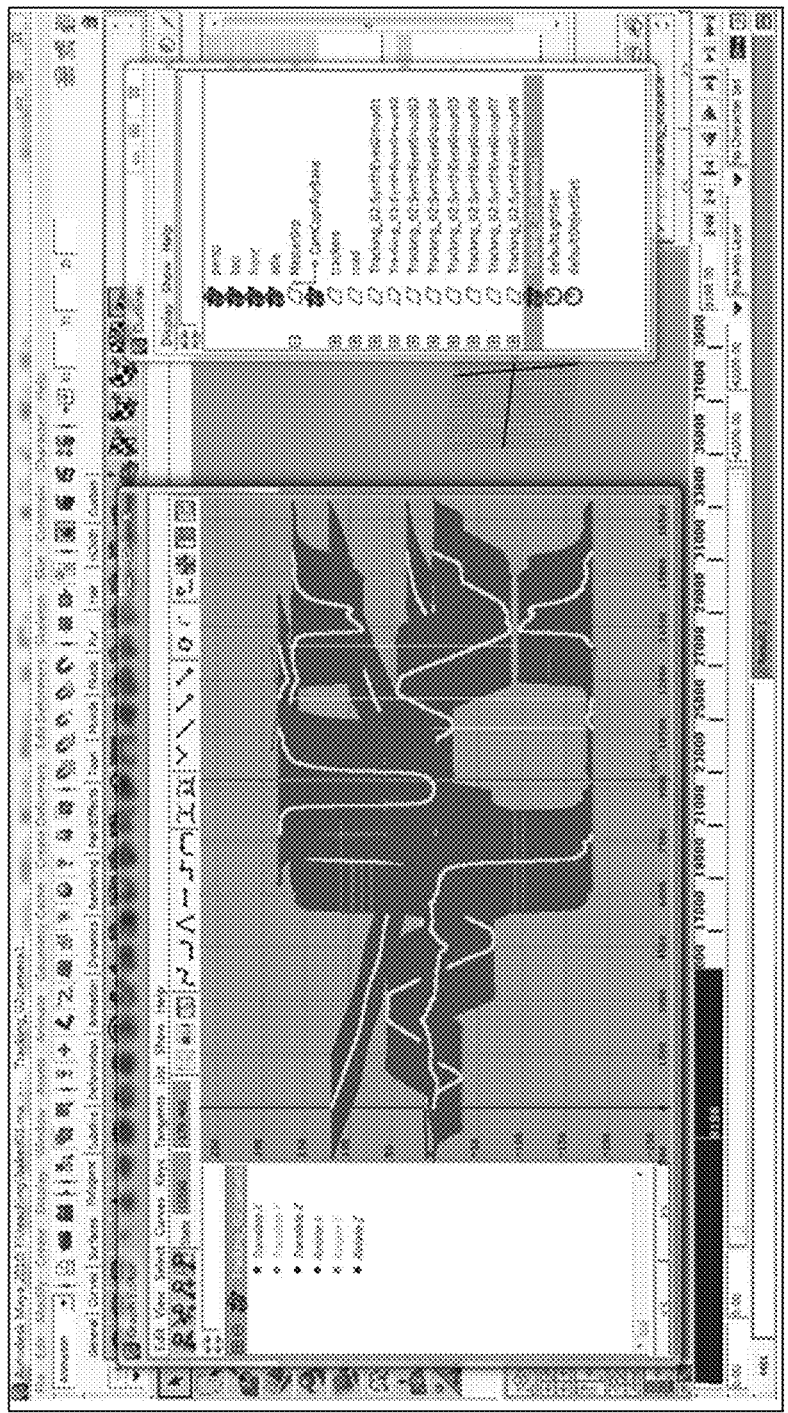
Figure 3L:
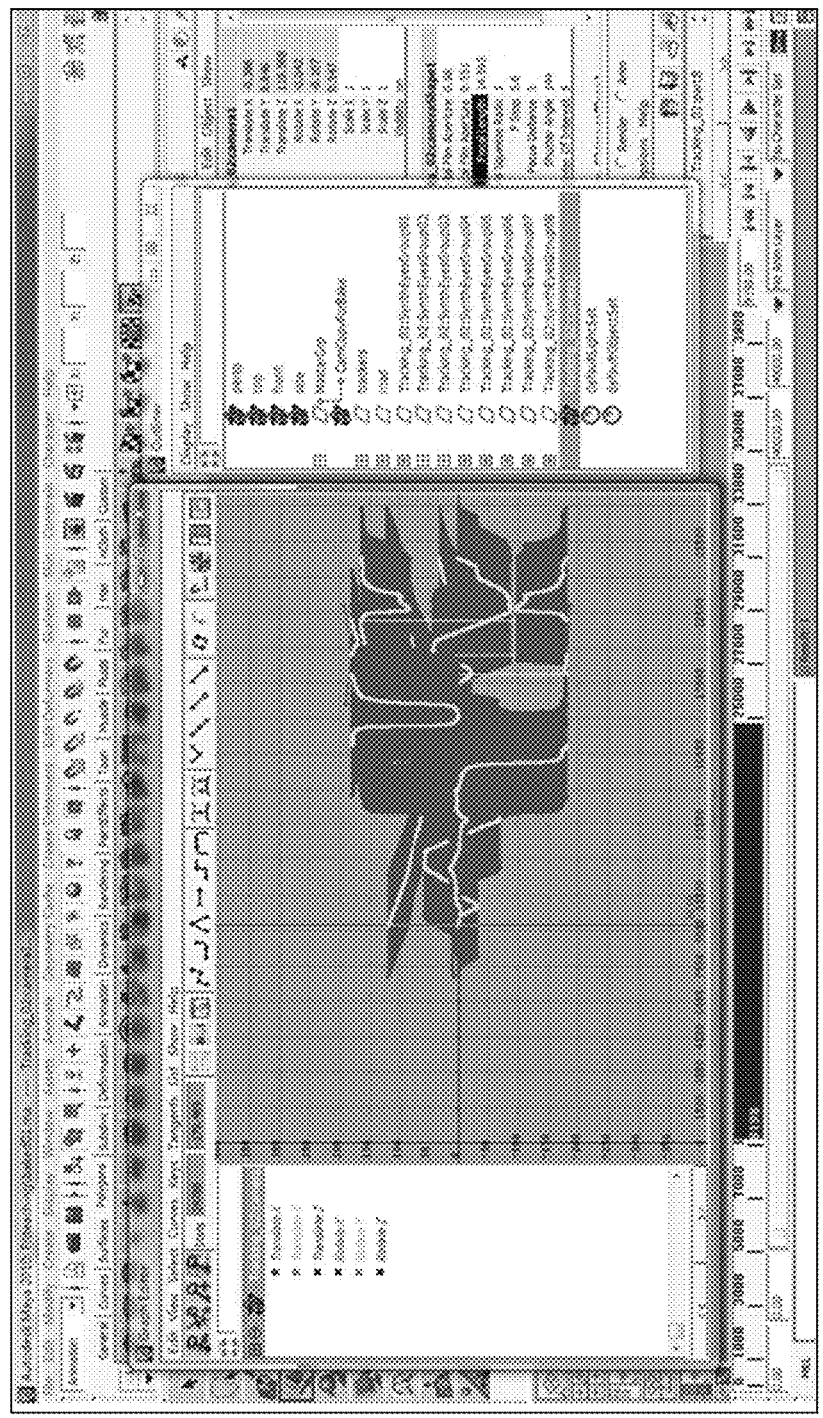
Figure 3M:
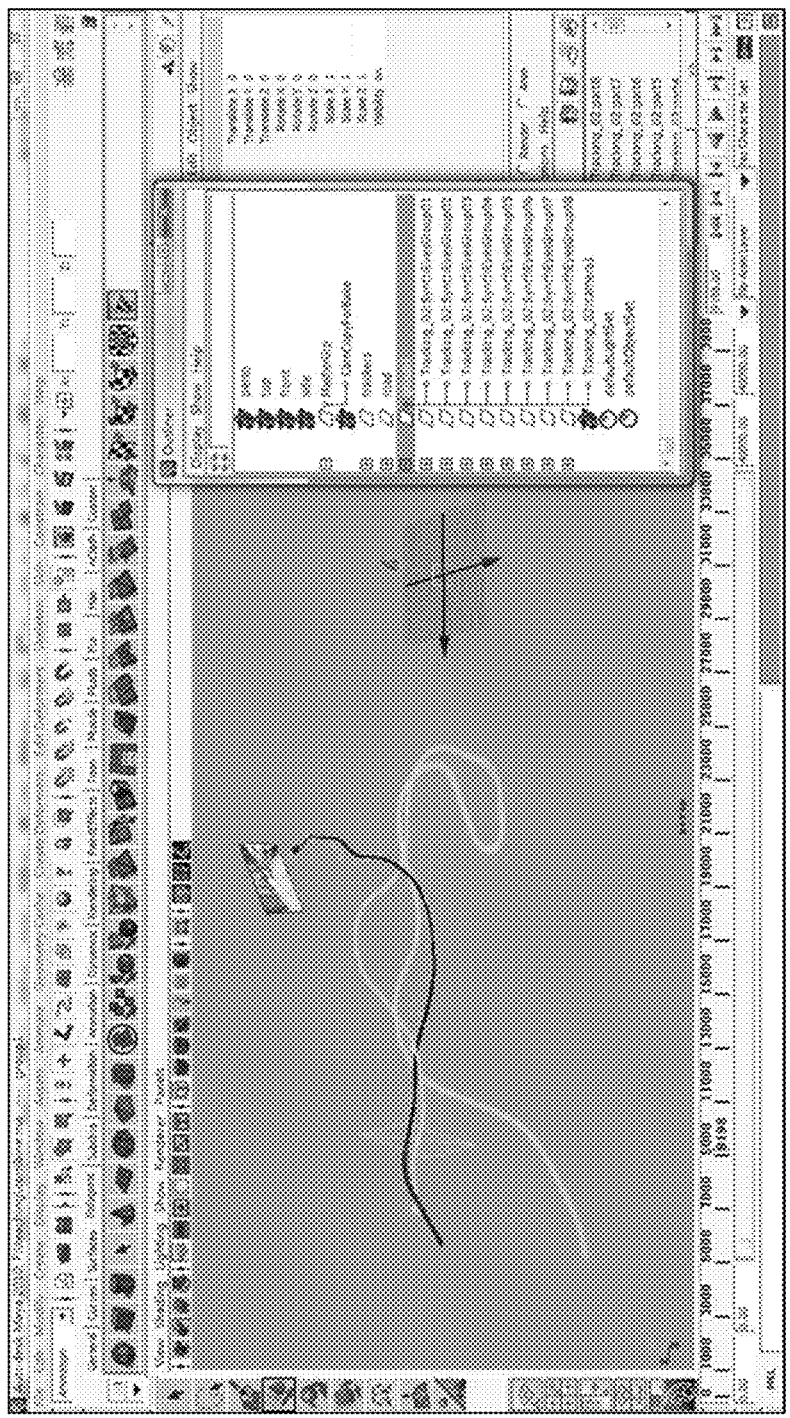
Figure 3N:
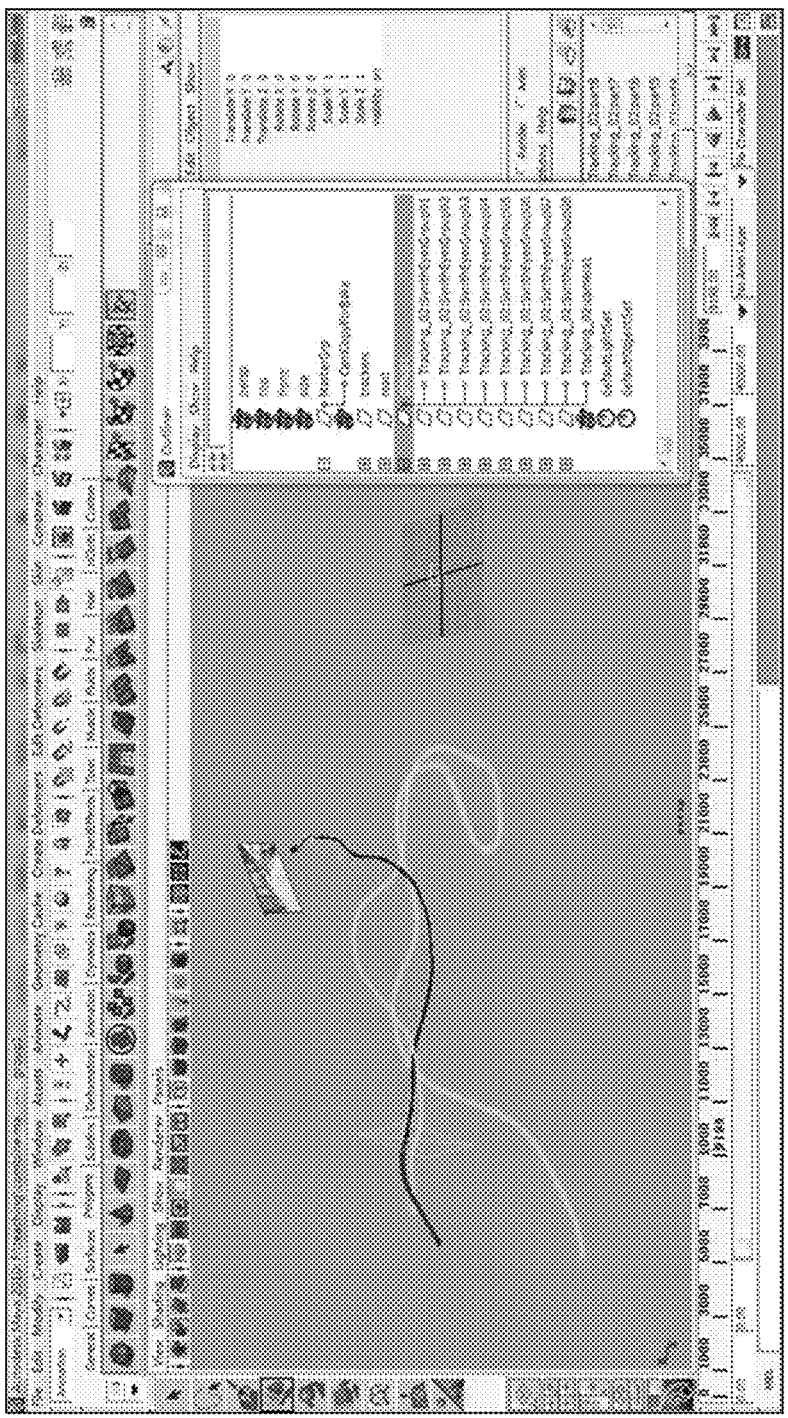
Figure 3P:
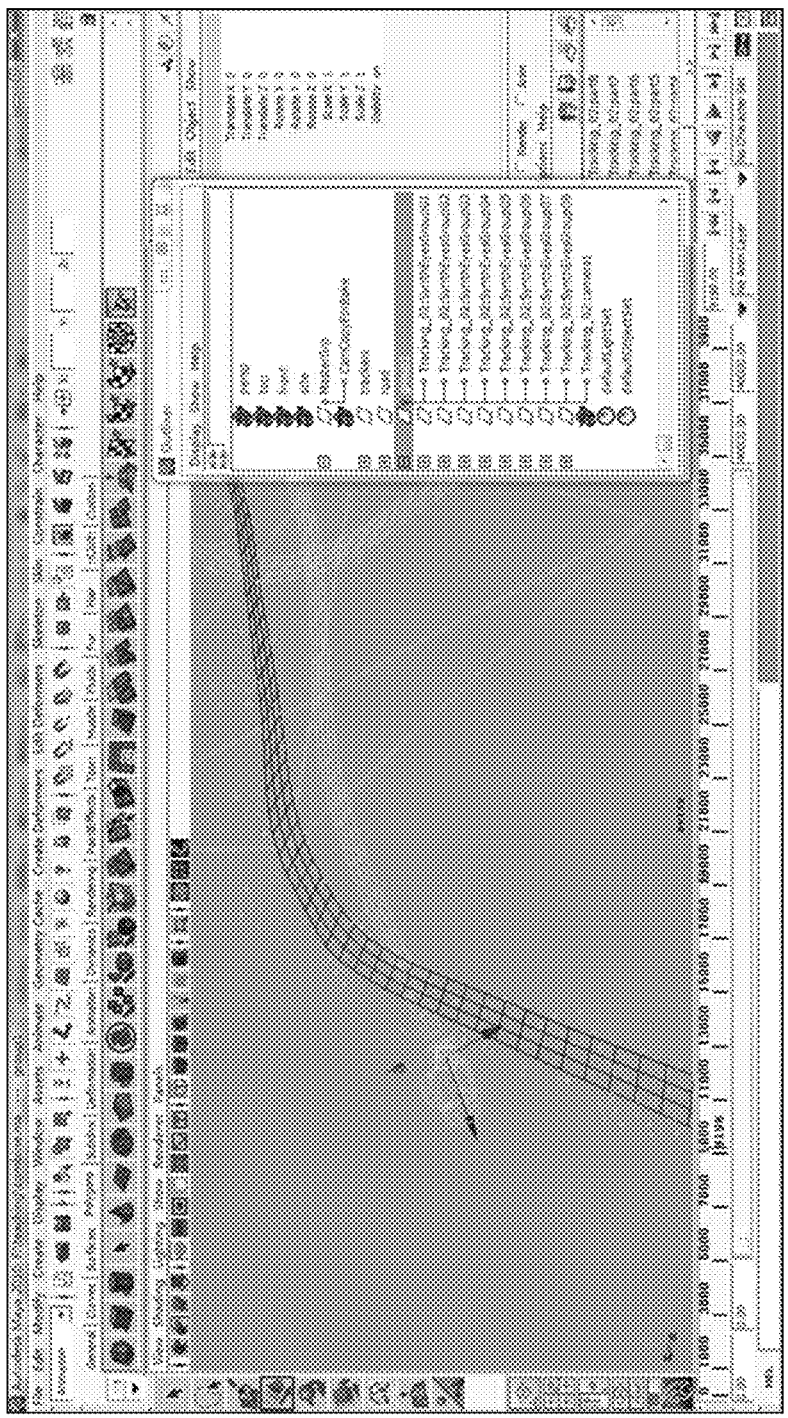
Figure 3Q:
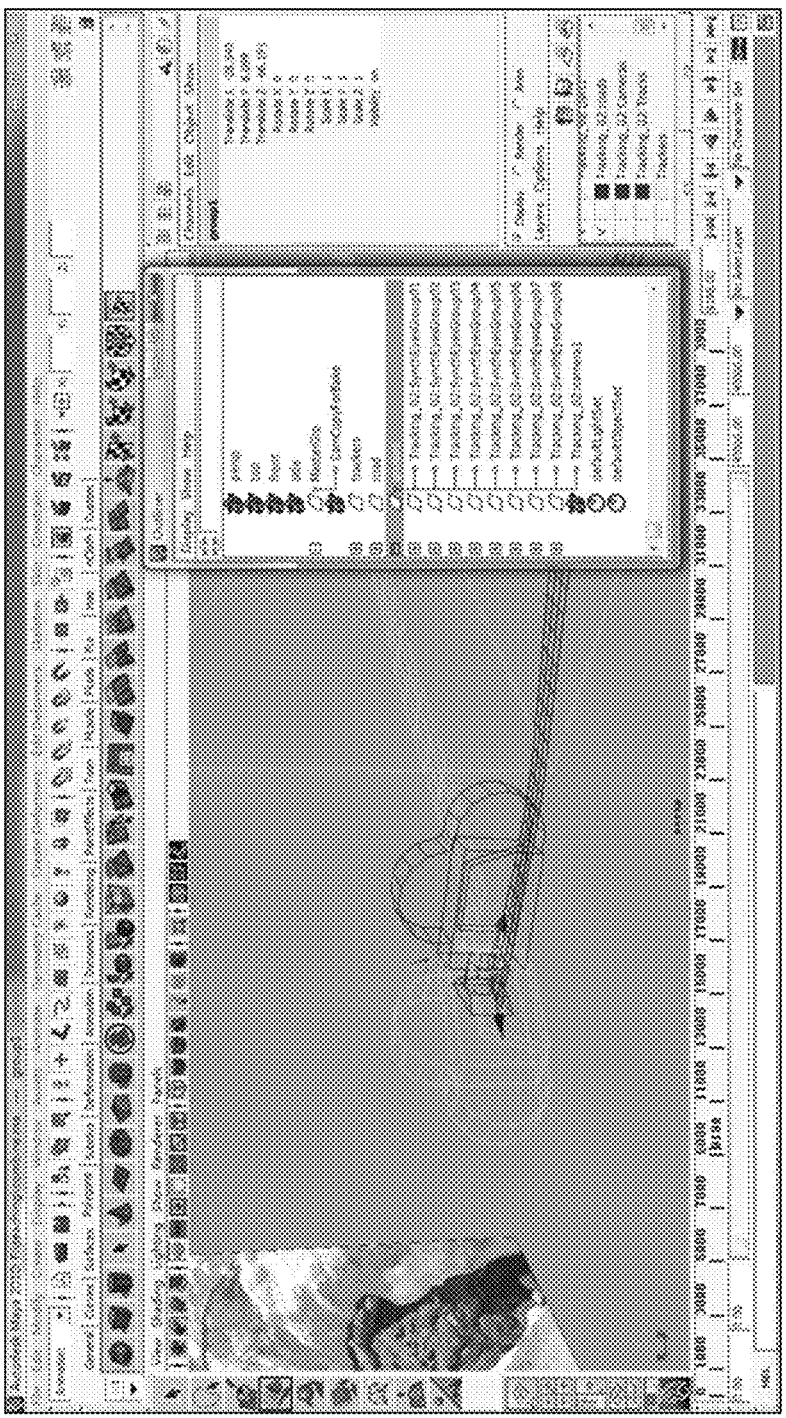
Figure 3R:
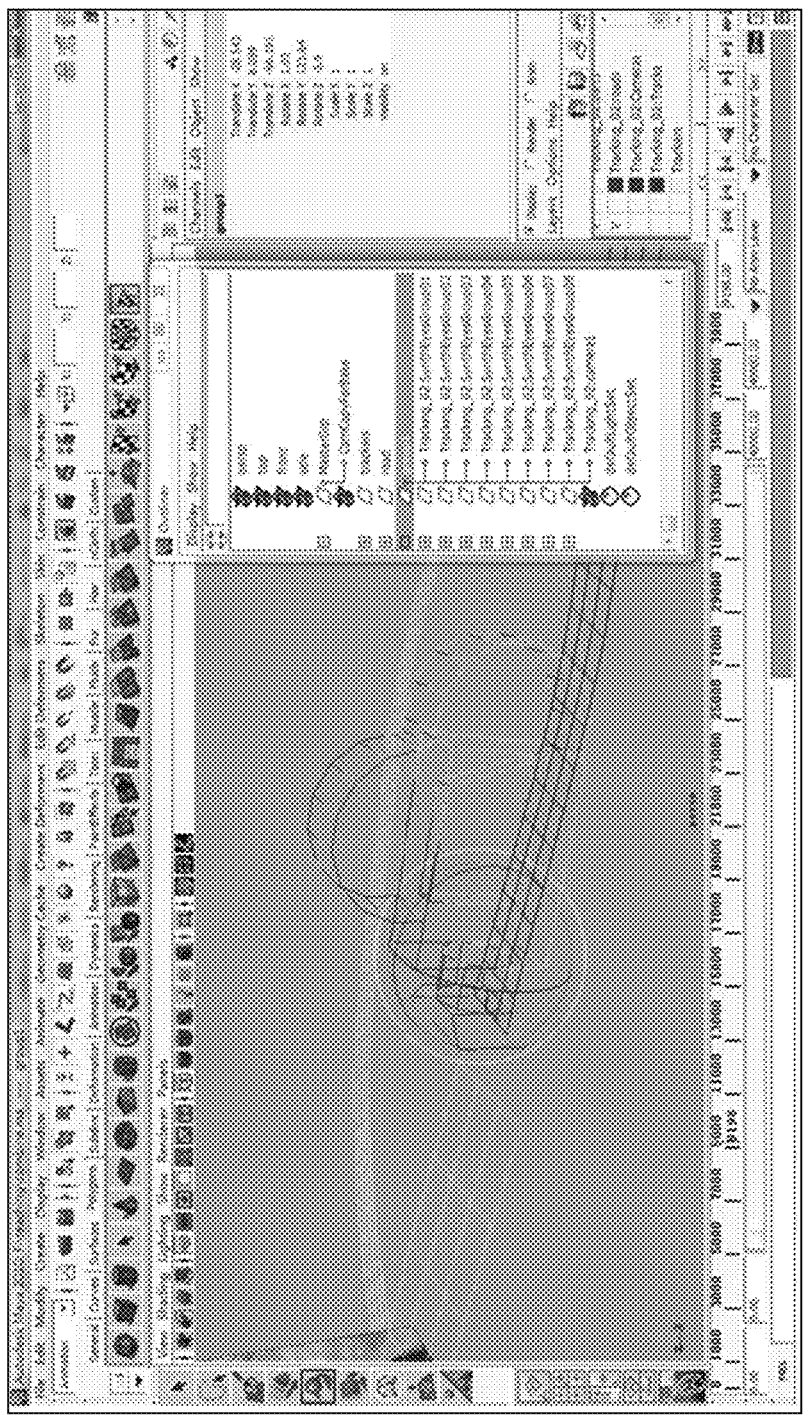
Figure 3S:
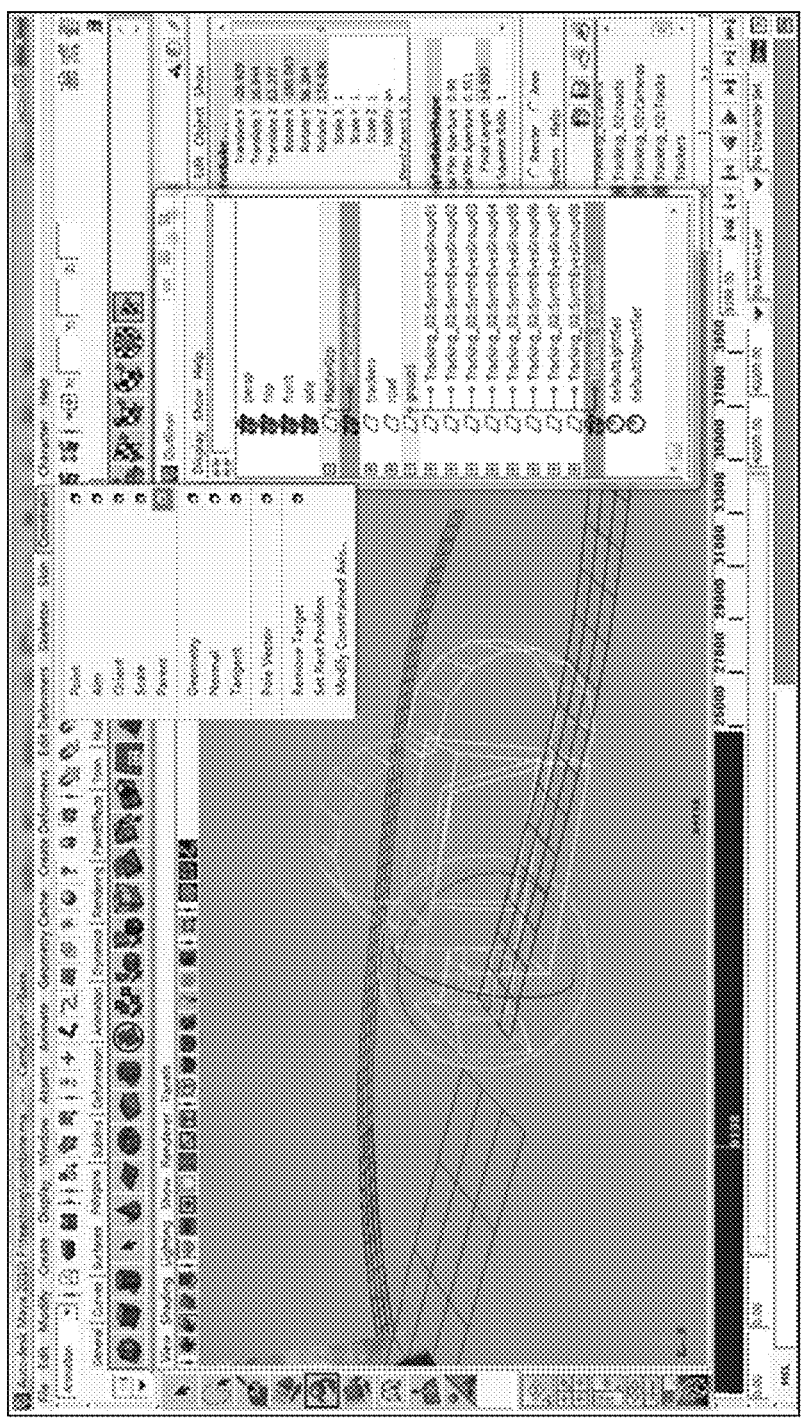
Figure 3T:
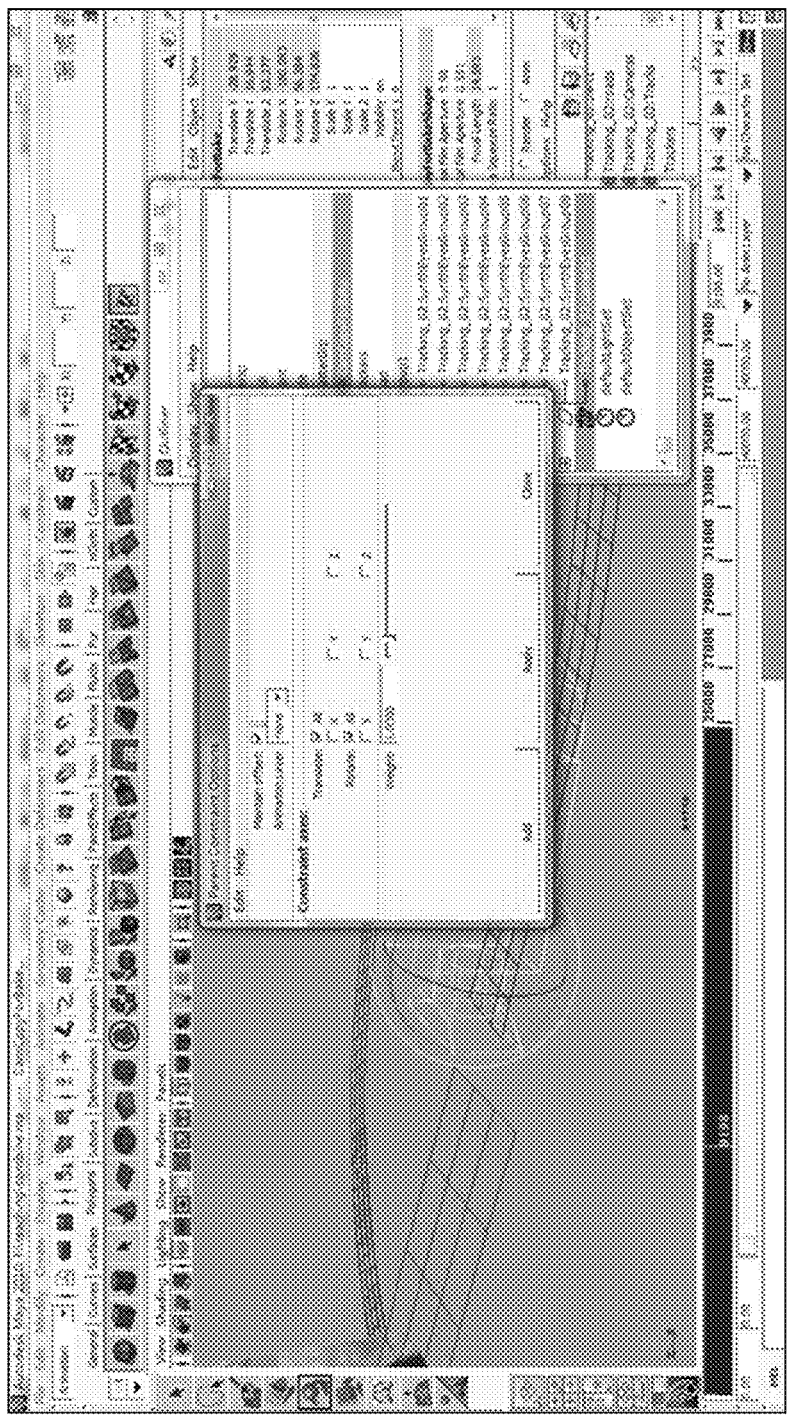
Figure 3U:
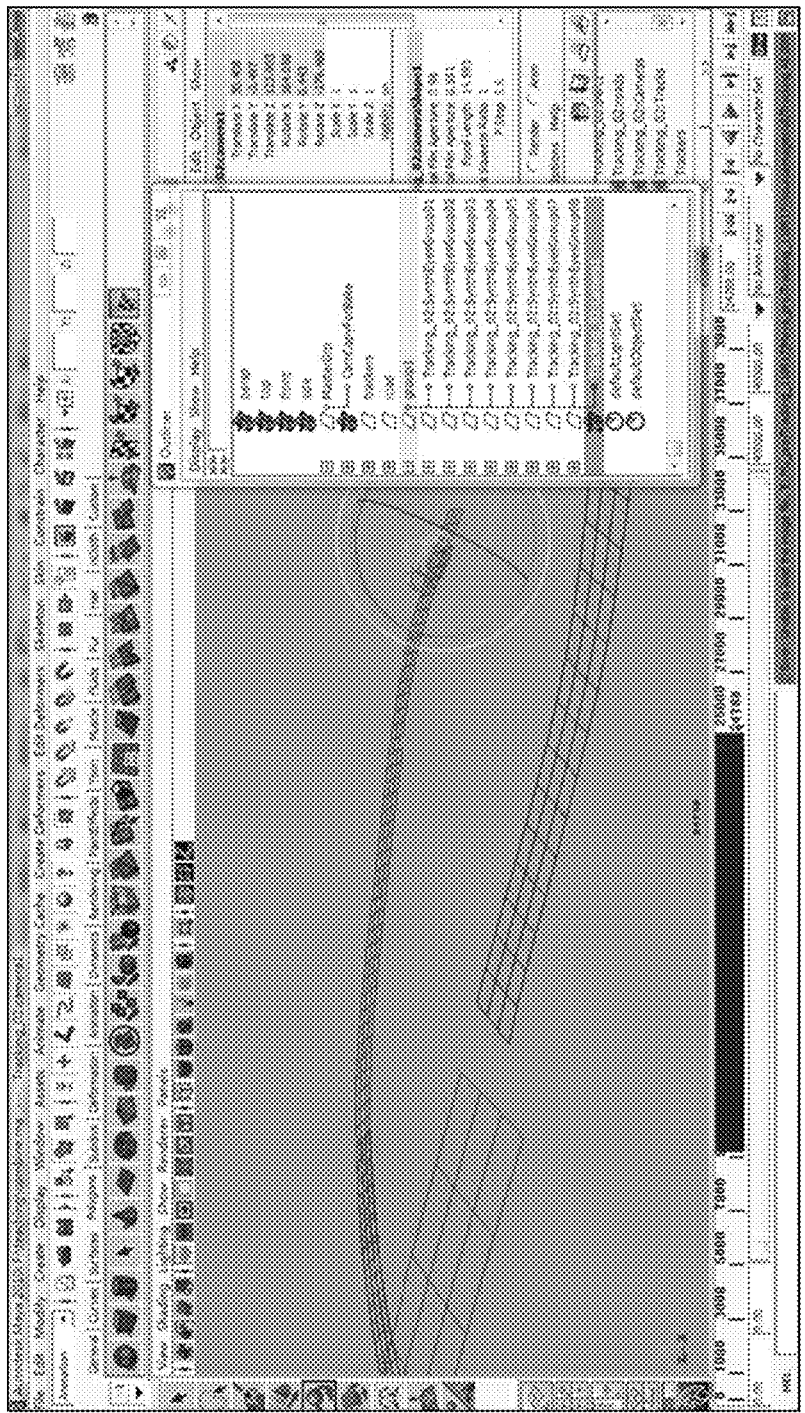
Figure 3V:
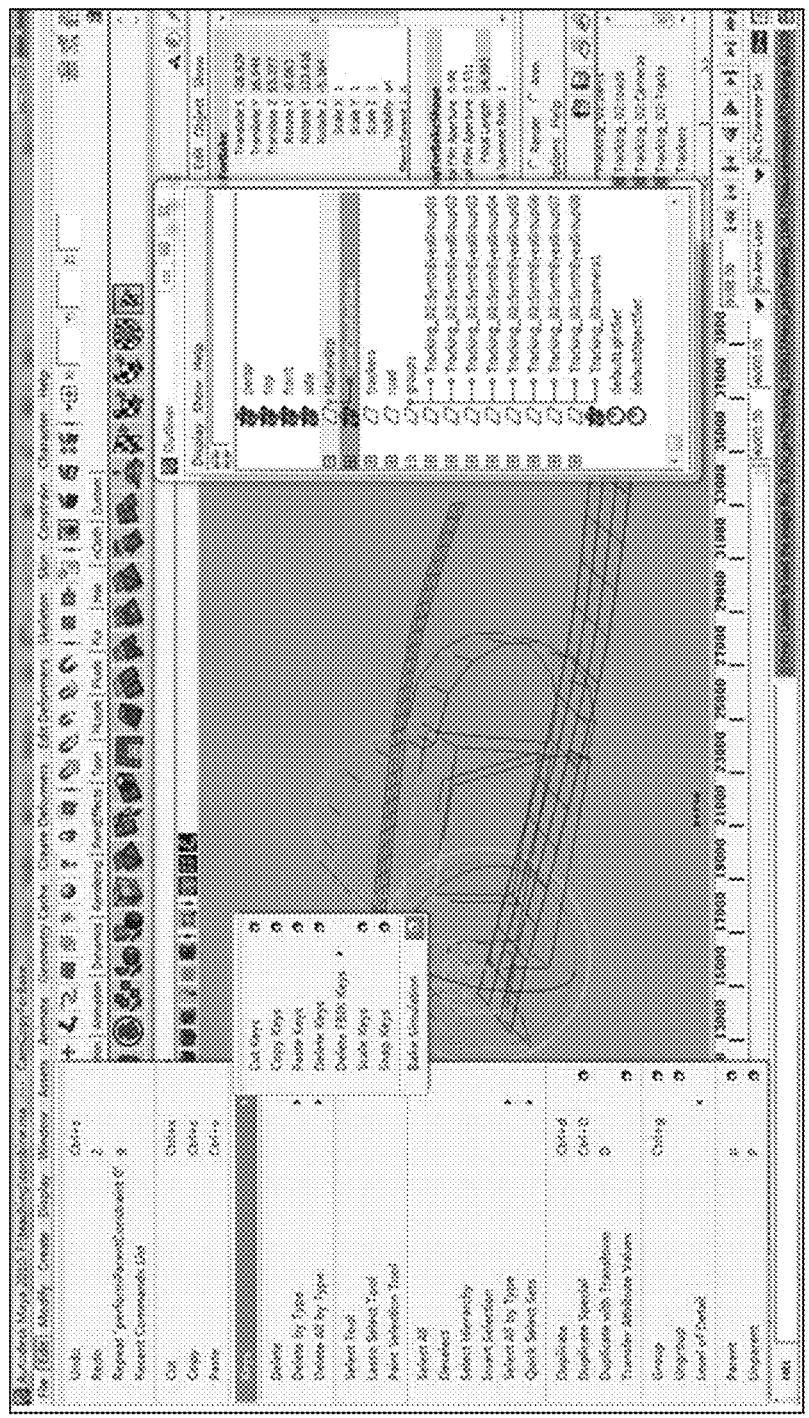
Figure 3W:
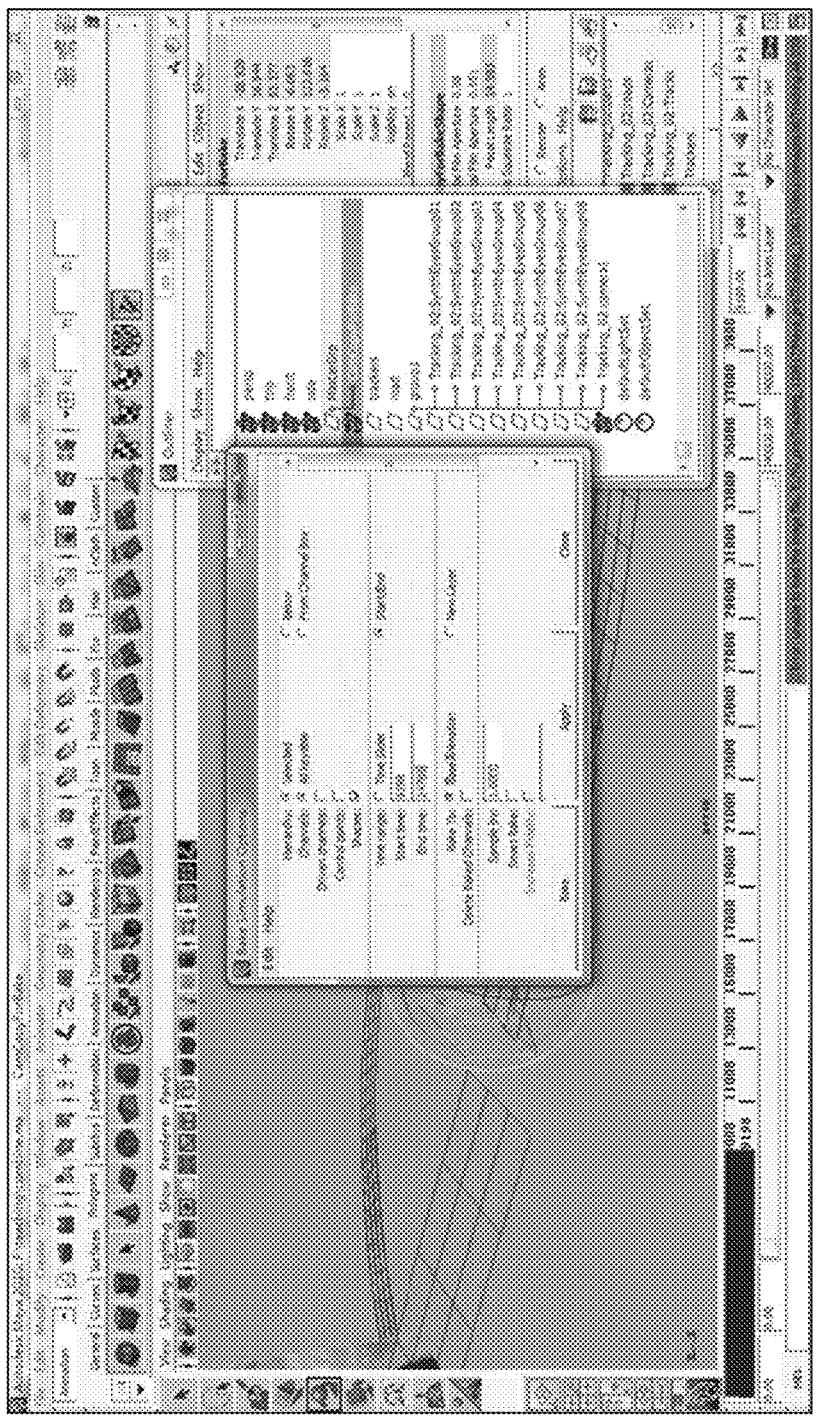
Figure 3X:
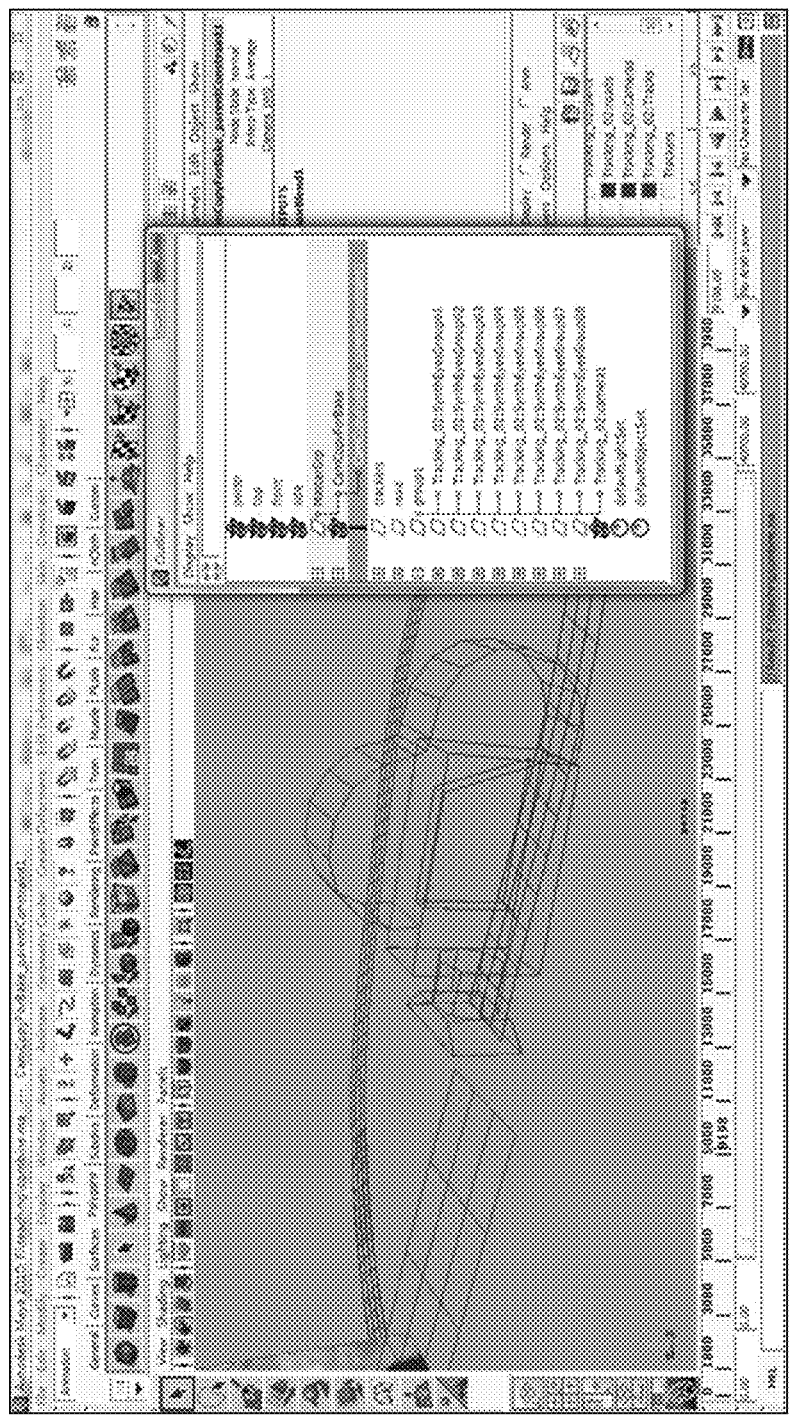
Figure 3Y:
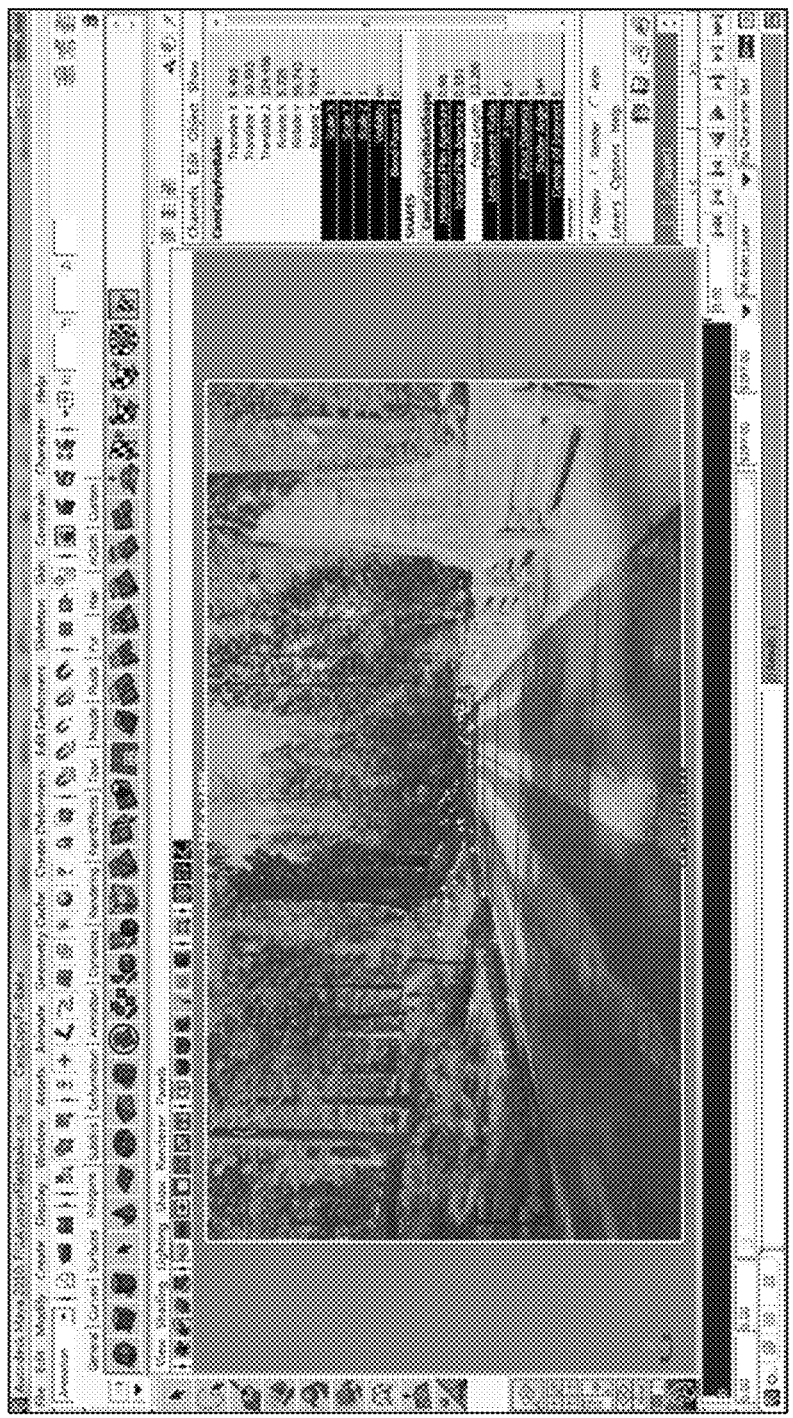
Figure 3Z:
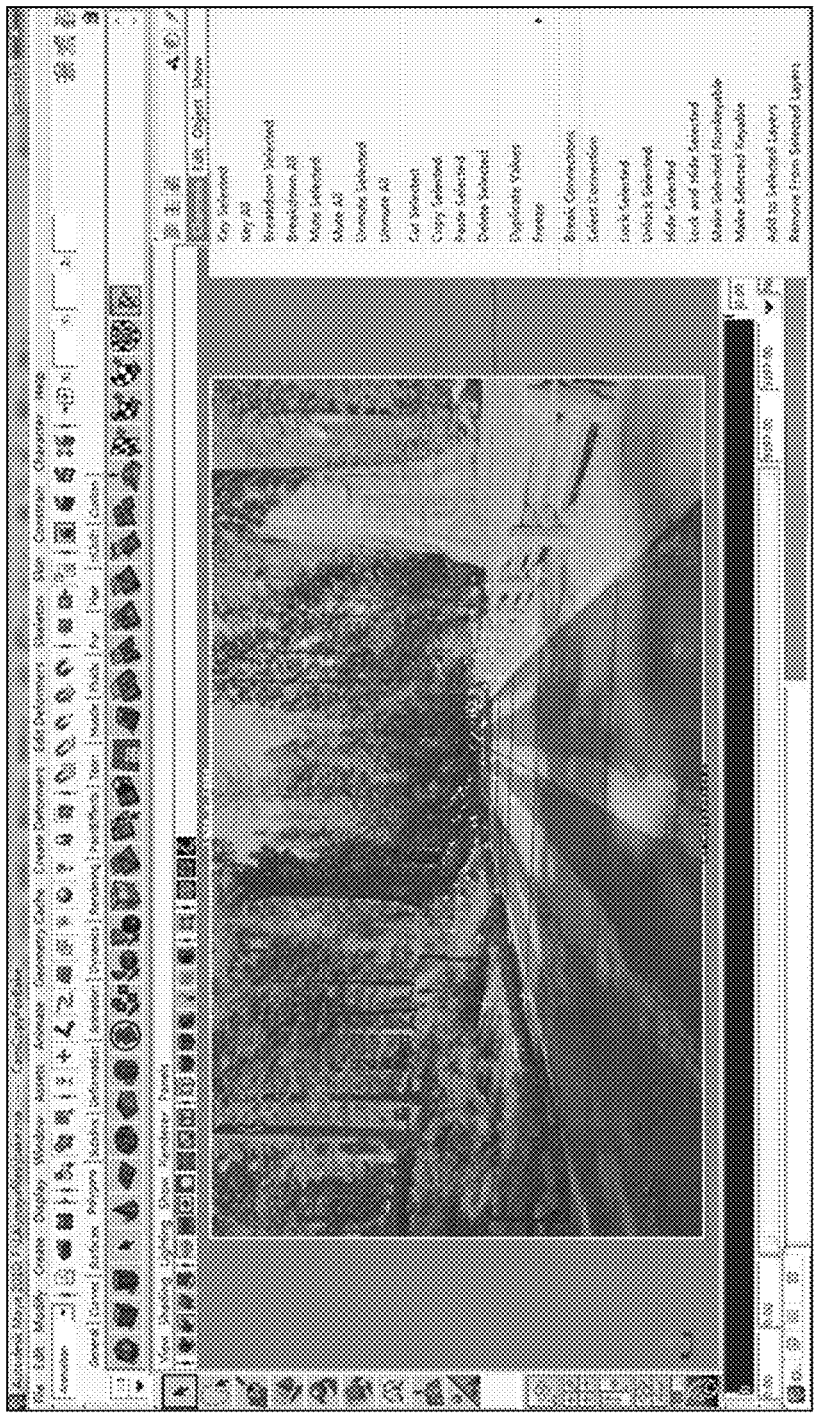

Referring now to FIGS. 3A to 3Z depicting an exemplary process to merge smaller sections of video data (camera and point cloud) into a single longer section in accordance with an embodiment of the present disclosure. Prior to the process of merging smaller sections of video data (as depicted in FIGS. 3A to 3Z), a process of preparing the main 3D camera may be performed. The main 3D camera may be derived in the 'match moving' process for further adjustment in 3D development software. The 3D camera may be utilized in the 3D development software that may be utilized in the main viewer, and also to allow additional cameras to be joined to it to create a longer section of usable video.

The process, as depicted in FIGS. 3A to 3Z, may need to be repeated for each section of the video file to be merged. Specifically, FIGS. 3A to 3Z depict the exemplary process implemented using Autodesk Maya 2010 software. However the process may not be limited to usage of Autodesk Maya 2010 software. Further, many other 3D development software such as, but not limited to, Autodesk 3DsMax, and Cinema 4D may be utilized. The process outlined in these figures may be repeated each time a new section of camera and point cloud data is imported to be added to an existing section.

As shown, in FIG. 3A one must clean up the outlying camera tracks, and ensure a camera, such as a CamCopy-ForBake camera is placed in the group named MasterGrp. In FIG. 3B, the Maya file for the next section (in this case Maya ASCII format) is imported. Further, in FIG. 3C, the "persp" camera is chosen for the correct viewpoint.

In FIGS. 3D and 3E the Graph Editor is opened and all attributes may be selected. In FIG. 3F the mouse is placed over the Graph Editor window and "F" is pressed to show all the frames. Further, the time slider may be increased by typing in a larger number. In FIG. 3G, an appropriate button may be clicked to go to the last frame of the CamCopyForBake camera. In FIG. 3H, a second tracking camera may be chosen, and the corresponding Focal Length number may be noted. In FIG. 3I the CamCopyForBake camera may be chosen, and an appropriate button may be clicked to advance to the next frame and the Focal Length may be typed in. Further, in FIG. 3J, the attribute Focal Length is chosen, then an option 'Key Selected' may be used from the menu option 'Channels' to key in the Focal Length in the frame.

Further, in FIG. 3K, the tracking camera may be chosen, and then all the frames may be selected in the graph editor. In FIG. 3L "W' is pressed then "shift" and the middle mouse button to move all the key frames over this time. In FIG. 3M the second tracking camera may be chosen along with all the second tracking points, then "G" may be pressed to make them into a new group. In FIG. 3N the group may be chosen, and then by pressing "Insert" the centre point of the group may be moved. In FIG. 3O "V" may be pressed until the middle point of the group is exactly over the middle point of the second tracking camera. In FIG. 3P, "Insert" is pressed and the group's centre point may not be moved further, but the group can be readjusted.

In FIG. 3Q the group may be moved to CamCopyForBake by pressing "V". In FIG. 3R "R" may be pressed to change the group's rotation. This may be done until the group's rotation is exactly the same as CamCopyForBake. The two cameras may now be on the same position. In FIG. 3S the 2.sup.nd tracking camera is chosen, the CNTL is pressed to add CamCopyForBake. Under the Constraint menu, the box next to "Parent" may be selected. In FIG. 3T "add" is clicked and, "Maintaining offset" may be kept ON.

In FIG. 3U the second tracking camera is chosen, and a note is made of the beginning and the ending frame numbers. In FIG. 3V CamCopyForBake is chosen, then under the Edit menu Keys and Bake Simulation is chosen. The box next to Bake Simulation is selected. In FIG. 3W Start/End is selected and the beginning and ending frame numbers may be typed in. Bake may be clicked. ESC can be used to stop the baking at any time. In FIG. 3X after the baking is completed, CamCopyForBake_parentConstraint1" may be chosen, and then deleted. In FIG. 3Y the highlighted attributes may be chosen after the baking is completed. This can be done by holding down CNTRL during the selection. In FIG. 3Z Channels and Break Connections may be clicked.

Figure 4:
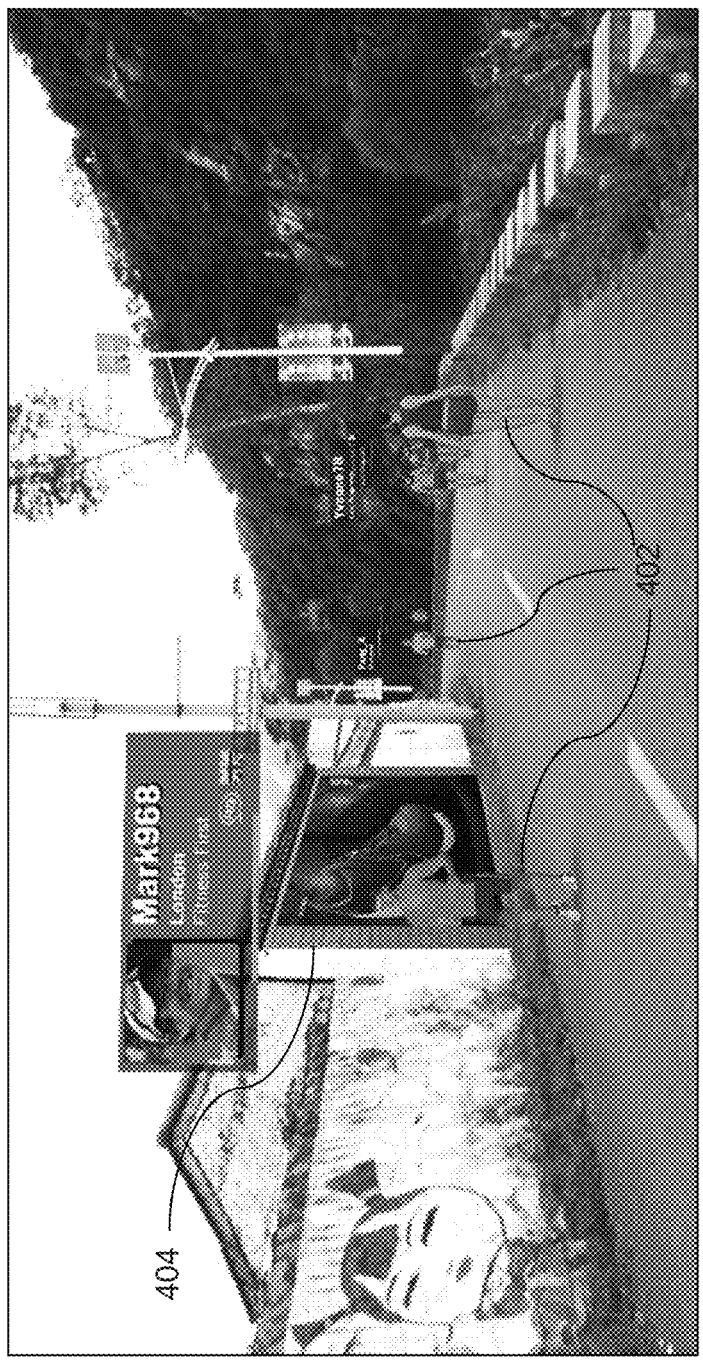
FIG. 4 illustrates independent characters or 3D objects viewed overlaid on a video clip in accordance with an embodiment of the present disclosure.

FIG. 4 illustrates independent characters or 3D objects viewed overlaid on a video clip in accordance with an embodiment of the present disclosure. Specifically, FIG. 4 depicts representation of an exemplary output (synthetic objects/characters (users) in a 3D environment) provided by a system, such as the system 202 (as depicted in FIG. 1). As shown, several moving characters (represented as 402) are overlaid onto a video clip frame. The characters are actually in a layer (in the viewer) separate to the video frame. However, placement of characters onscreen and their relative size and distance from the camera (or user view point) may be guided by the Occlusion Layer and the correct application of camera data from the "match moving" process (as explained in conjunction with FIG. 33).

The characters appear to be walking or running on the road are shown in the video frame but they are actually independent of the video and may act scenes (for example stop, turn around, change directions) that may not be related to the movement of the video camera. The characters may act differently each time the same video clip is played due to independent functioning of the characters and the video frame. Further, the acts performed by the user may be based on one or more activities that the user may perform while playing game or exercising on an input sensor device, such as the input sensor device 110.

Additionally, various objects, such as an object 404, may be added. Specifically, as shown, the object 404 is an advertising billboard 404 that may also be added after the video recording was made (i.e., after preparation of the video file). It may be appreciated by a person skilled in the art that the billboard 404 may be moved or its content may be changed each time the video clip is played.

Thus, it may be concluded from FIG. 4 that one or more static or dynamic objects/characters may be embedded in a 3D environment of the video clips that may be running in the background independently of the embedded objects. Further, such objects may be synthetic that may act independently of the video file.

Figure 5:
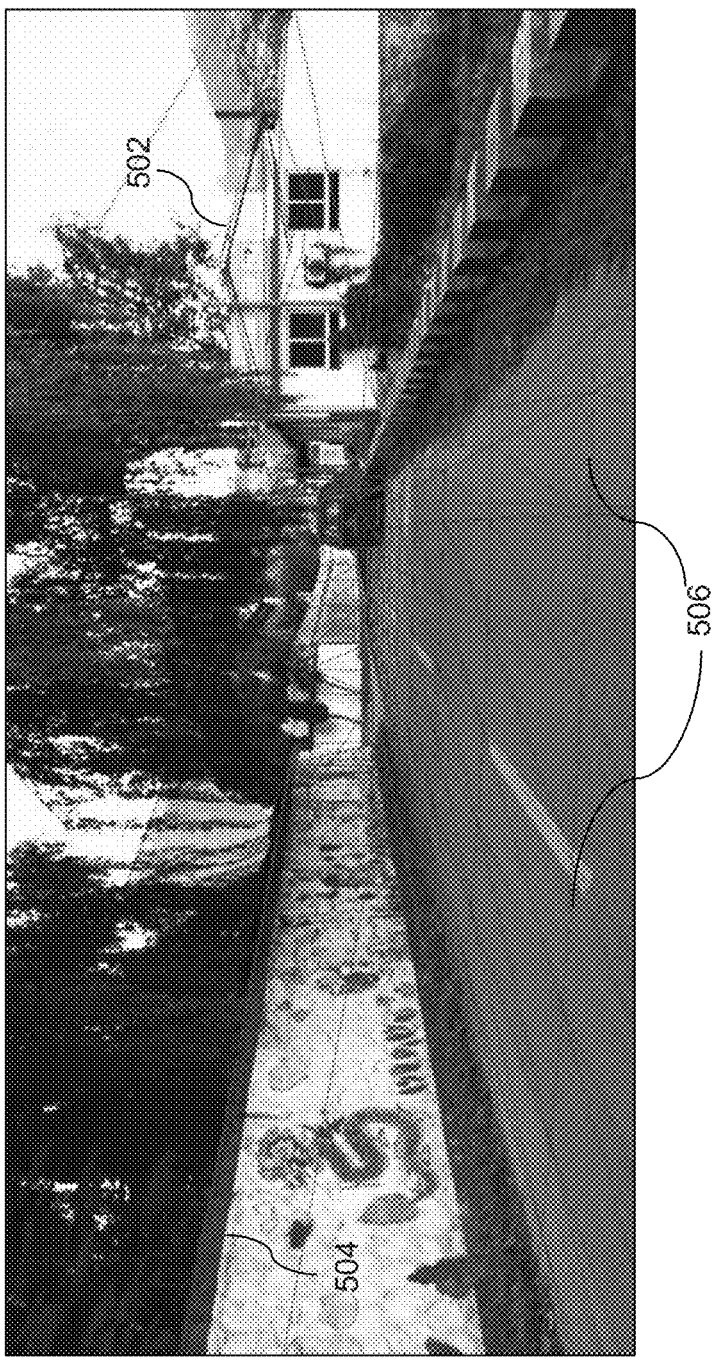
FIG. 5 illustrates a transparent representation of the key aspects in the environment depicted in a video (Occlusion Layer) used in the preferred embodiment of the invention to set the rules for characters' movement in the 3D space in accordance with an embodiment of the present disclosure.

FIG. 5 illustrates a transparent representation of the key aspects in the environment depicted in a video (Occlusion Layer) used in the preferred embodiment of the invention to set the rules for characters' movement in the 3D space in accordance with an embodiment of the present disclosure. Specifically, In FIG. 5 parts of the Occlusion Layer are shown overlaid onto the video clip in a viewer (such as 3D player). Since the Occlusion Layer may be a transparent 3D representation of key aspects of the environment portrayed in the video, individual objects (for example the house 502 on the right or the wall 504 on the left of the frame may be placed according to 3D coordinates that represent their relative distance from the camera. An object or character that moves down the road 506 and turns right past the house 502 may be occluded (not rendered on screen) and instead the furthermost layer containing the video house may be shown. Due to this, it may appear to a viewer that the character has moved behind the house.

Figure 6:
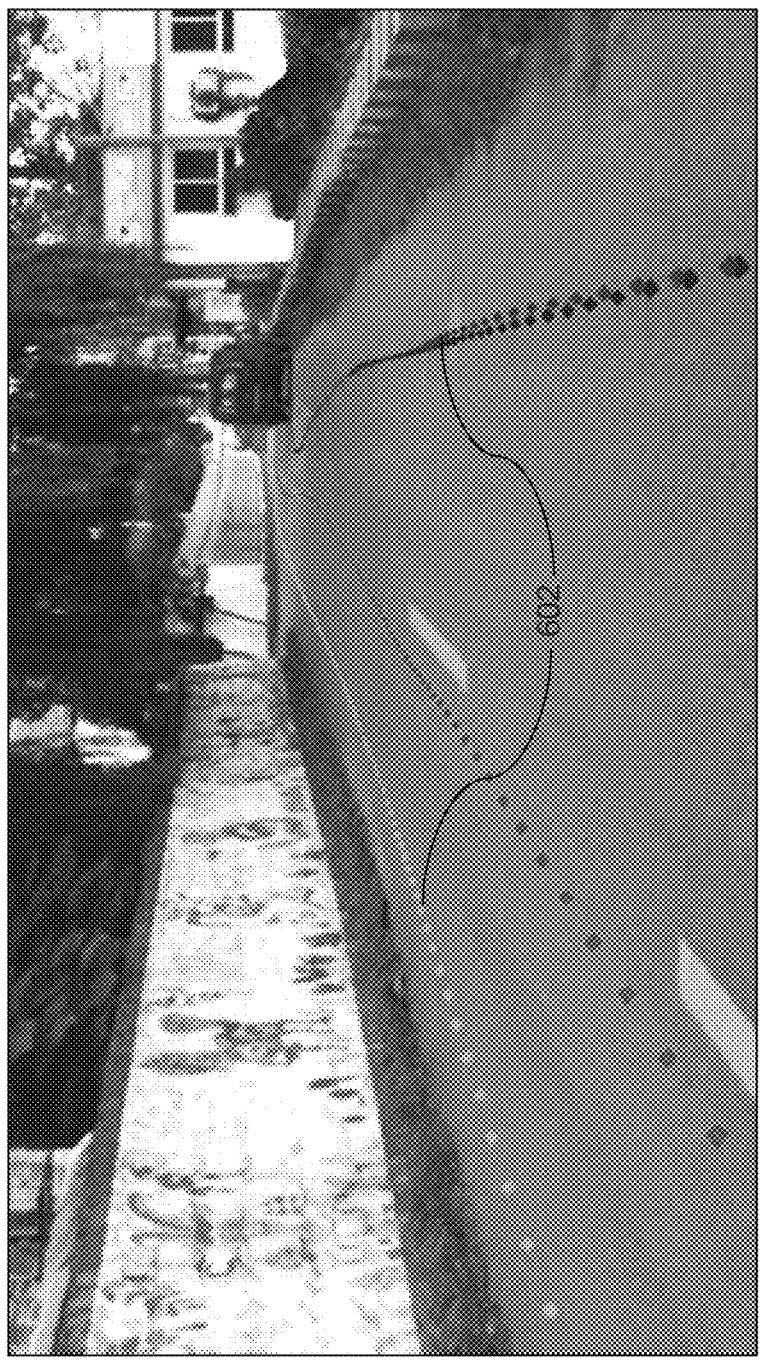
FIG. 6 illustrates the paths set in a 3D space layer used in the preferred embodiment of the invention to guide moving objects in accordance with some embodiments of the present disclosure.

FIG. 6 illustrates the paths set in a 3D space layer used in the preferred embodiment of the invention to guide moving objects in accordance with some embodiments of the present disclosure. As shown, the path 602 may guide the movement of characters or moving objects. Such paths may enable the characters to appear as if they are moving along the road shown in the video, however in reality they may be separate and independent layers to the video frames.

Figure 7:
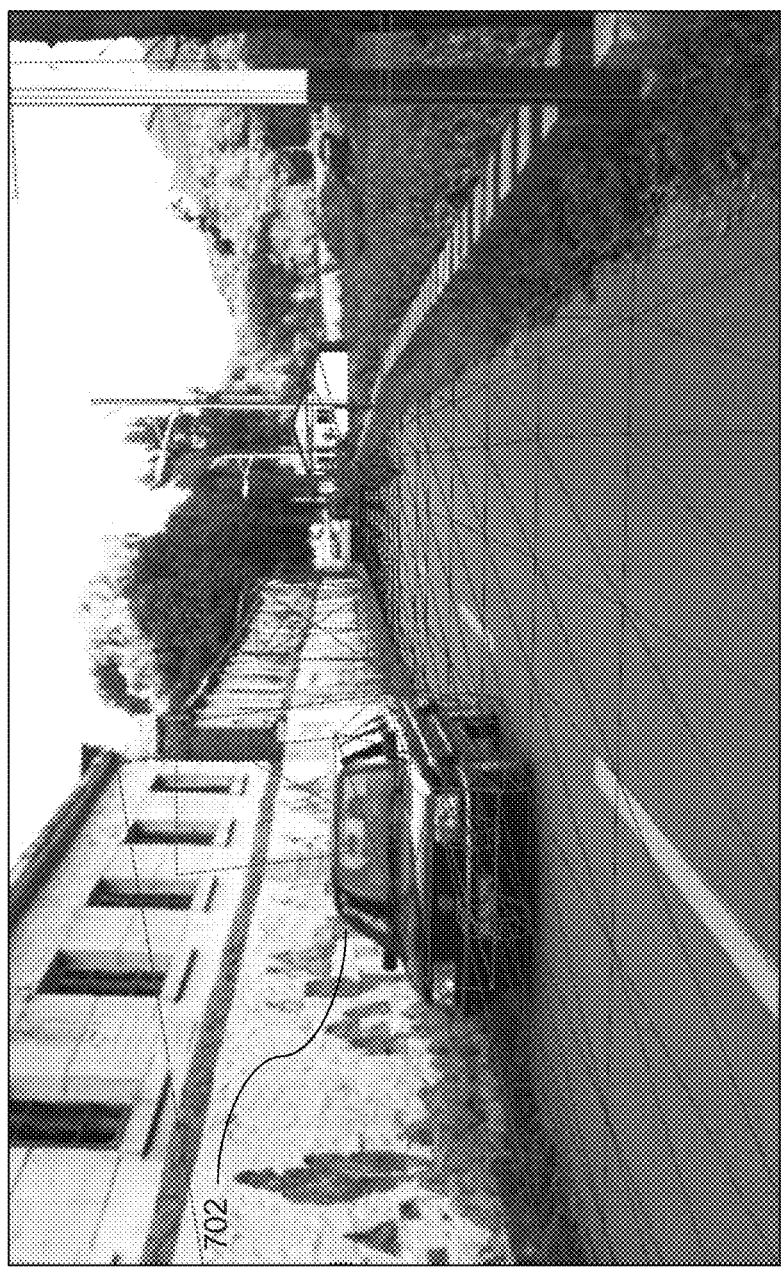
FIG. 7 illustrates a moving occlusion object set in the 3D space layer used in the preferred embodiment of the invention to depict an object that is moving in the video, in accordance with some embodiments of the present disclosure.

FIG. 7 illustrates a moving occlusion object set in the 3D space layer used in the preferred embodiment of the invention to depict an object that is moving in the video, in accordance with some embodiments of the present disclosure. As shown, a car 702 may be a transparent moving occlusion object. Thus, any object, or part thereof (in the 3D space) behind this occlusion object (car 702) may not be rendered on screen. Instead, the background layer (the portion of the video where the moving car exists) may be shown instead.

It may be appreciated by a person skilled in the art that it is possible and likely that there will be several ways to develop the rules that guide the objects to appear to move within an environment depicted in a real-world video, and the invention is not restricted to any one of these development processes, but indeed it is an object of the invention to encompass all possible development options that may result in a visual effect of characters or objects appearing to move within a landscape in a real-world video, but independent of the movement of the video.

Figure 8:
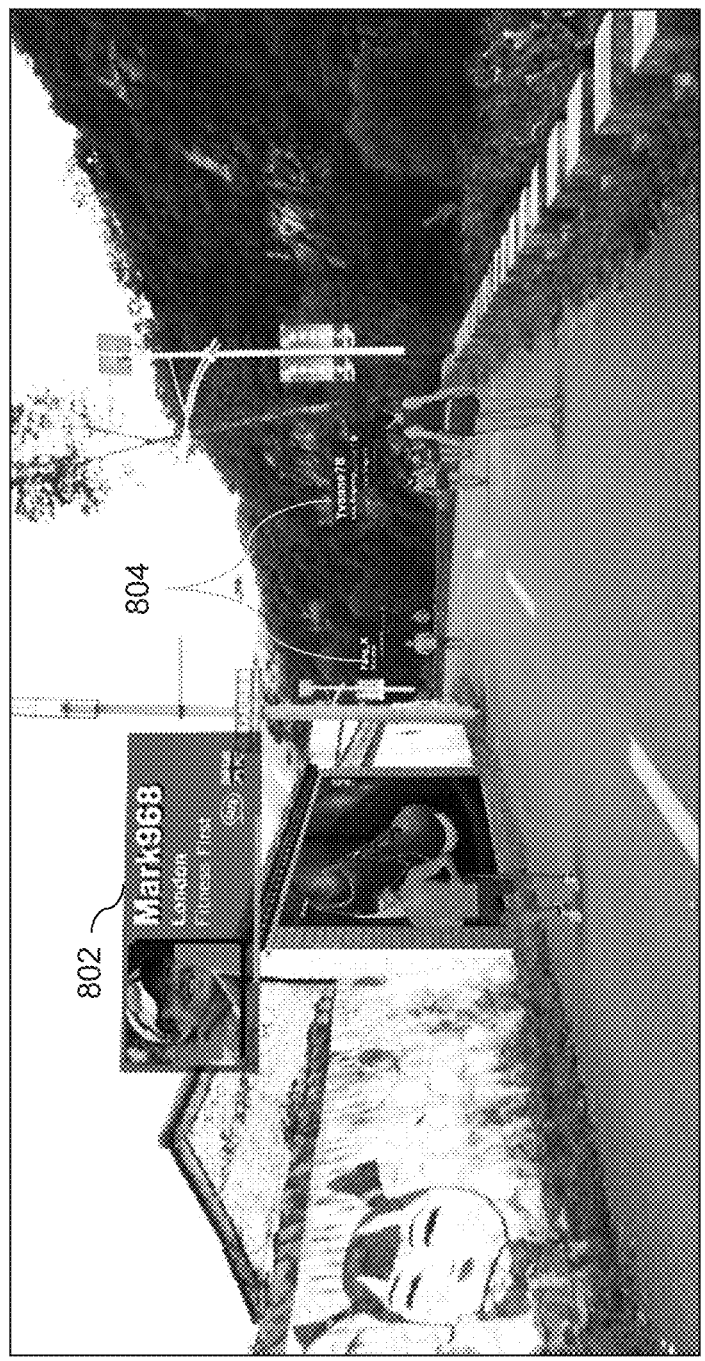
FIG. 8 depicts one visual representation of descriptions or name tags of characters interacting within a game or simulation in accordance with some embodiments of the present disclosure.

FIG. 8 depicts one visual representation of descriptions or name tags of characters interacting within a game or simulation in accordance with some embodiments of the present disclosure. FIG. 8 depicts additional functions that can be added to one embodiment of the invention. One such embodiment could be an application or game in which a single user or multiple users use the technology as a fitness application, game or activity simulation in which they navigate through the video and game environment by running, cycling, rowing or walking.

In an embodiment, within the viewer, there may be an additional layer overlaid which is an HTML browser. Within the browser, any application such as regular HTML, XML, Flash or similar technologies can be shown on screen. The layer could be used to hold menu controls and any image or video based files.

In one embodiment, as shown in FIG. 8, a function may assign descriptions or name tags to characters interacting within a game or simulation. The tags may appear just above or next to the character, and follow it on the screen as it moves to different locations.

A tag, such as a tag 802, may show an image or icon/picture of the user, a user name, the user's location (city and country, flag) based on their IP or login details, a color coded "level" bar and other information such as whether they are available for voice chat or interaction. In this embodiment, the name tags change depending on the proximity of the character within the environment to the viewer, or camera position. The full name tag 802, when a character is further away changes to a smaller tag 802 and as the distance is increased, fades away completely. The changes in appearance from the large tag to a smaller tag may be made by a more entertaining movement, such as a flip or turning motion.

The user or programmer may select whether the tags are shown on screen as large, small, a mix of the two, or not at all. The distance at which changes in sizes are effected may also be customizable. The tags may be 3D objects and the images may be rendered as textures on those objects.

Figure 9:
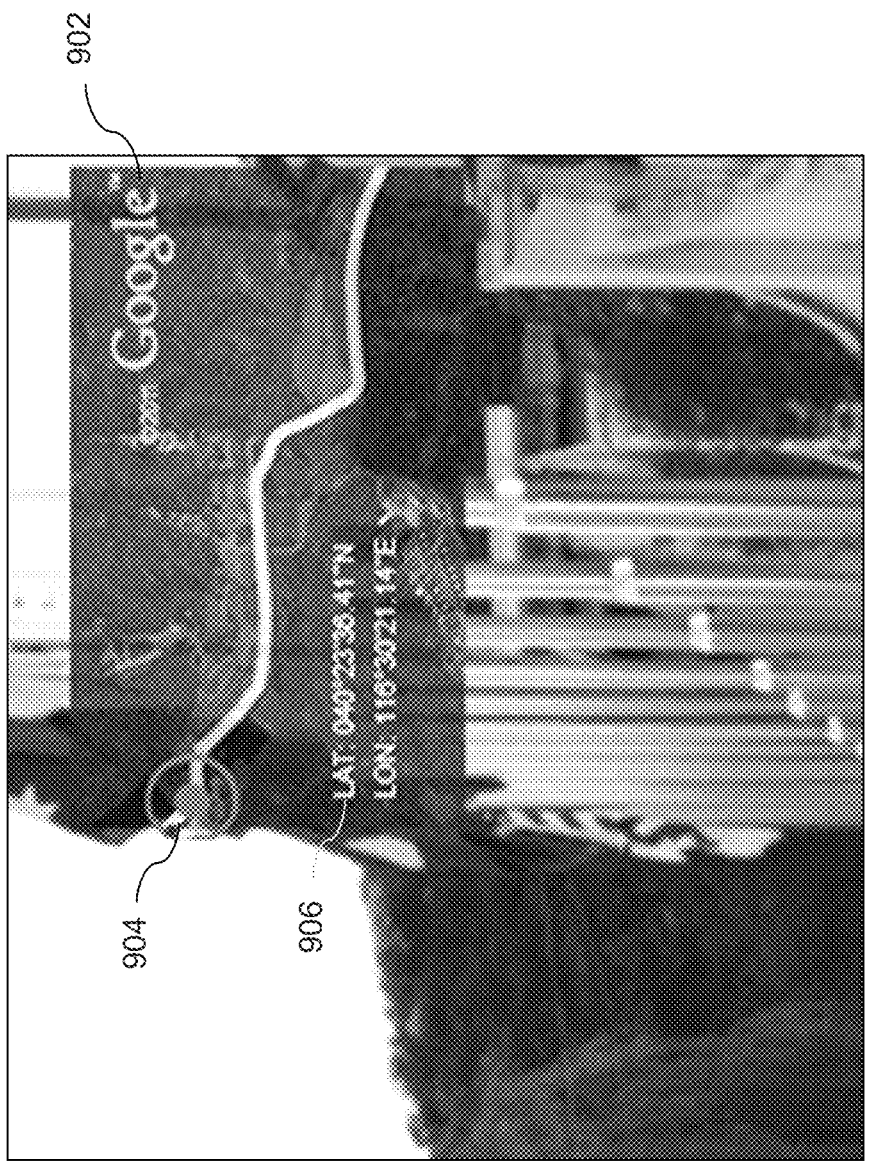
FIG. 9 illustrates one visual representation of a map using Google data for a user's activity in accordance with some embodiments of the present disclosure.

FIG. 9 illustrates one visual representation of a map using Google data for a user's activity in accordance with some embodiments of the present disclosure. In FIG. 9 one HTML browser overlay (as described in conjunction with FIG. 2) is shown. Within the browser is a Flash interactive module (explained previously in conjunction with FIG. 2) that may act as a map of the location of the game environment and may portray the actual real world location where the video was recorded. In this case a Google Earth image and video is incorporated as 902. Location coordinates from the 3D environment may be used to place the marker on that map and move it real time over the route depicted in the video 904. GPS coordinates of the real world corresponding spot can also be calculated using the movements in 3D space and resulting coordinates 906.

Figure 10:
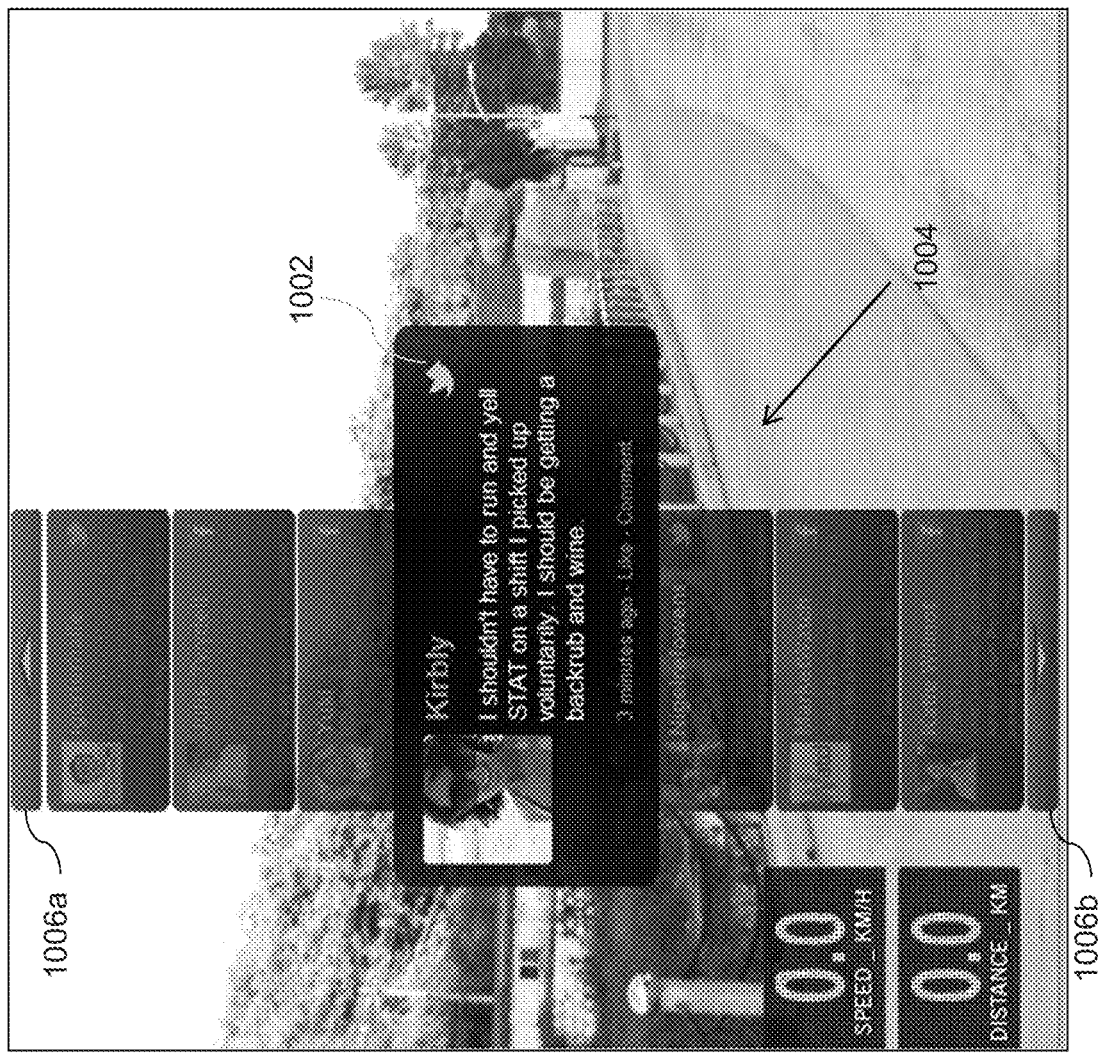
FIG. 10 illustrates one visual representation of a live, internet-connected information feed and could include RSS, SNS as well as other information in accordance with some embodiments of the present disclosure.

FIG. 10 illustrates one visual representation of a live, internet-connected information feed and could include RSS, SNS as well as other information in accordance with some embodiments of the present disclosure. In FIG. 10 another overlay is shown. The overlay may be a live, internet-connected information feed and could include RSS as well as other information. As shown, the user may be facilitated to get a live feed of social networks or from other online information pool. For example, the feed may be of Facebook and Twitter data, any other social network or indeed internet news or other information feeds. The player (user) may sign-in and the HTML overlay may be turned on by the click of a key or remote control interface. A Twitter message 1002 is shown as the main readable item. By clicking a button, or triggered by time, further items in the feed 1004 may be brought to the main window. Items may be arranged by the time they were received or by some important factor selected by the user. Navigation can be forward navigation 1006*a* or backward navigation 1006*b* to see other feeds.

Figure 11:
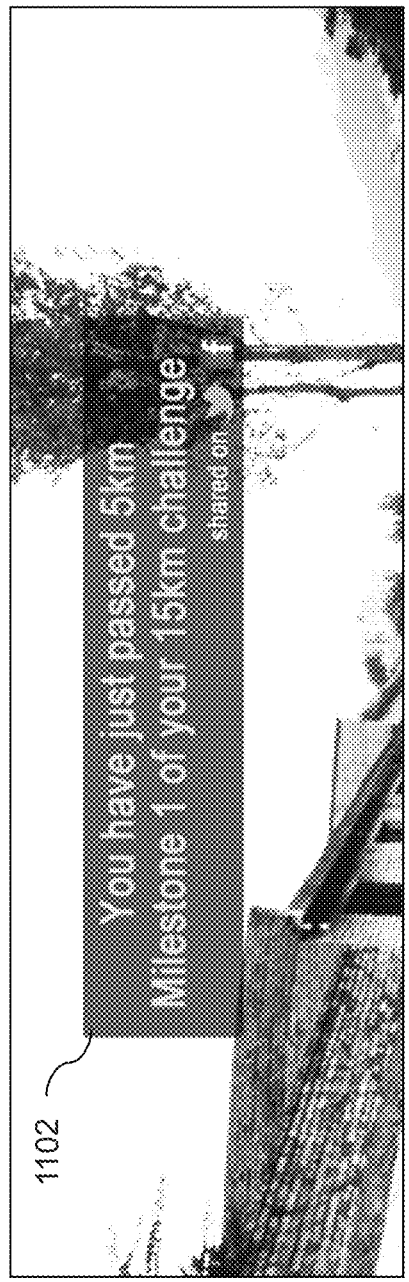
FIG. 11 illustrates one visual representation of an overlay of milestones, goals or other targets that a user has set as motivators in accordance with some embodiments of the present disclosure.

FIG. 11 illustrates one visual representation of an overlay of milestones, goals or other targets that a user may set as motivators in accordance with some embodiments of the present disclosure. In FIG. 11 an overlay may show milestones, goals or other targets that a user may set as motivators. Sometimes this approach may be referred to as a gamification of an activity, such as a fitness activity that the user may be engaged in. As shown in FIG. 11, the user has run for 5 km of a longer target of 15 km (depicted as 1102) that the user has set. The achievement of this milestone may be sent out through the internet as a Twitter message and posted as a Facebook status. Other social networks and website updates may be done automatically in a similar fashion.

Figure 12:
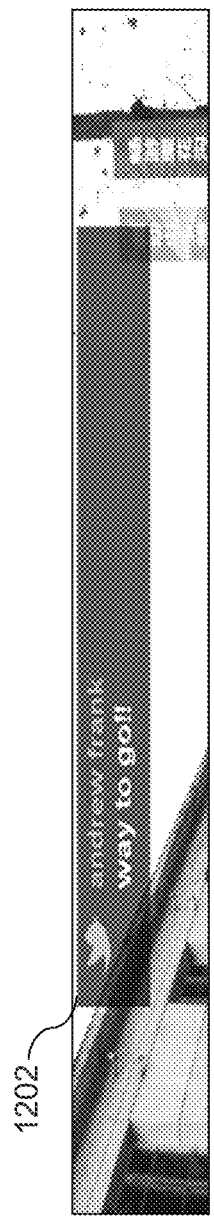
FIG. 12 illustrates one visual representation of a Twitter message from one of the receivers of the message shown in real-time during a game activity, in accordance with some embodiments of the present disclosure.

FIG. 12 illustrates one visual representation of a Twitter message from one of the receivers of the message shown in real-time during a game activity, in accordance with some embodiments of the present disclosure. As shown, a Twitter message 1202 may be from one of the receivers of the message shown in FIG. 11. The response may be rendered in the HTML overlay layer in real-time during the game activity. Other responses such as a comment in Facebook to the status update or other comments in any social network or website messages may be shown like the message 1202. Further, information such as the responder's name, icon image, text that the responder has written along with the time information can be shown.

Figure 13:
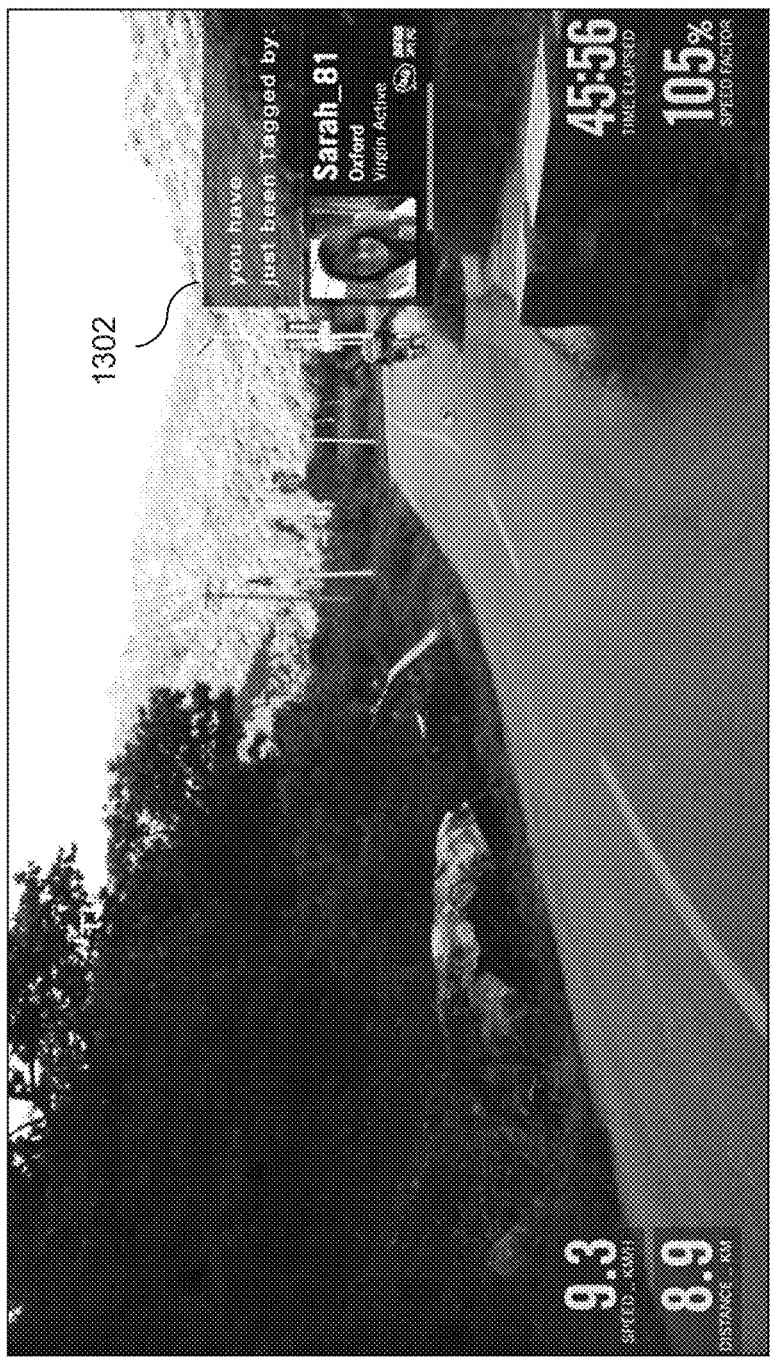
FIG. 13 illustrates one visual representation of an interactive function where users "tag" others with whom they want to interact in accordance with some embodiments of the present disclosure.

FIG. 13 illustrates one visual representation of an interactive function where users "tag" others with whom they want to interact in accordance with some embodiments of the present disclosure. In FIG. 13, a function is shown that enables interaction between users. In this instance users may "tag", such as a tag 1302, other participants during the game or simulation as they get within a certain distance from each other. Along with the "tagging" function, other interactive methods may be used, including activation of voice communications, sending of predetermined messages, or simple logging of whom the user has tagged and who has tagged the user for referencing and follow up interaction after the activity is finished.

Figure 14:
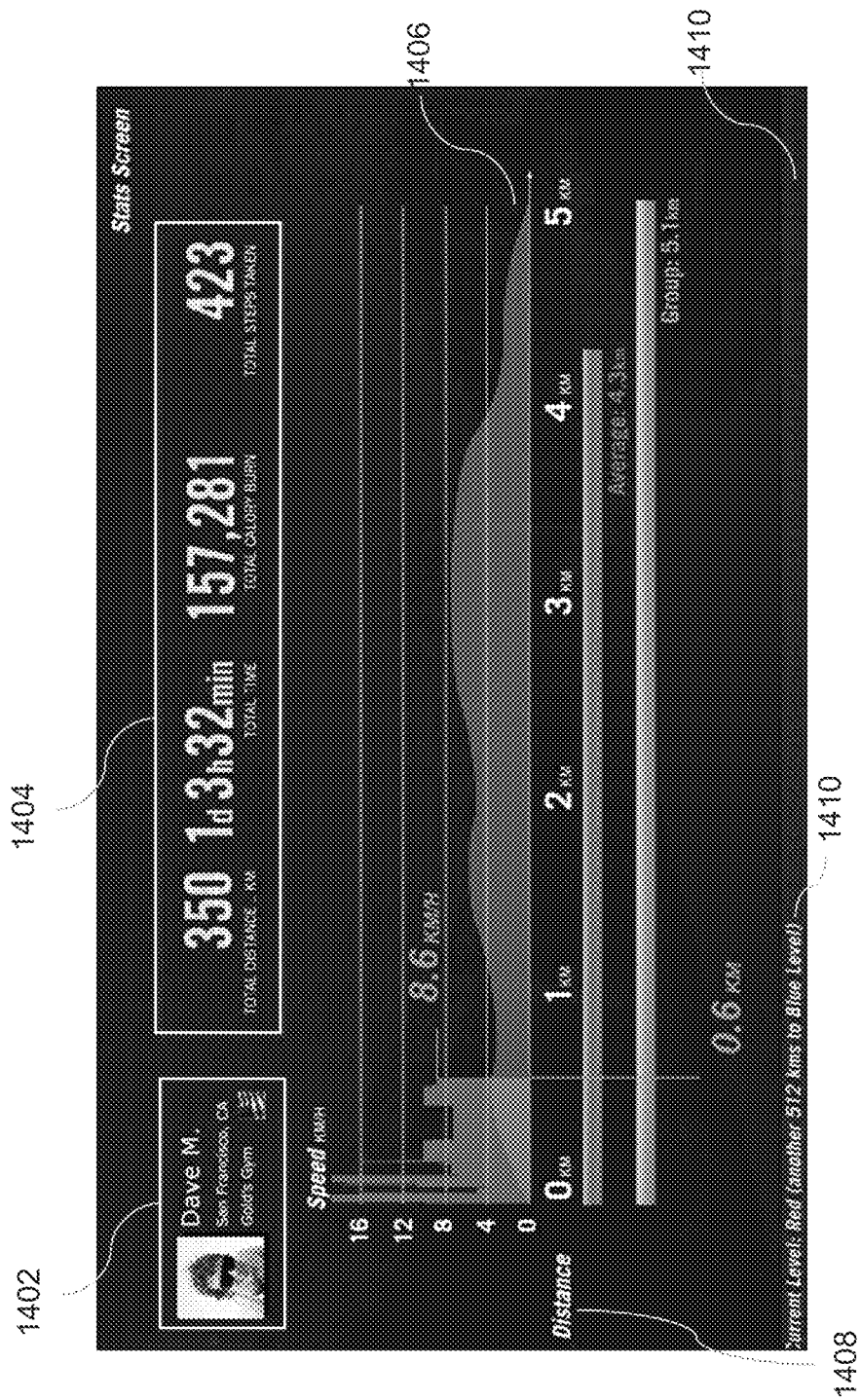
FIG. 14 illustrates one visual representation of an interactive HTML Flash module displaying information logged by the system during an activity and also comprising usage data that the user has accumulated over time in accordance with some embodiments of the present disclosure.

FIG. 14 illustrates one visual representation of an interactive HTML Flash module displaying information logged by the system during an activity and also comprising usage data that the user has accumulated over time in accordance with some embodiments of the present disclosure. As shown, an interactive HTML Flash module is shown overlaid in the viewer. The module displays information that may be logged by the system during an activity and also comprising usage data that the user has accumulated over time. The user identification 1402 may show the image icon, location based on IP (city, country flag) and if required a fitness location. Accumulated various user data may also be shown 1404 and increasing real-time during the activity. Key data such as speed 1406 may be shown both during the current game play (e.g., currently running at 8.6 km/hr) and also as the average performance over time by a peer group. Distance 1408 may also be shown in a similar way for example, currently the user has run 0.6 km. An average run for him/her would be 4.3 km and for his/her peer group 5.1 km. Further, a level color bar may also be shown 1410 indicating the total activity (in this case total distance run) by the user.

Figure 15:
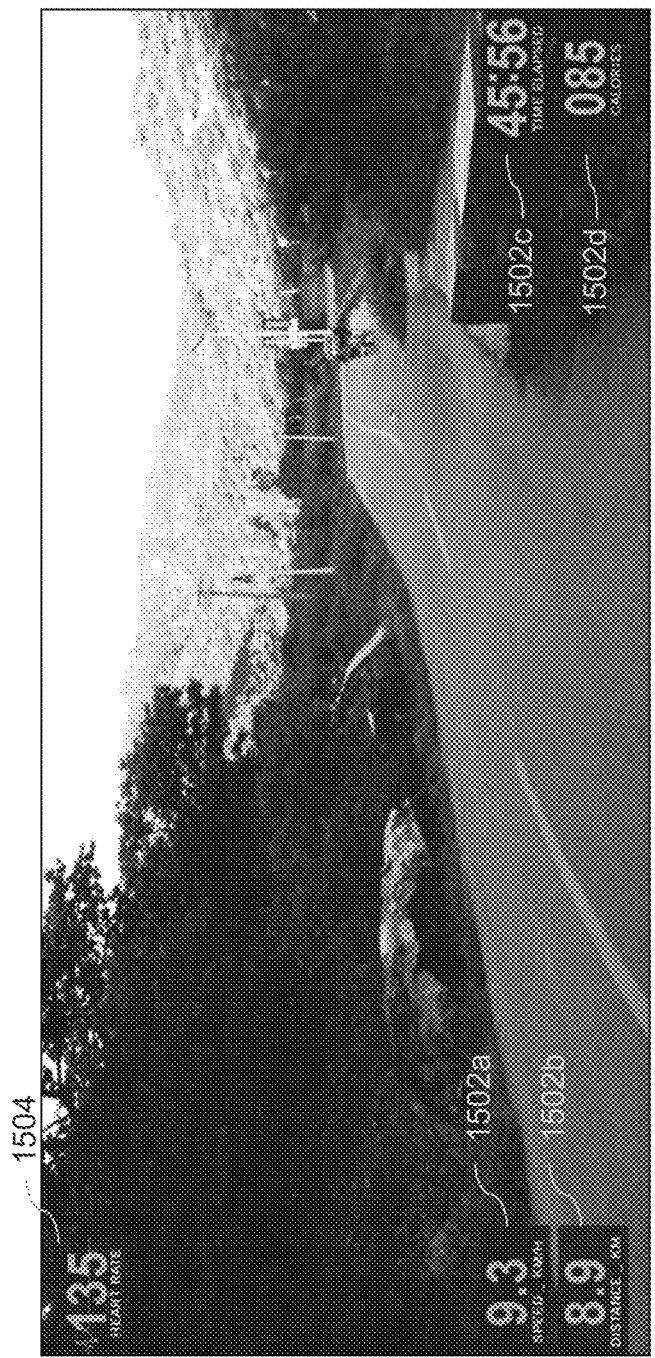
FIG. 15 illustrates one visual representation of an activity "dashboard" overlay containing key game play data in accordance with some embodiments of the present disclosure.

FIG. 15 illustrates one visual representation of an activity "dashboard" overlay containing key game play data in accordance with some embodiments of the present disclosure. Key data shown here may include, but is not limited to, Speed, Distance, Time Elapsed, and Calories (as represented by 1502a, 1502b, 1502c, and 1502d). Further, the key data may also include incline (both video incline and user current incline) a speed factor adjustment and others. Another data point is a heart rate monitor 1504 which using an external heart rate reader displays in real time the current heart rate.

Figure 16:
FIG. 16 illustrates one visual representation of the possible addition of images, videos or other visual representations to appear as if they are located in the environment depicted in the video, possibly as advertising in accordance with some embodiments of the present disclosure.

FIG. 16 illustrates one visual representation of the possible addition of images, videos or other visual representations to appear as if they are located in the environment depicted in the video, possibly as advertising in accordance with some embodiments of the present disclosure. In this example an advertising video 1602 is added, and placed so as to appear as if it is on a billboard on the wall of the building in the video. The video on the billboard will loop or play independent of the main video in the viewer. For example, even if the main video stops, the video on the billboard may continue to play.

In an embodiment, a targeted segmentation may be achieved in the choices of what videos or images shown to individual users. Choices may be made based on the user's demographic information, current login IP address and other factors. In one embodiment advertising could be shown to users who elect to have free access to a number of content videos. Images and videos shown in the 3D environment of the viewer may not limited to simulated 2D representations such as billboards. Any 3D movement may also be achieved. For example, in the video shown here of a spinning running shoe, the shoe could appear to move out of the billboard and above the road, continue spinning, then change into another image, before returning to the billboard on the wall.

Any effects that may be possible in standard video games may be added (including 3D effects) such as particle effect, liquid and fluidity effects and others.

Figure 17:
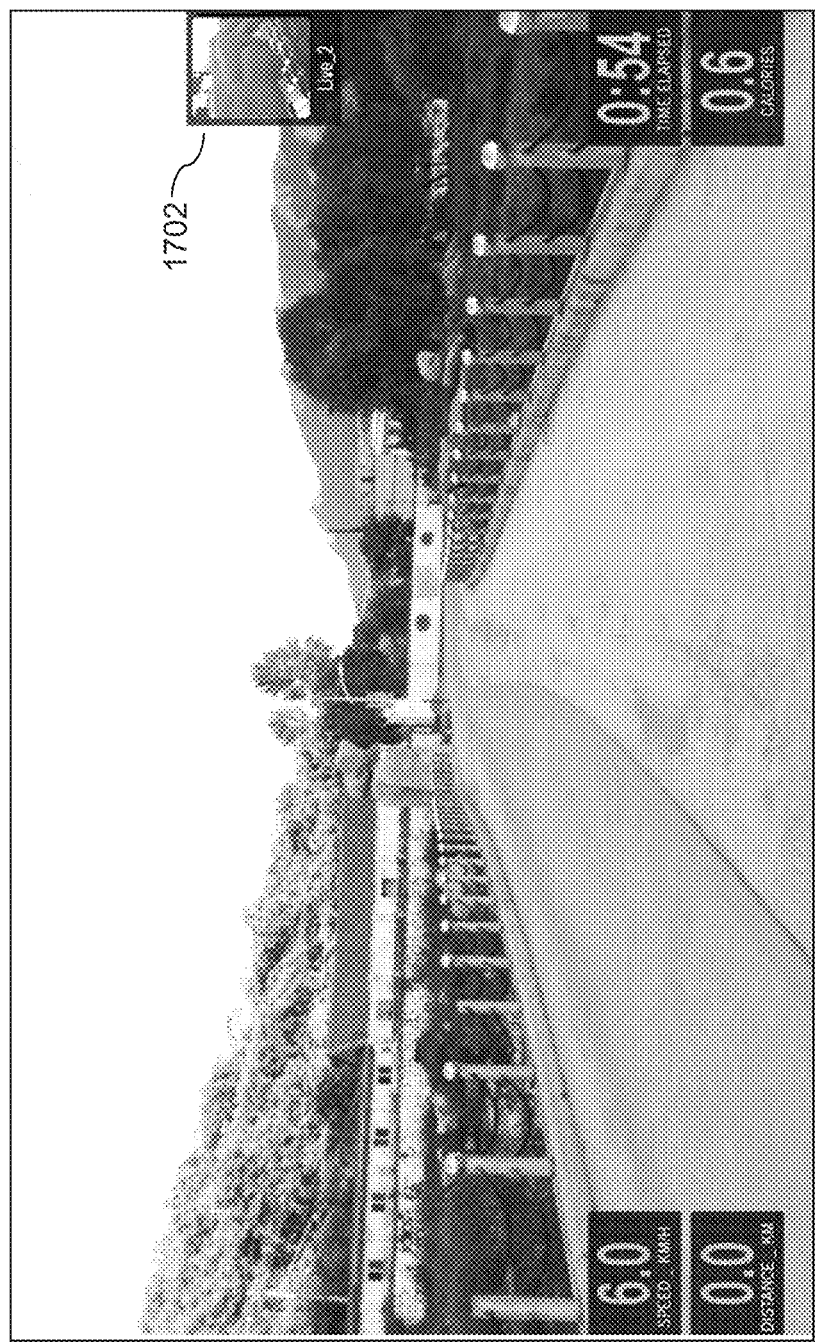
FIGS. 17 and 18 illustrate visual representations of use of live internet video in accordance with some embodiments of the present disclosure.
Figure 18:
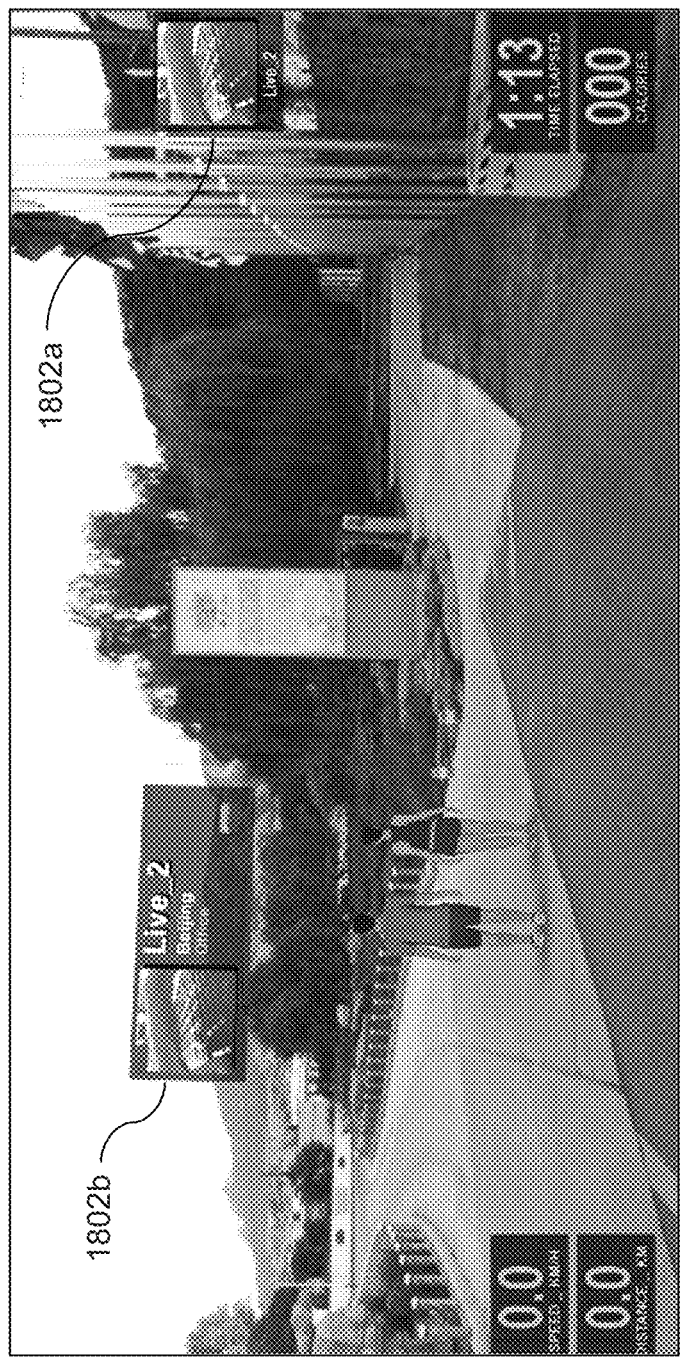

FIGS. 17 and 18 illustrate visual representations of use of live internet video in accordance with some embodiments of the present disclosure. A browser window on the viewer may contain a live video feed which may be of a location, another participant, a coach to guide the user's fitness activity or simulation or other location 1702. The video feed may also be placed in the name tag (such as tags 1802a, 1802b) associated with a character.

Figure 19:
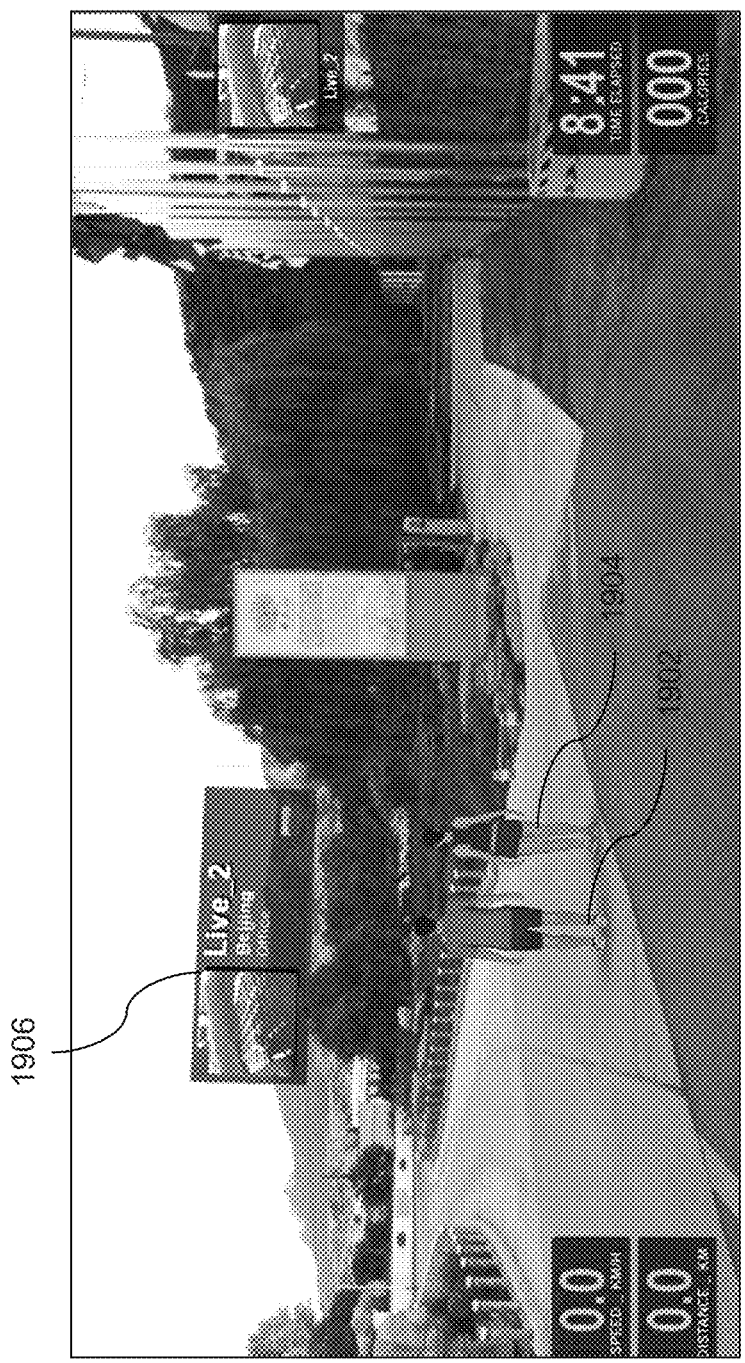
FIGS. 19 and 20 illustrate visual representations of a multiplayer mode of a game where two participants are playing together at the same time but from different locations, connected via the internet, an intranet or other network in accordance with some embodiments of the present disclosure.
Figure 20:
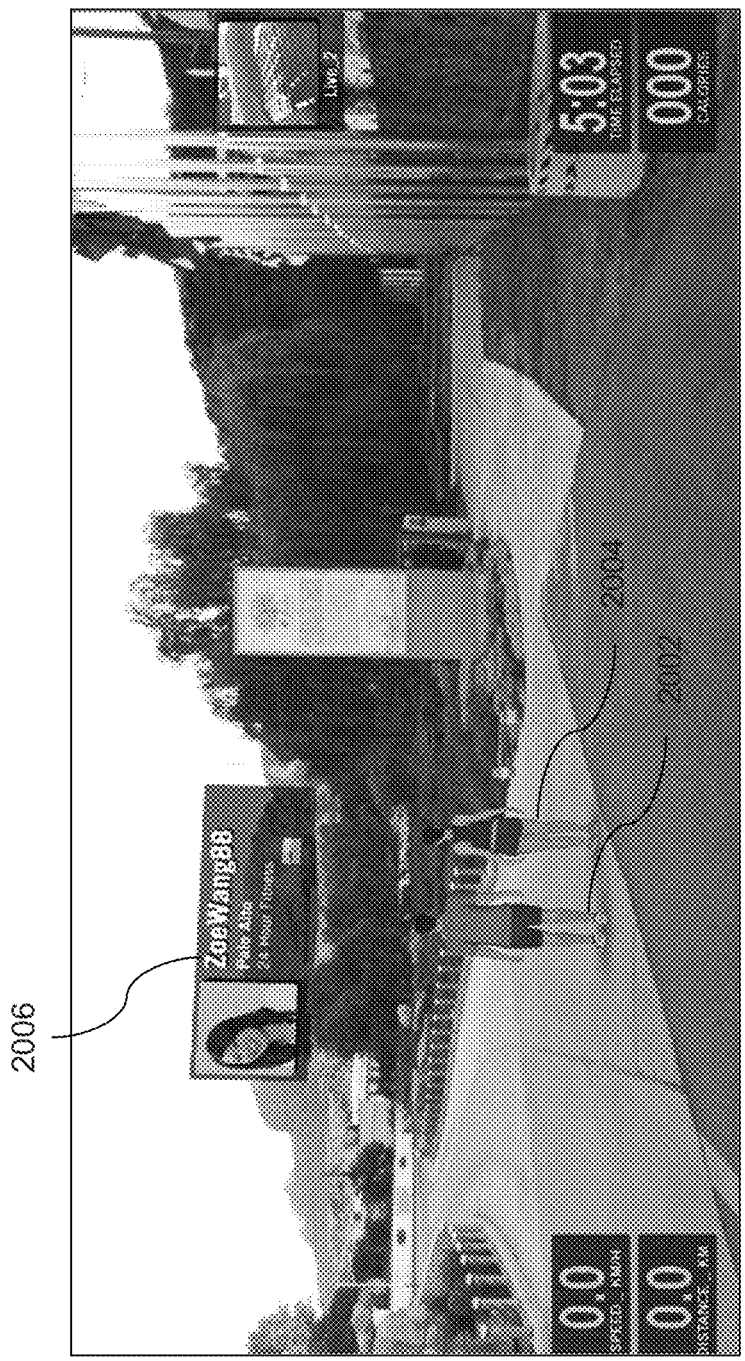

FIGS. 19 and 20 illustrates visual representations of a multiplayer mode of a game where two participants are playing together at the same time but from different locations, connected via the internet, an intranet or other network in accordance with some embodiments of the present disclosure. In this example two participants (such as a participant 1902 and a participant 1904) may be playing together at the same time but from different locations, connected via the internet, an intranet or other network. Further, the name tag of a remote player 1906 may also be provided with a live video feed.

In FIG. 20, the opposite view of avatar representations of Participant 1 2002 and Participant 2 2004 may be shown. In this example the remote player's name tag 2006 shows the picture or icon image of that participant.

As each participant moves forward through the game his or her own avatar representation will also move (walk, job, or run, depending on the speed of the participant, or potentially cycle, drive or fly vehicles or characters used in a game or simulation) and may be shown on screen at the location that corresponds to the distance travelled. The movement forward through the video shown on each respective participant's speed may reflect his or her own forward speed. If the representation of the remote participant is located in a spot that is within the view of the current view participant, that avatar may be shown on the screen, and placed in a way that may make it appear to be moving on the road shown in the video.

The video file may either be saved or accessed from the local participant's computer or other processor or may be streamed directly to that particular user. The information that may be shared between users contains data that may be needed to place correctly on screen. The information may include, but is not limited to, the remote avatar along with the remote user's identifying information (including name, location, speed, distance, X, Y and Z 3D location coordinates, avatar configuration information and other identifying data) on the screen of the "local" participant. This process may enable a more efficient use of the internet or intranet connection between users and is meant to reduce the transfer bandwidth required to send full video frames over the connected network.

Figure 21:
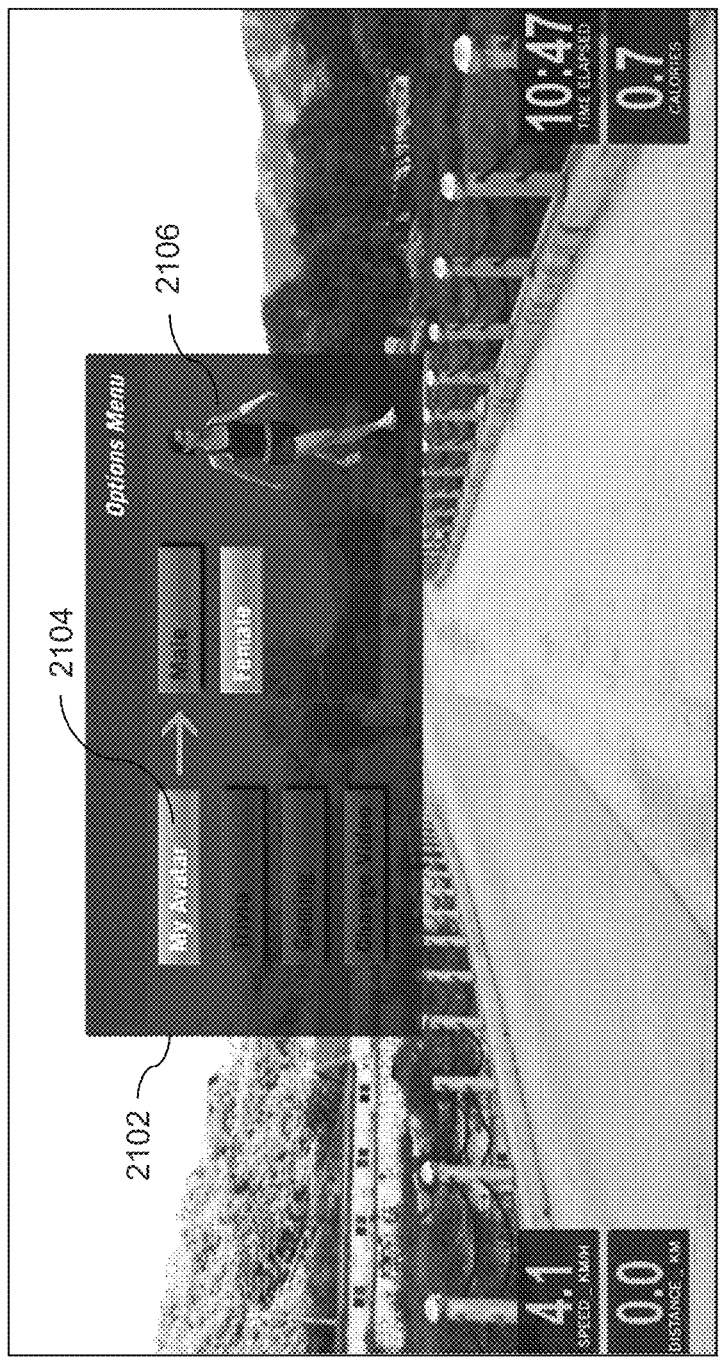
FIGS. 21 and 22 illustrate visual representations of menu screen overlays in accordance with some embodiments of the present disclosure.
Figure 22:
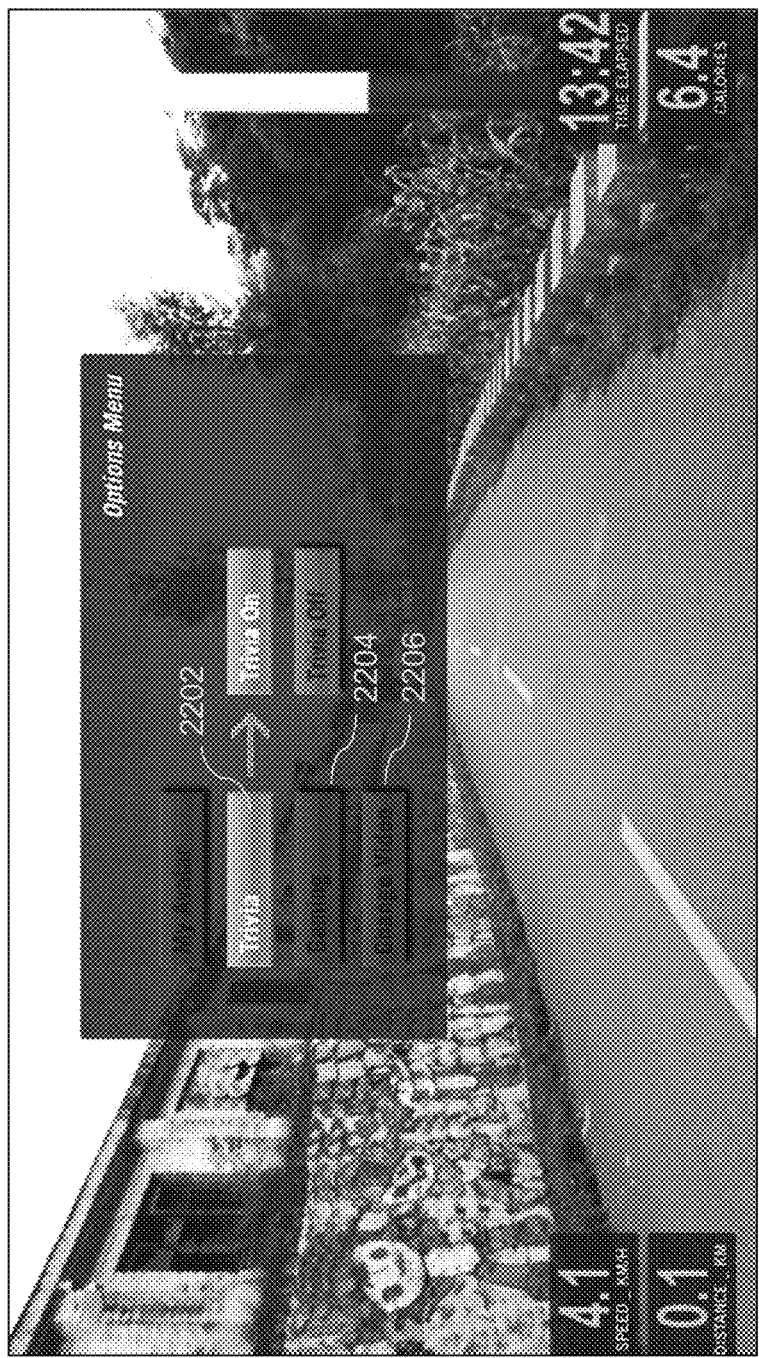

FIGS. 21 and 22 illustrate visual representations of menu screen overlays in accordance with some embodiments of the present disclosure. In FIGS. 21 and 22, two examples of a menu screen overlay are shown, as may be used in one embodiment of the invention. In FIG. 22, an HTML overlay contains images and flash video 2102 allowing a user to select their own avatar representations 2104 in a game. In this example the choice is only between a male and female representation shown as flash videos of the movements of the avatars 2106 however in other embodiments of the invention choices may include many more detailed features including body types, clothing and indeed other life forms or imaginary characters.

In FIG. 22, additional options of a menu system for one embodiment of the invention are shown. One function is a "trivia" mode 2202, where facts or quotes about a subject interesting to the user or related to the environment in the video are shown in overlays as the game or simulation progresses. The menu may allow the user to toggle this feature on or off.

Another feature highlighted in this figure is a "gaming" mode, where aspects of video games may be incorporated in the gaming 2204 or simulation. This feature could include interacting with other objects (for example chasing or hitting static or moving objects), points systems or virtual currency for achieving goals, means of sharing game features with other players, either real time or asynchronously. Many aspects of video games could be used and incorporated. It is also possible that a "gaming layer" may be used to include the same game features over multiple or different video locations. The user may be able to toggle this feature on an off using a menu system.

Figure 23:
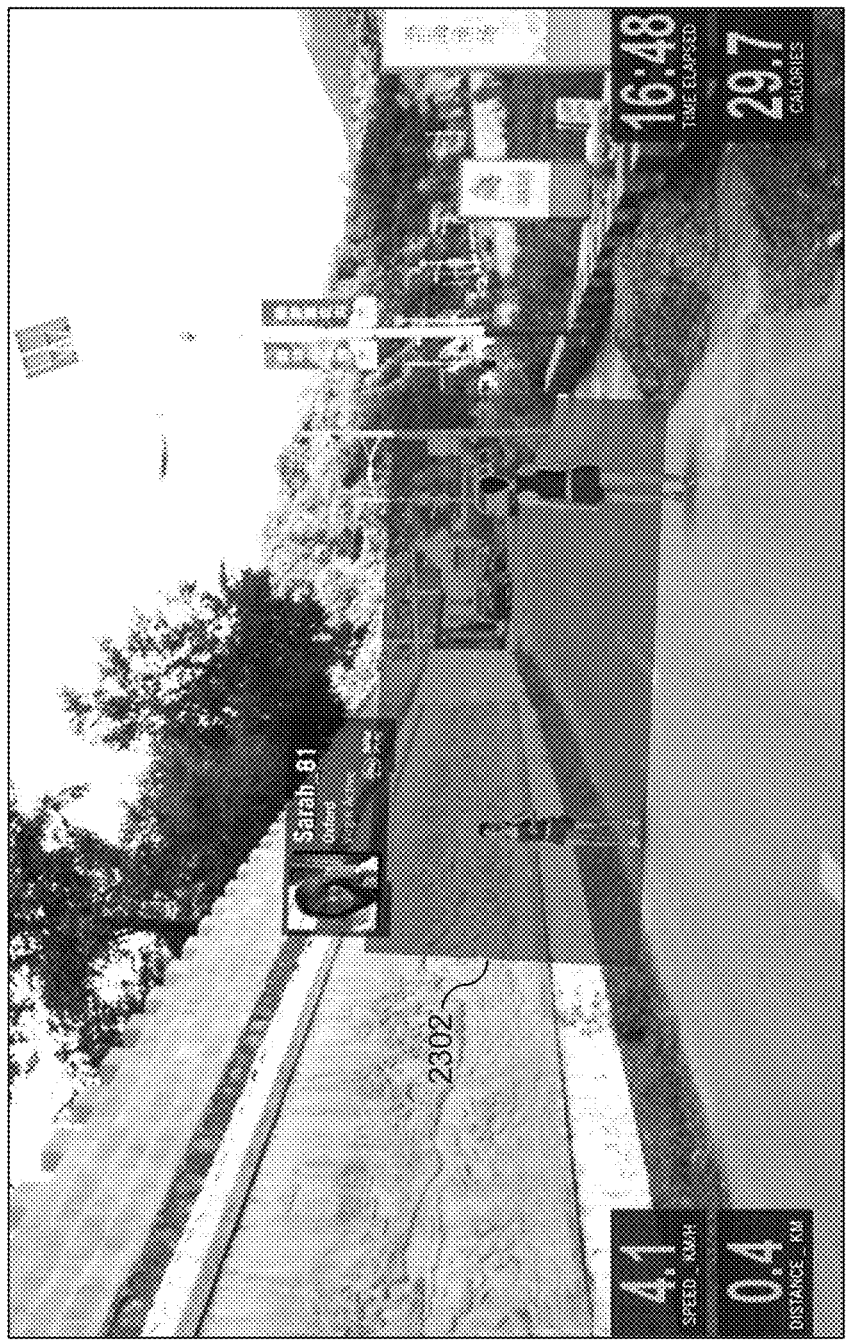
FIG. 23 illustrates one visual representation of a gateway, virtual door or "portal" which could mark a point where the video changes from one to another location in accordance with some embodiments of the present disclosure.

FIG. 23 illustrates one visual representation of a gateway, virtual door or "portal" that may mark a point (edit spot) where the video changes from one to another location in accordance with some embodiments of the present disclosure. In an embodiment, a semi-transparent gateway may mark this edit spot. On the gateway, a video (also semi-transparent), resembling moving star-like objects, 2302 may be shown. When an object or avatar "enters" this gateway, the appearance of being "transported" away from the location may be simulated. Other examples of possible gateways or portals include 3D objects that may represent gates or may be designed to look like they are part of the environment in the video. For this example, a 3D object is placed in the 3D environment in the location where the gate appears to be placed on the road in the video. The texture on that 3D object is an HTML page containing a transparent Flash move of the moving star shapes.

Figure 24:
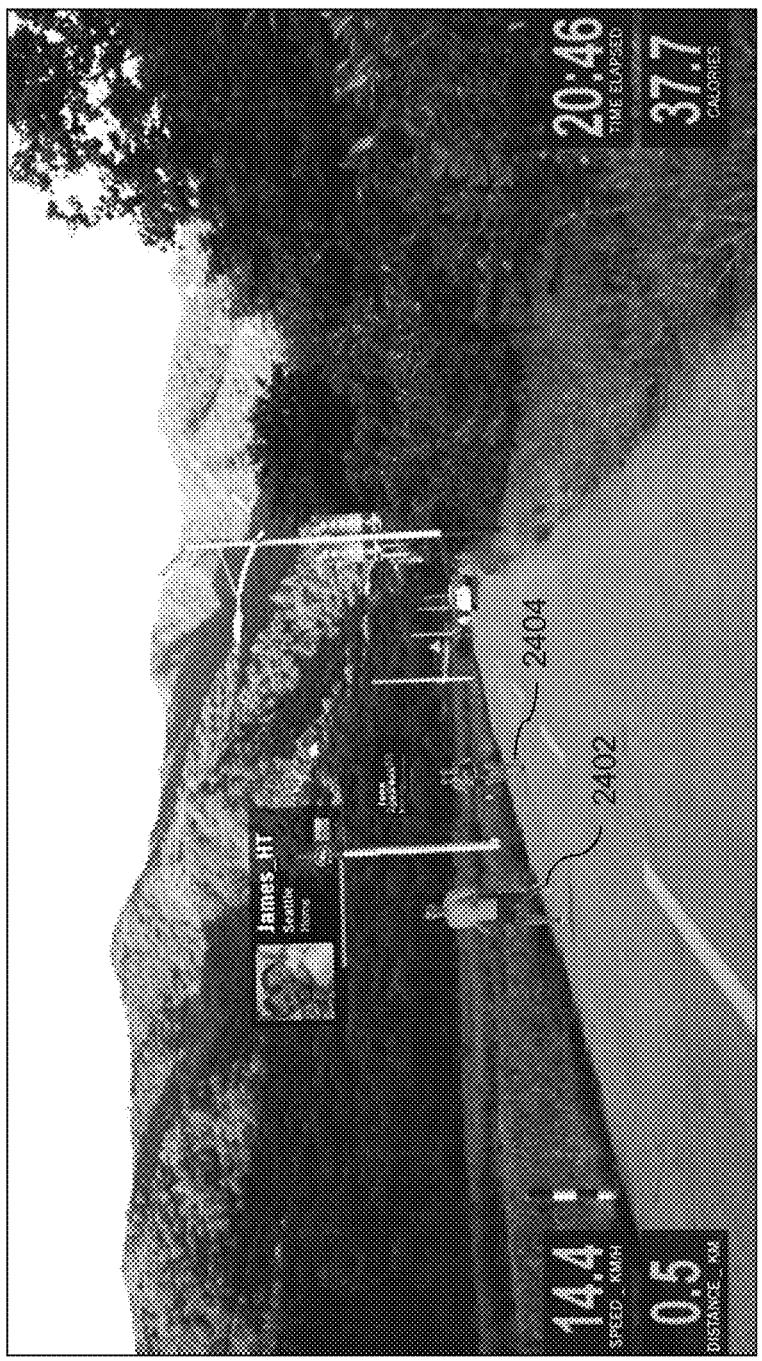
FIG. 24 illustrates one visual representation of running avatars representing users running in their own respective locations programmed to pass each other in accordance with some embodiments of the present disclosure.

FIG. 24 illustrates one visual representation of running avatars representing users running in their own respective locations programmed to pass each other in accordance with some embodiments of the present disclosure. In FIG. 24, one characteristic of a type of 3D moving object in one embodiment of the video is depicted. The running avatars representing users running in their own respective locations can be programmed to pass each other instead of running through the image of the other avatar (as depicted through avatar 2402 and 2404). The avatar 2404 may change the location on finding another avatar 2402 in the same way on the road (as explained further in conjunction with FIG. 25).

Figure 25:
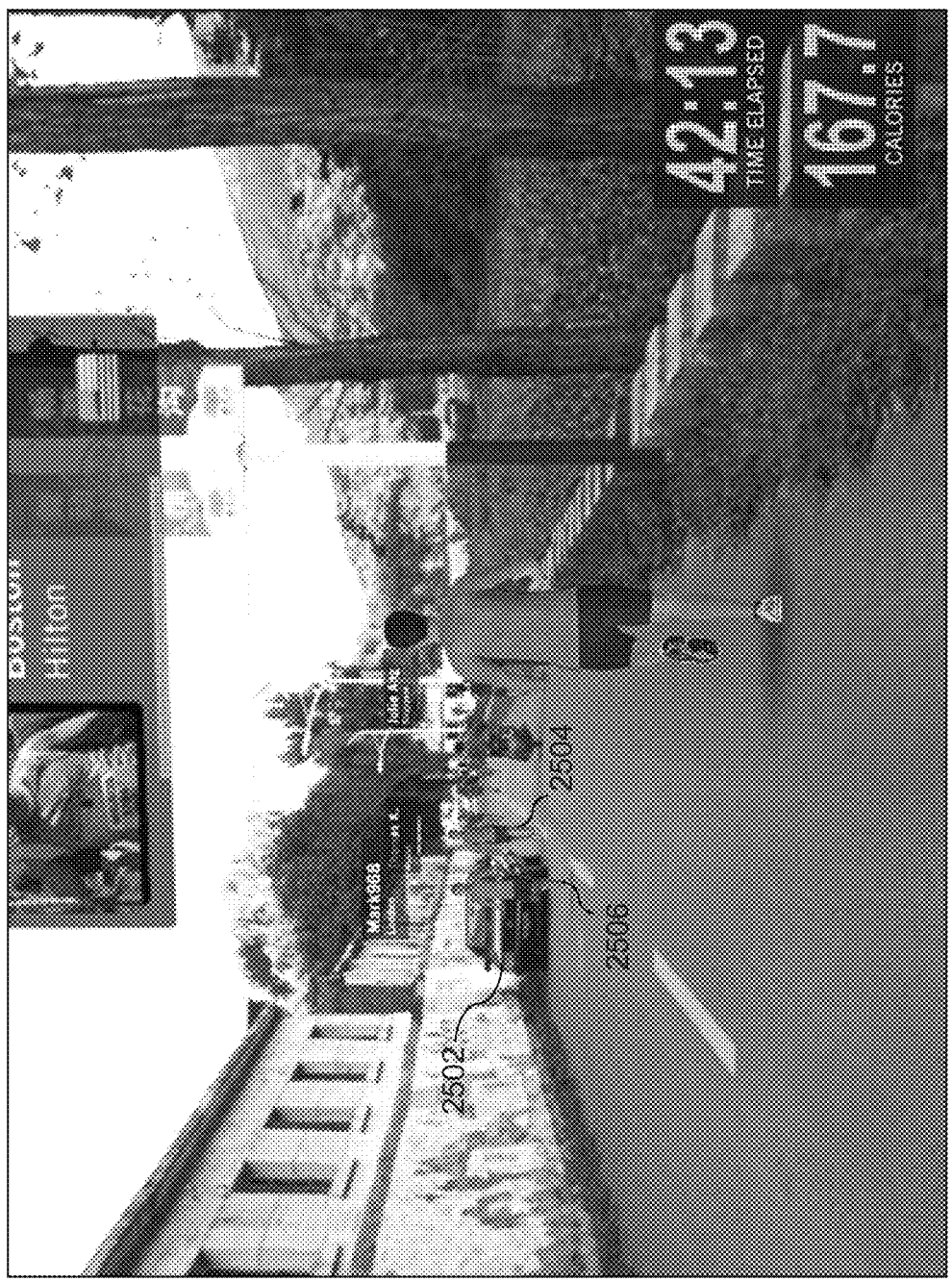
FIG. 25 illustrates one visual representation of running avatars programmed to move out of the way of moving objects in the Occlusion Layer in accordance with some embodiments of the present disclosure.

FIG. 25 illustrates one visual representation of running avatars programmed to move out of the way of moving objects in the Occlusion Layer in accordance with some embodiments of the present disclosure. In FIG. 25, another characteristic of a type of 3D moving object in one embodiment of the video is depicted. The running avatars may be programmed to move out of the way of moving objects in the Occlusion Layer (as shown in FIG. 5). The avatars may move to a location out of the way of the path of the transparent object representing the video car—or a "Safe lane" on which the avatars may continue to run out of the way of the car 2502. When the car 2502 has moved to another location, the avatars (2504 and 2506) may return to the regular, main path.

Figure 26:
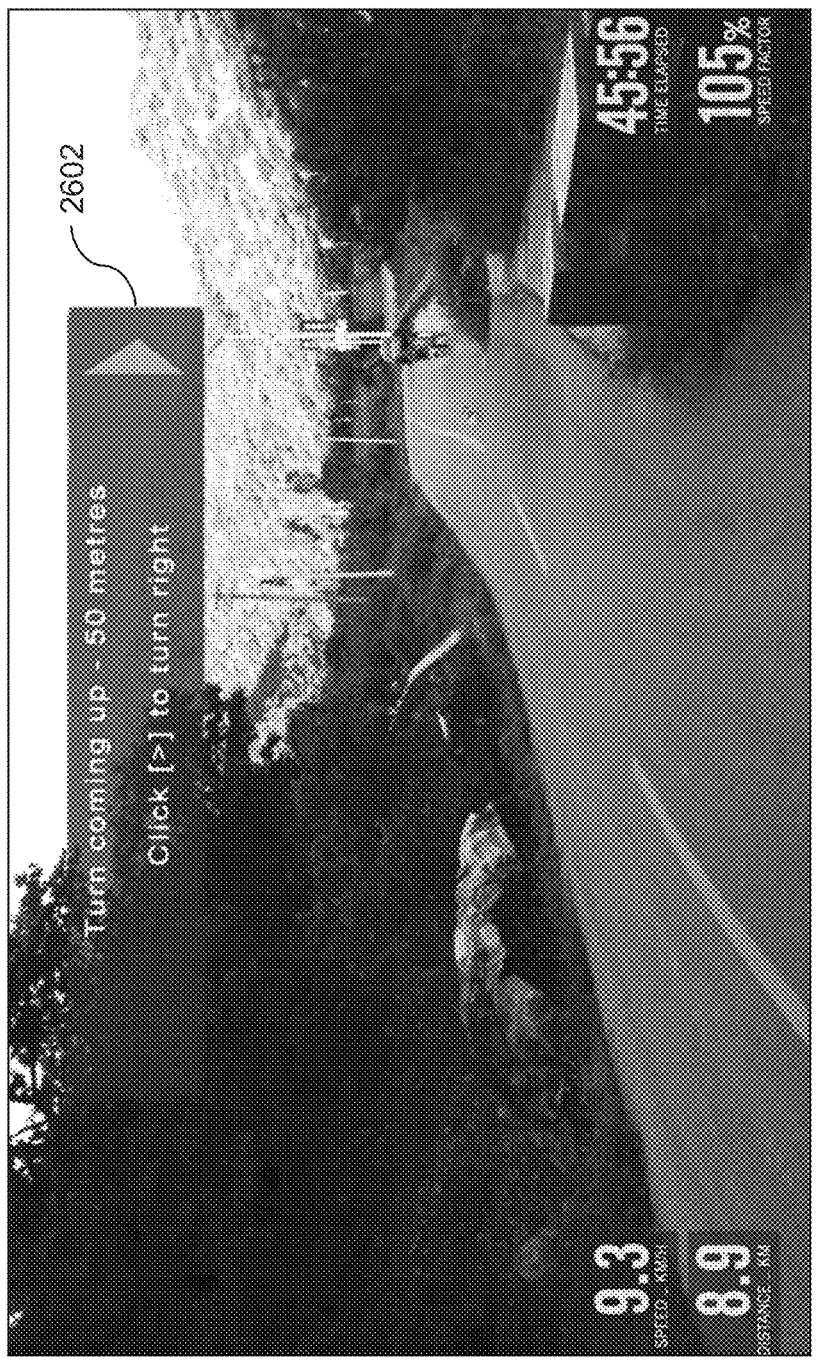
FIG. 26 illustrates one visual representation the user or player presented with the choice to change routes or to stay on the current path in accordance with some embodiments of the present disclosure.

FIG. 26 illustrates one visual representation the user or player presented with the choice to change routes or to stay on the current path in accordance with some embodiments of the present disclosure. As shown, a control 2602 may be provided to the user to change the current route by turning right after 50 meters. By clicking a button or other sensor, the user may choose a different route which may be in any number of directions or indeed a completely different location. If such signal is provided by the user, the application then may buffer video frames from a new video file that may be of the new location. Further for the best effect, the second or all subsequent location video(s) might have been recorded already to start before the respective turn(s). The effect to the user may be that he or she may turn onto one of the routes coming off the main path in the current video. Another effect may be that by using this function or technique, users could explore varying routes in a particular location.

By extending this example to a larger number of videos mapping an area an entire virtual world or gaming environment may be built, using video as the background instead of images of textured 3D assets.

Reference is now made to FIGS. 27 through 32 that may depict aspects of one embodiment of the invention that enables players, users or participants to take part in the game or simulation from different locations, connected by the internet, an intranet or other network. These users may be able to see one another's actions and interact within the viewer or game.

In one embodiment of the invention users or players may trigger the start of the application and recognition of themselves as the participants therefore bypassing the login process with an external device that may provide signal to a processor (such as the processor 106) that the participant is near the input device. The external device may be an RFID tag embedded in a key ring or card, or even a mobile phone application with a unique identifier of the user. A reader close to the input device may detect the user and automatically start up the application and run the login procedure.

Figure 27:
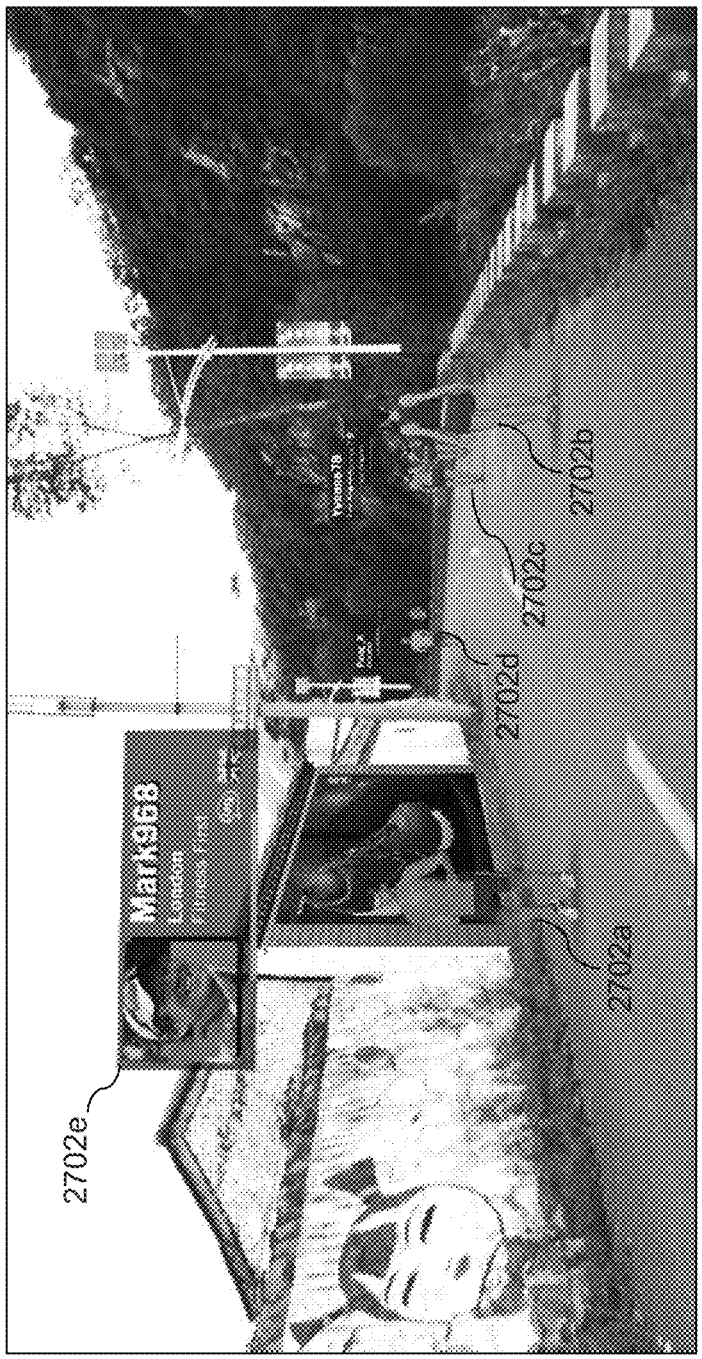
FIG. 27 illustrates one visual representation of multiple concurrent users in accordance with some embodiments of the present disclosure.

Specifically, FIG. 27 may illustrate one visual representation of multiple concurrent users in accordance with some embodiments of the present disclosure. The avatar characters shown (in FIG. 27) may each represent an individual user (such as a user 2702*a*, 2702*b*, 2702*c*, 2702*d*, and 2702*e*) at a different location taking part in a game or simulation. They may be represented to other users as these kinds of avatars or possibly other types of characters. The visual representations may also include information such as the type depicted on the name tag shown in the figure.

There may be instances where there may be too many remote users in the same environment to make the gaming experience pleasurable. In this instance the multiplayer application may split the same video or environment into multiple copies, and assign users to separate environments based on some predetermined rules. These rules could be based on users with similar interests, performance levels, or other factors.

It is also possible that the avatar representations are not real-time, "live" users, but are previous performances by live users that may be saved by the system and reproduced at later points in time. These "performances' may include "best of" performances by the main user himself/herself, or famous athletes or other celebrities. Alternatively, the performances may be guiding, "best practice" or training performances by coaches, or possible just random system-generated characters set to match the main user's level in the game or simulation.

Figure 28:
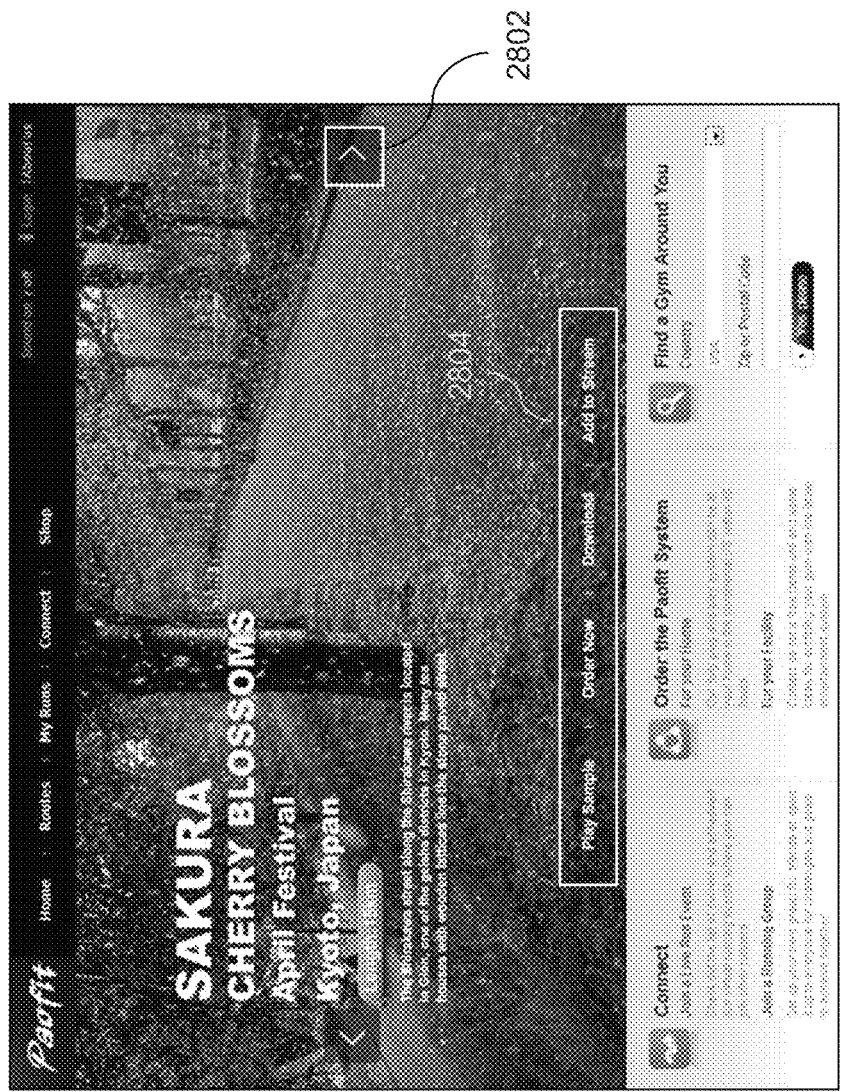
FIG. 28 illustrates one visual representation of a possible interface as a website on the internet or in a system game interface in accordance with some embodiments of the present disclosure.

FIG. 28 illustrates one visual representation of a possible interface as a website on the internet or in a system game interface in accordance with some embodiments of the present disclosure. In the interface, a user may scroll (using 2802) through different videos or locations based on images and short descriptions. The user may then be able to view a short sample, order through downloads, home delivery or through a streaming account 2804.

Figure 29:
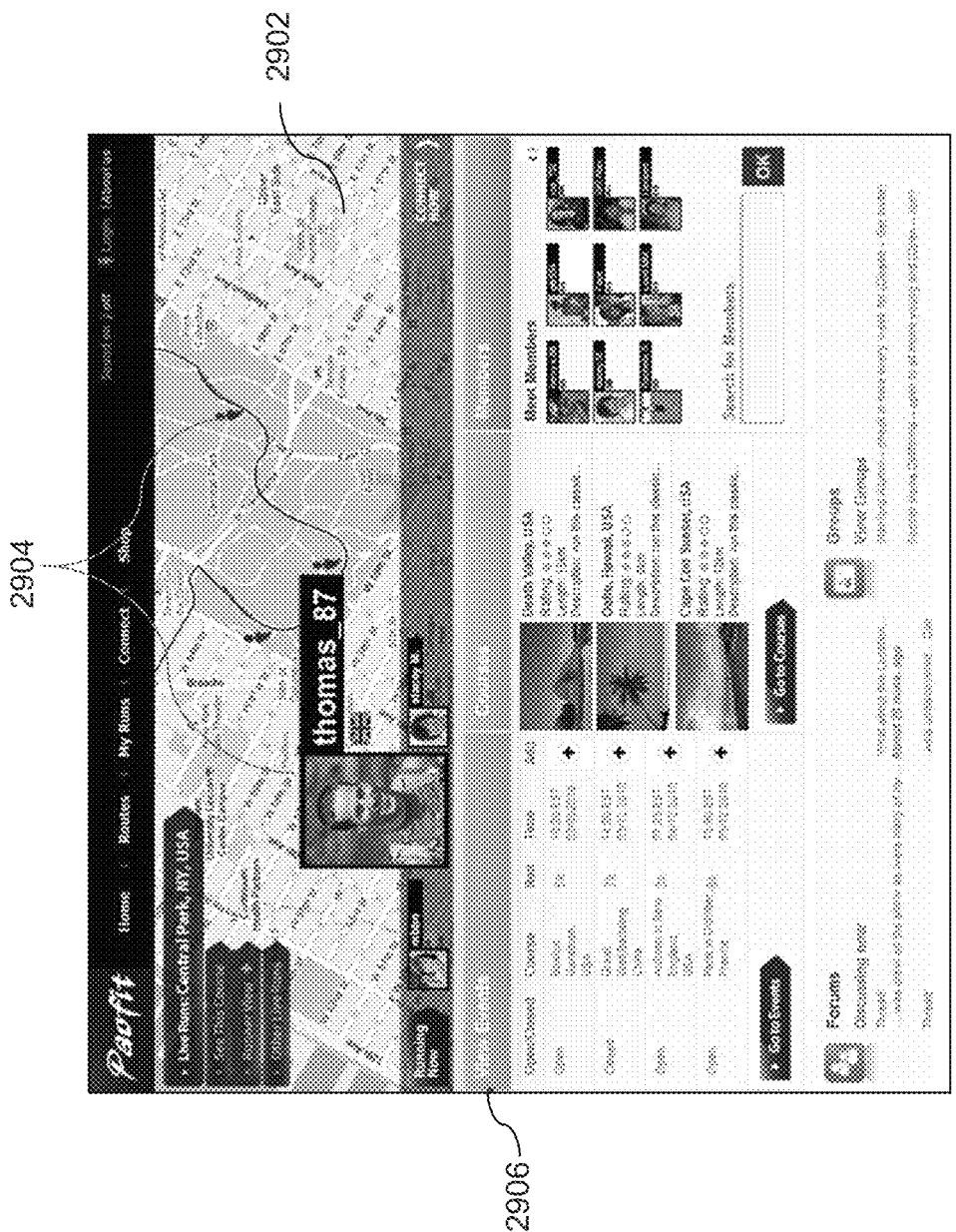
FIG. 29 illustrates one visual representation of another possible interface where users could see current "live" participants on a map of the location of the video in accordance with some embodiments of the present disclosure.
Figure 30:
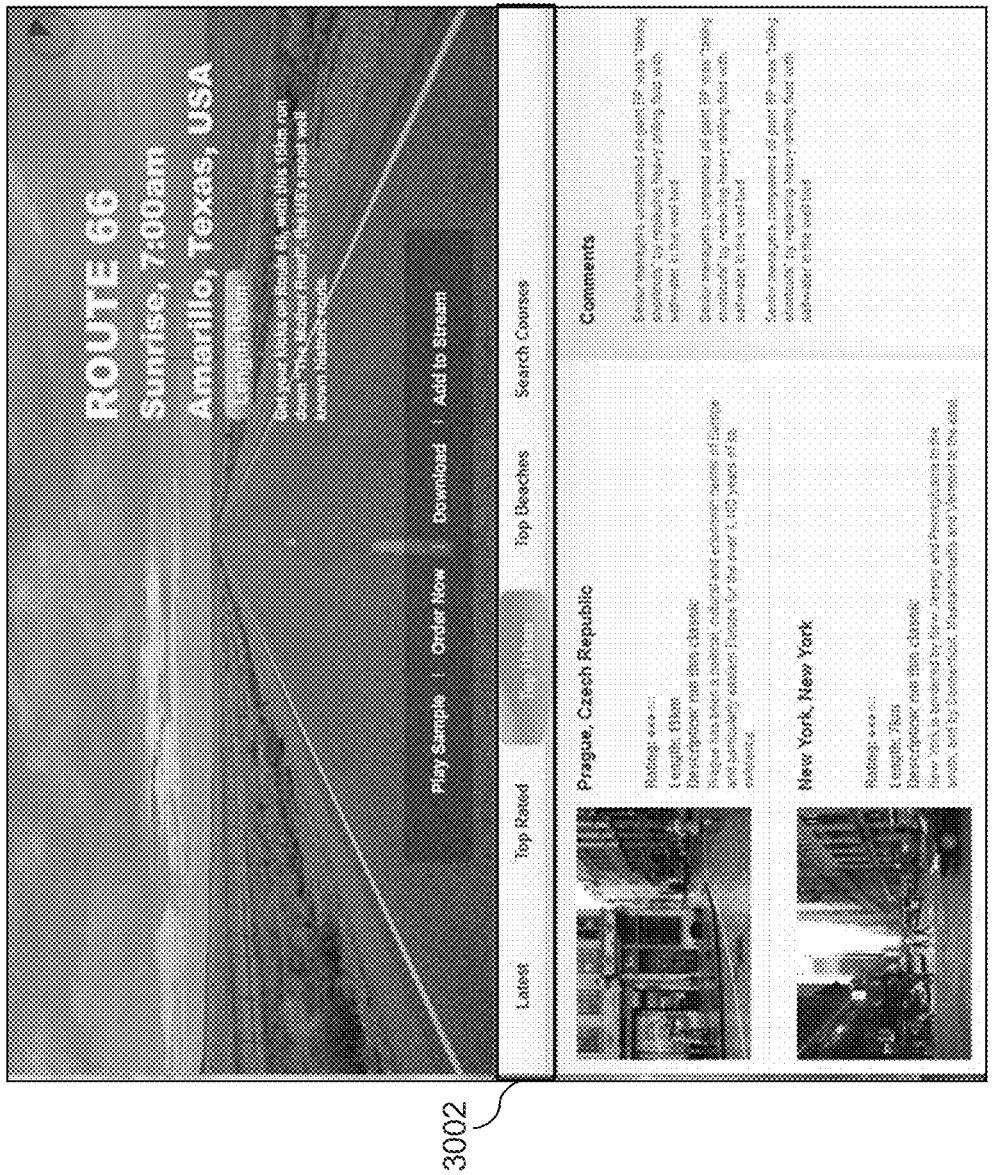
Figure 31:
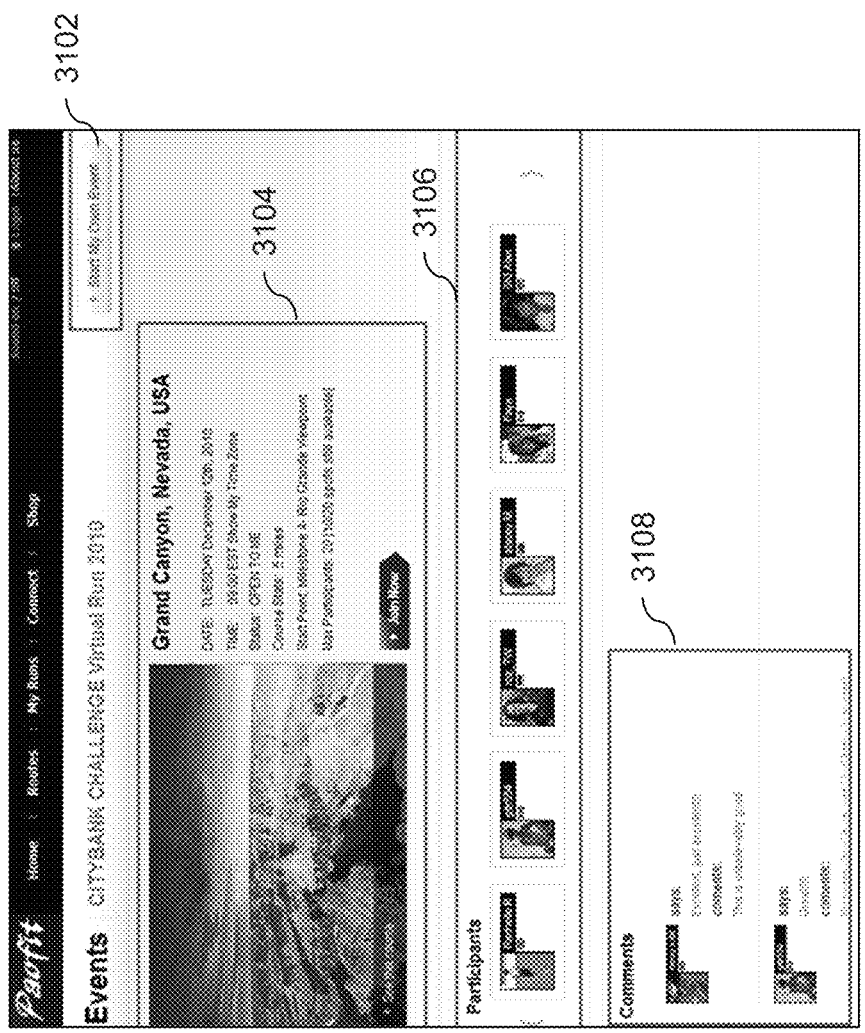

FIG. 29 illustrates one visual representation of another possible interface where users may see current "live" participants on a map of the location of the video in accordance with some embodiments of the present disclosure. On the screen, users could see current "live" participants on a map of the location of the video (in this example Central Park in NY) 2902. Selecting a user representation by scrolling or hovering a mouse over the map character may highlight and enlarge the user's image and name 2904. Other functions include a list of user or system generated events, a list of other courses that may be joined by participants (users). Further, the system may provide a list of members about which the participant (user) may find more information. The system generated events, courses and access to the list of members may be provided by a visual bar 2906.

Figure 30:
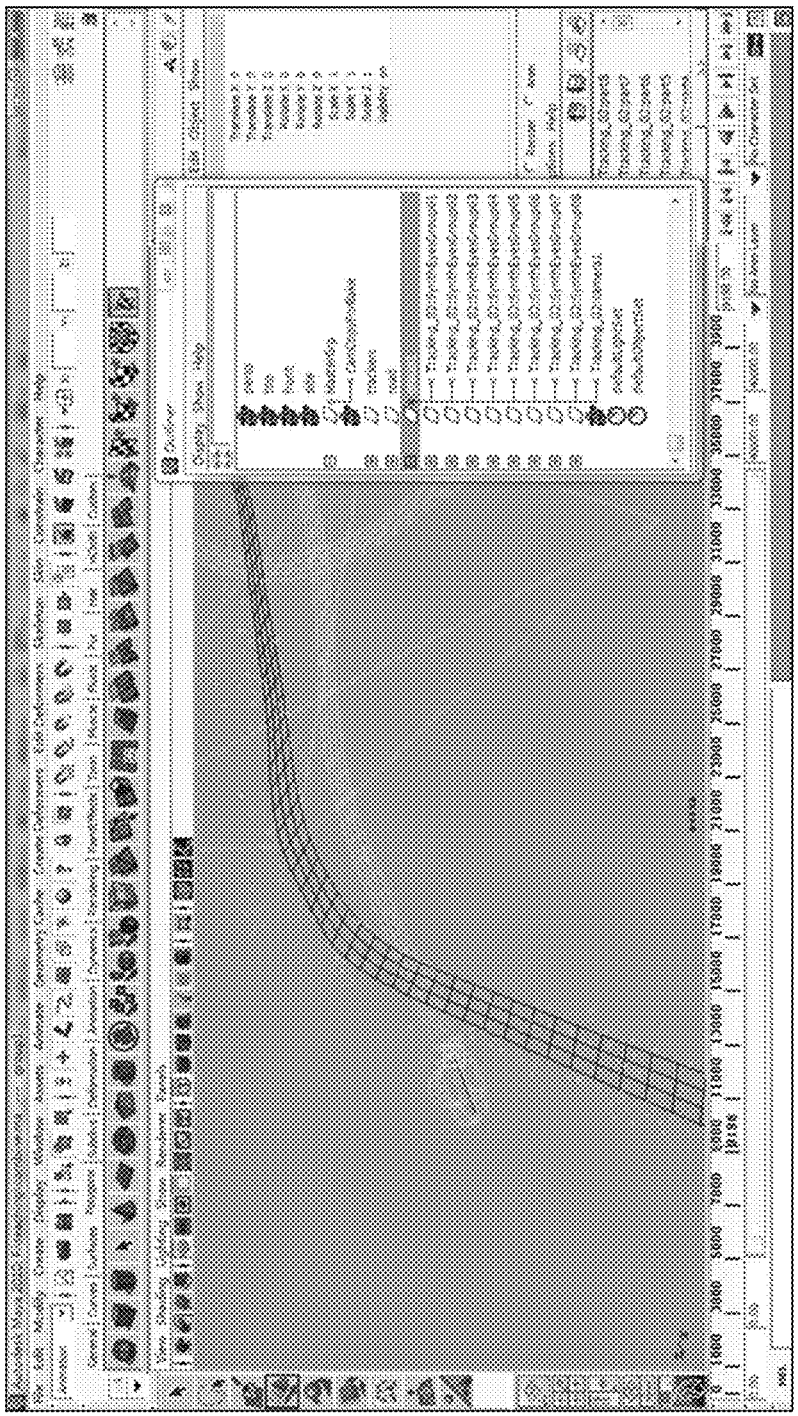
FIG. 30 illustrates one visual representation of a user interface of more information and a method of searching through videos or locations in accordance with some embodiments of the present disclosure.

FIG. 30 illustrates one visual representation of a user interface of more information and a method of searching through videos or locations in accordance with some embodiments of the present disclosure. As shown, in FIG. 30, a user interface 3002 may be shown where more information and a method of searching through videos or locations may be depicted.

Figure 31:
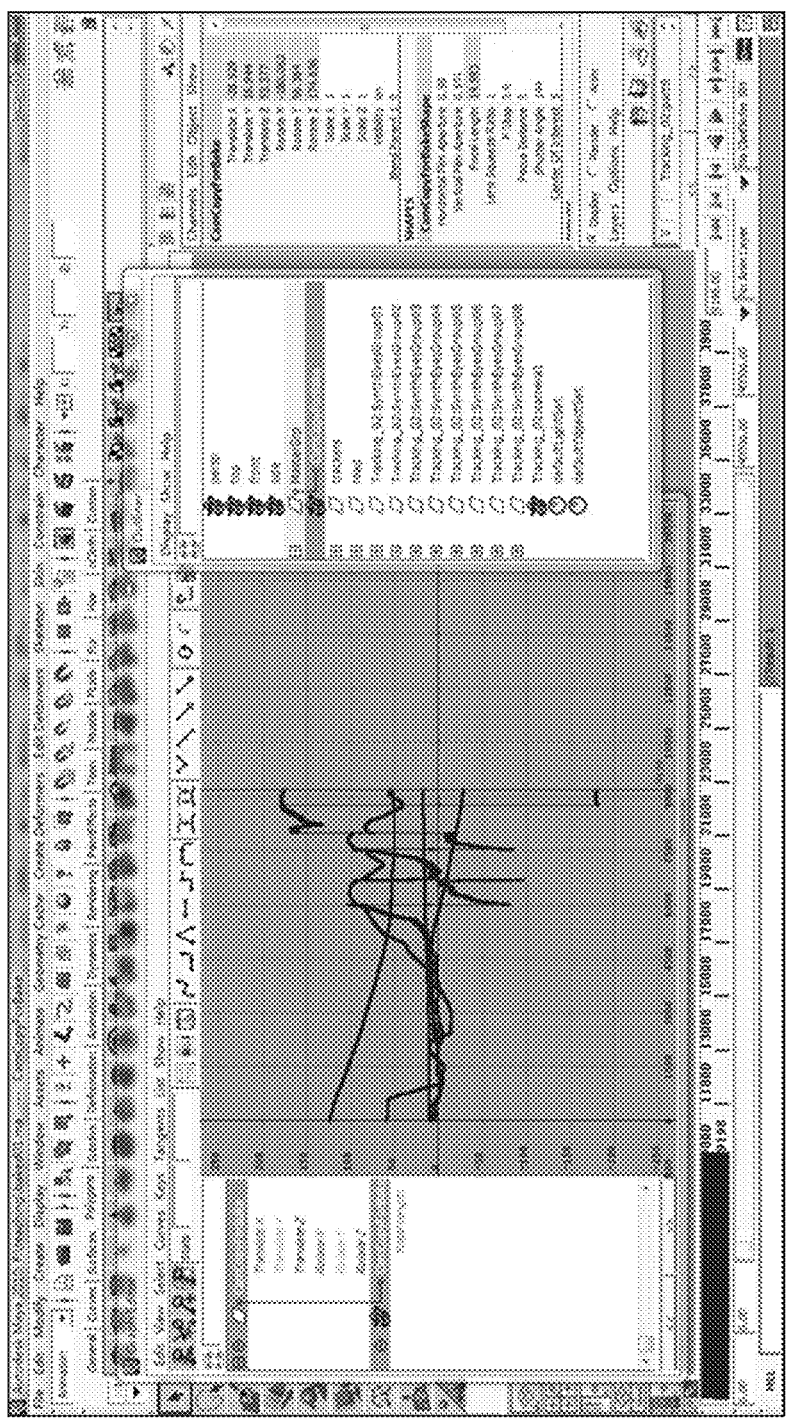
FIG. 31 illustrates one visual representation of a user interface where participants could set up an event to be joined by others in accordance with some embodiments of the present disclosure.

FIG. 31 illustrates one visual representation of a user interface where participants could set up an event to be joined by others in accordance with some embodiments of the present disclosure. In this example, a video of a location in the Grand Canyon would be a running event that participants could join on treadmills in different locations, if they are running the viewer software application. Events could be set up by individual users as well as the system administrators through a control 3102 provided in FIG. 31.

A description of the event, such as depicted through 3104, may include the location and corresponding video file, the time and time zone it is set to start, length of the course, any restraints on who could join (some aspects could be automatically deducted by the system based on the login of the user). A list of the participants who have already joined may be shown as 3106. An open comments forum 3108 may be made available either during the sign up process or after the event has ended.

Figure 32:
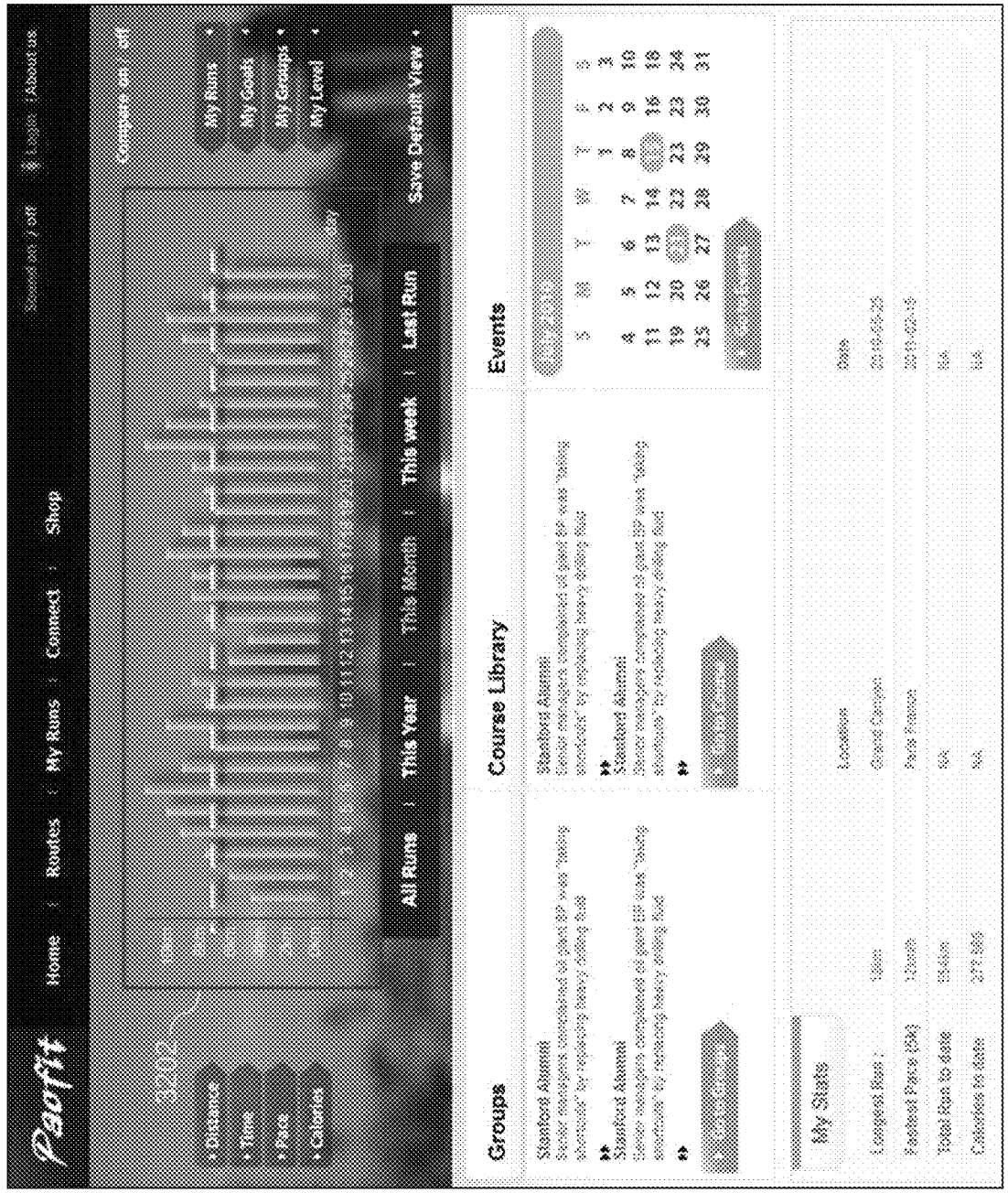
FIG. 32 illustrates one visual representation of a user interface depicting visual representations of the data that has accumulated for a participant over a period of time in accordance with some embodiments of the present disclosure.

FIG. 32 illustrates one visual representation of a user interface depicting visual representations of the data that has accumulated for a participant over a period of time in accordance with some embodiments of the present disclosure. Specifically, as shown in FIG. 32, a user interface may be shown depicting visual representations 3202 of the data that may be accumulated (by the system) for a participant over a period of time that he/she has been active with the game or simulation. The interface may be a webpage on the internet or within the system application itself.

Examples of data that can be tracked or derived by the system for an individual participant may include, but is not limited to, a distance, an average speed, a time, a pace, calories burned, number of locations, number of events or groups, "personal best" performance and others. All these data points may be tracked for each and every interaction with the game or simulation and then may be viewed and analyzed by individual performance or compiled for days, weeks, months, years or any other combination. Participant performance may also be compared with his or her own goals or targets or with the performance of peers that may be classified as, but are not limited to, age group, other group the individual has joined voluntarily and other participants of similar fitness levels.

Additionally, the system 102 may provide a competitive environment to the user while playing a game or doing fitness activities by providing one or more features to enable the user to perform one or more functionalities. For example, the user may be provided with features to add various other users in the running game or may invite other users by posting a message to join the game. Thus, this provides the user with an ability to interact with other users while playing games or exercising. The user may invite other users through one or more social networks, such as social networks 114, having the user's account therein. Further, the system 102 may enable the user to post comments, messages and receive replies, updates from the social networks 114 through the social networks 114 or through other information pool 116. The other information pool 116 may include online blogs, various websites to get information such as news, updates, posts and the like.

Figure 33A:
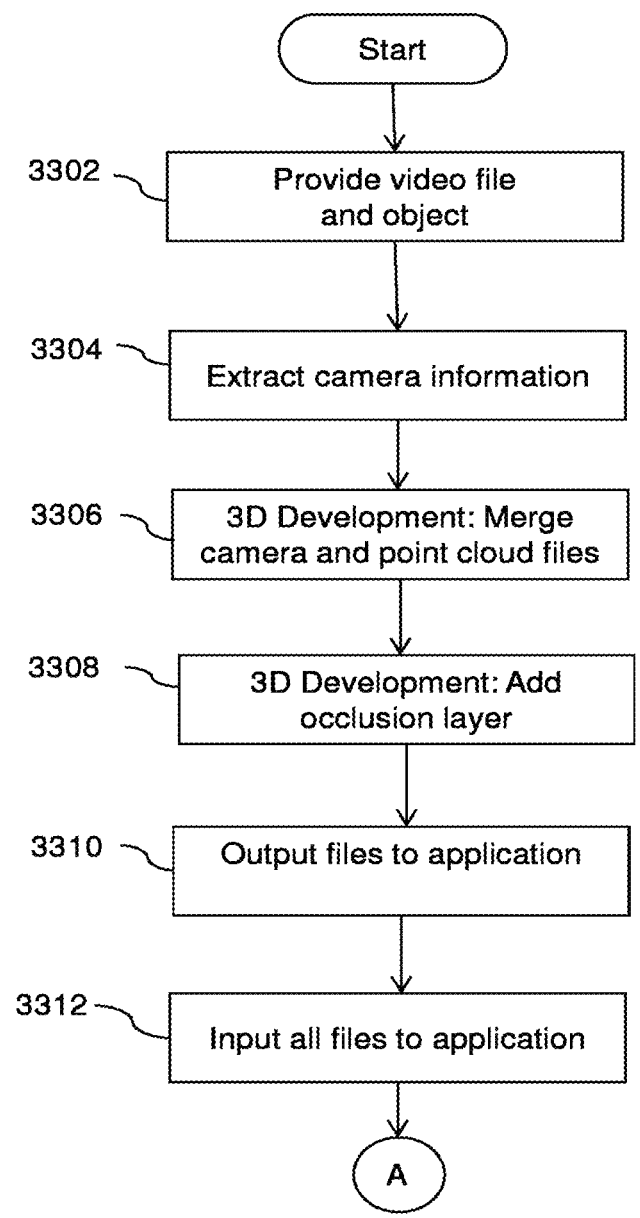
FIGS. 33A and 33B illustrate a method flow diagram used to achieve the result in accordance with some embodiments of the present disclosure.
Figure 33B:
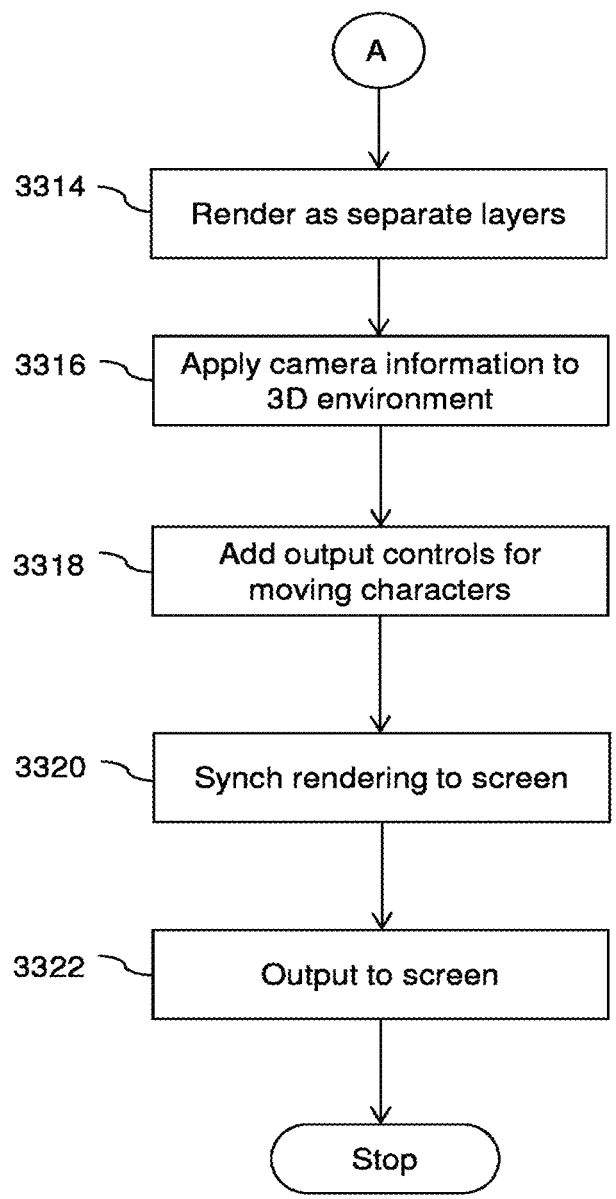

FIGS. 33A and 33B illustrate a method 3300 of visualizing synthetic objects within a real-world video clip are illustrated. At 3302, a video file and a 3D object (or 3D objects) may be provided. In one embodiment, the video file may be a recording of a real world location. Further, the video file may be recorded moving through the environment at constant or varying speeds to cover locations to be used in a video game or simulation. Further, the video file may cover significant distances. Furthermore, length of the video file may be from a few seconds to a few hours. Next, the length of the video file, and the location covered within it, may be determined by users of the video game or technical simulation.

Further, in an embodiment, the video file may be a compilation of several locations that may be used in the video game or simulation. The video file may also contain different and multiple views of the same location, which may allow players or users of the game or simulation, options during game play to choose different routes.

At 3304, camera information may be extracted from the video file. The camera information may include camera movement coordinates information, path coordinates information from the video file, and point cloud coordinates information for each frame of the video file. The camera movement coordinates information may include movement of a video camera at each frame relative to static points shown in video images. Further, the point cloud coordinates information may include depth of objects (or distance from lens of the camera) shown in the video file.

The camera movement coordinates information, path coordinates information, and the point cloud coordinates information may be extracted for each frame of the video file. Further, the camera movement coordinates information and the point cloud coordinates information may be translated into three dimensional (3D) coordinates. In another embodiment, extraction of the camera movement coordinates information and the point cloud coordinates information and translation of the camera movement coordinates information and the point cloud coordinates information into three dimensional coordinates may be performed together in a single step.

Further, the camera movement coordinates information and the point cloud coordinates information may be stored in a file. The files may be of multiple formats. In one embodiment of the invention, the format of the file may include native format utilized by the extractor module. In another embodiment of the invention, the camera information may be stored as ASCII or binary text files. The ASCII or binary text files may include frame number, "X, Y and Z" camera coordinates rotation information. The ASCII files may further include reference numbers for each point in the "cloud" along with X, Y and Z 3D space coordinates information for each respective point, in the case of "point cloud" data.

In one embodiment, the camera information may be extracted by an extractor module (not shown in the FIGS.) stored in the memory 104. In another embodiment, any other module or software application may be used to extract the camera information. Examples of possible software applications may include, but not limited to, SynthEyes, PFTrack, Boujou, Nuke, or Adobe AfterEffects. In yet another embodiment, a custom software application may be developed that may extract similar camera movement information using analysis of the movement of pixels in the video images between individual frames. Further, a sensor may be used during the recording of the video file.

In another embodiment, the camera movement coordinates information and the point cloud coordinates information may be extracted semi-manually, by visually estimating movement of the video camera at each frame relative to static points shown in the video images. For example, a technician may manually mark the same points on objects (for example, a corner of a house, a trunk of a tree), which appear in different video frames, and the extractor module may estimate relative movement of the camera between those frames.

Further, in one embodiment, the video file may be cut into smaller sections to allow accurate estimation and extraction of the camera information. Those skilled in the art will appreciate that this may facilitate solving complicated mathematical calculations related to calculation of coordinates. Further, this may facilitate utilization of some systems that may accurately calculate coordinates for a limited number of video frames at one time.

At 3306, the camera movement coordinates information files and the point cloud coordinates information files may be merged, if the video file was cut or edited into smaller clips. The merged files may represent entire route travelled and entire environment captured in the entire video file.

Further, in an embodiment of the invention, a match may be performed for points in the point cloud coordinates information and the camera movement coordinates information with respective points in the video frames for the entirety of the video file. The degree of accuracy may depend on degree of accuracy required by the final game or simulation.

In one embodiment of the invention, the camera movement coordinates information files and the point cloud coordinates information files may be merged by a developer module (not shown in the FIGS.) stored in the memory 104. In another embodiment, the camera movement coordinates information files and the point cloud coordinates information files may be merged by some other module.

At 3308, an occlusion layer may be added. In an embodiment of the invention, the occlusion layer may include a transparent 3D replica of key objects depicted in the video file. The transparent 3D replica of static features or additional static features may be built, and further existing features from the video file may be refined. In one embodiment of the invention, 3D space locations of objects depicted in the video may be automatically generated based on the point cloud information, and the occlusion layer may be automatically generated from the 3D space locations of the objects depicted in the video file. In another embodiment of the invention, occlusion layer may be automatically created from the point cloud information.

Further, in one embodiment of the invention, the transparent Occlusion Layer may be used as a guide for any 3D objects or any additional characters to appear to move within the same environment as the objects depicted in the video file. In one embodiment, if any object or part thereof which appears behind a transparent object is occluded, and its place is occupied with the video file so that the object appears to be behind the feature in the video file. For example, if a video contains a road which climbs up a hill then turns to the right past a house, a transparent 3D representation of that road, hill and house would serve as a guide to a moving avatar or character placed on a path to appear to walk up the hill, then disappear behind the house. The transparent 3D house may occlude the avatar (i.e. prevent it from being rendered on screen) when it passes behind the 3D house (i.e. further from the viewer in 3D space). Instead of the avatar, the viewer may see the background layer, which is a video image of the house. Therefore, when viewed from the correct angle, and when the 3D transparent house is aligned to fit exactly on the spot in the video frame where a house is depicted, the visual effect to a viewer may be that the avatar has disappeared behind the house shown in the video.

In one embodiment, the Occlusion Layer may also be a number of separate, individual 3D objects or sets of objects or files which have relative coordinates in the same 3D space. In another embodiment, the Occlusion Layer may include objects which change location in the real world video. Examples of these objects may include moving cars or other vehicles, people or animals or any other objects which may have movement that is different relative to the camera to the static environment shown in the video file.

In one embodiment of the invention, the moving objects may be generated as transparent 3D occlusion objects. Their relative location at each frame may be set and guidance given for their movement and rotation to match the movement of the objects they depict in the video file. The moving objects or features may be developed from the video file, and further, accompanying animation that matches the movement of objects in the video file. Further, movement paths may be generated for the moving objects. In another embodiment, 3D space locations of the moving objects depicted in the video file may be automatically generated.

In one embodiment of the invention, the occlusion layer may be added by the developer module. In another embodiment, the occlusion layer may be generated by the technician. In yet another embodiment, the occlusion layer and other moving occlusion objects that guide the on screen location coordinates for the characters may be developed using some other module, software application and technologies. For example, the 3D spatial data representing the environment in the video file may be generated at the same time as the video recording, using technologies such as LIDAR (Light Detection And Ranging), LADAR (Laser Detection and Ranging) or other motion sensing input devices or other 3D reconstruction technologies such as Microsoft Kinect or other similar processes which can generate in real time depth information of surrounding objects in an environment.

At 3310, a transparent 3D representation of the landscape (Occlusion Layer) and the moving occlusion objects may be outputted. In one embodiment, the developer module may output the transparent 3D representation of the landscape (Occlusion Layer) and the moving occlusion objects. Further, these files may be saved and outputted in any one of numerous formats. The files may include data for a size, shape and relative location in 3D space of the static and moving objects.

At 3312, the output files from the developer module, along with the video file may be inputted into a viewer module (not shown in the FIGS.) stored in the memory 104. In one embodiment of the invention, the video file(s), camera movement and rotation information, 3D "occlusion" static and moving objects, relative movement and rotation paths and any other 3D objects, characters or assets are used as input in the viewer module. In an embodiment, the viewer module may be a custom software application. In another embodiment, the viewer application may be an appropriate video "game engine" or software which allows viewing of 3D objects and the programming of rules of a game, simulation or other activity. Further, in yet another embodiment of the invention, a standard 3D development application may be used. Examples of these include Autodesk Maya, Autodesk 3DSMax, Cinema 4D amongst others.

In another embodiment, native file formats of the developer module may be directly inputted into the viewer module. In yet another embodiment, a custom file format may be written specifically for a more efficient transfer of this information to the viewer module. Hence, steps of 3310 and 3312 may be combined into a single integrated step.

At 3314, the video file and 3D objects may be rendered as separate layers. In one embodiment, 3D objects may be 3D players or avatars of users participating in a game. The different 3D objects may be shown in their correct relative location in 3D space. In an embodiment of the invention, the 3D objects may be rendered on a top layer and a video frame may be rendered on furthermost layer of the space. The transparent 3D objects and the moving objects may be visualized overlaid on a background layer of the video file.

Further, in an embodiment, individual frames of the video file may be rendered as textures on the object in the furthermost layer, and further the textures are changed at adjustable rates to simulate a standard video player. For example, the speed of changing of the texture files may be adjusted from zero frames per second (FPS) to rates of 60 FPS and higher to achieve a high rate of control over the speed of movement through the video clip. Further, sounds associated with the video file may be adjusted to change length but not pitch during any changes in the video file playback speed.

Further, the next layer may contain the occlusion layer and the other 3D objects, characters, or assets. Additional synthetic objects, static or moving, may also be added, within the transparent 3D objects representation of the features in the video file. In one embodiment of the invention, there may be additional layers in between or in front of the Occlusion Layer which serves as a location for other game features such as menus or additional information.

At 3316, camera information may be applied to 3D environment. In one embodiment, the camera movement coordinates information which was extracted from the original video file may be applied to the objects in the 3D space by the viewer module. In an embodiment, the camera information may be applied by the viewer module.

At 3318, output controls for moving 3D objects or characters may be added. The movement of the synthetic objects or 3D objects may be controlled independent from movement of the video file through the output controls. In one embodiment, external controls for the movement/changing of the video frames or movement of the characters or 3D assets of the game or simulation may be incorporated. In an embodiment, the output controls may be added by the viewer module.

At 3320, the video file may be synched with the 3D objects or moving characters. In one embodiment, the 3D space camera movements may be synched to match the movements of correct frames from the video clip. The video file and the 3D objects may be rendered on screen in separate but synched layers, in the 3D environment. In an embodiment, the video file may be synched with the 3D objects by the viewer module.

Further, an HTML browser layer may be displayed on the same screen. Furthermore, placement of objects containing advertising images, objects or video files may be placed in a way that gives appearance that they exist in the environment depicted in the video file. In an embodiment, the video file and 3D objects may be rendered by the viewer module.

Furthermore, features or functions may be added that may allow objects resembling doorways or portals to be placed in a way that gives the appearance that they exist in the environment depicted in the video file and that these doorways or portals represent a change in location in the video file.

Further, video game functions may be added that may be used over the video file. In an embodiment, the video game functions may include point systems, characters, and sound effects. Further, the video game functions may include function for allowing the background video or video file to be changed if the user chooses to change the direction of the route and in the process a large, virtual world can be built in which the background is video, not images or textured 3D objects.

At 3322, output may be presented on a screen. In one embodiment, the 3D layers may be rendered as 2D output to a screen for the participating user of the video game or simulation. In another embodiment, the output of the viewer module may be 3D stereoscopic on an appropriate viewing monitor. The 3D objects or synthetic objects may appear to exist or move within the landscape depicted in the video file for a participating user or viewer of a simulation or video game. Further, the synthetic objects or characters may be controlled independently by a player, user or other controlling devices.

Figure 34A:
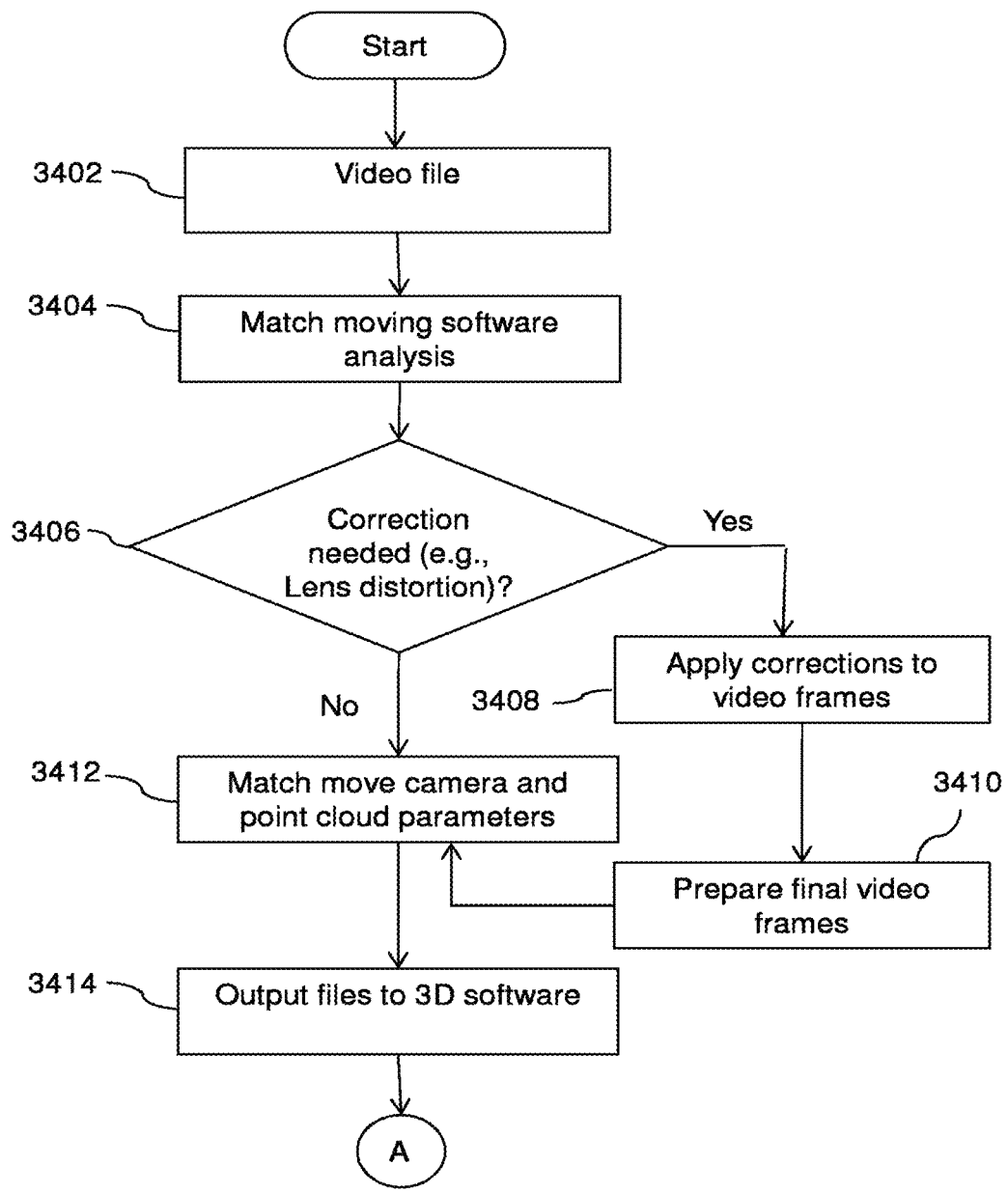
FIGS. 34A and 34B illustrate a method flow diagram used in an embodiment of the invention to extract the 3D movement coordinates of the video camera.
Figure 34B:
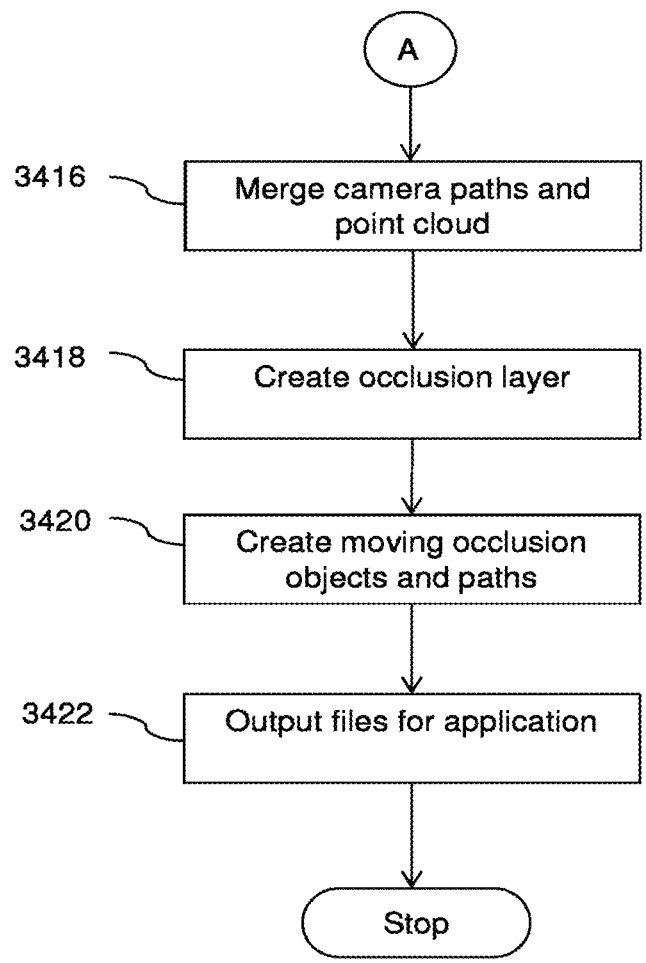

FIGS. 34A and 34B illustrate a method 3400 of visualizing synthetic objects within a real-world video file, according to another embodiment of the invention. At 3402, video file and synthetic object/objects may be provided. It may be possible that the video file may require some corrections related to a lens distortion, color information adjustments, and stabilization of the video to remove undesired shaking or other movement of the camera.

At 3404, an analysis may be performed for checking correction of the video images of the video file. In an embodiment of the invention, the analysis may be performed by a correction module (not shown in the FIGS.) stored in the memory 104.

At 3406, a determination for correction needed may be made, based on the analysis. In one embodiment, the correction may be needed for a lens distortion depending upon the lens used in the original video recording process, color information adjustments both for esthetic reasons, better estimation by the software of the camera movement, and stabilization of the video to remove undesired shaking or other movement of the camera. Those skilled in the art will appreciate that corrections to the video file may facilitate an efficient process of data extraction. In an embodiment of the invention, the determination may be made by the correction module.

At 3408, corrections may be applied to the video frames. The video file may be updated accordingly. In an embodiment of the invention, the corrections may be applied by the correction module At 3410, final video frames may be prepared. In an embodiment of the invention, the final video frames may be prepared by the correction module.

Next, the step 3412 (extracting camera information), step 3414 (outputting files to the developer module), step 3416 (merging camera movement coordinates and point cloud coordinates), step 3418 (creating occlusion layer), step 3420 (creating moving occlusion objects), and step 3422 (outputting files to the viewer module) may be performed to visualize the synthetic objects within the video file, as discussed in conjunction with description of FIGS. 33A and 33B.

Further, the method steps for FIGS. 33A, 33B, 34A and 34B are not restricted to above information as mentioned herein. The various embodiments and features that are explained in conjunction with FIGS. 1, 2, and 4 to 32 may be utilized by each of the methods as explained here above. Further, the invention is not limited to above-mentioned embodiments and examples and many other embodiments and examples may be implemented in light of the invention without departing from the scope of the invention.

Advantageously, the present disclosure provides a system and a method for visualizing synthetic objects within a real-world video clip. The system may be implemented independently for game and simulation of activities of any user. Moreover, the system may enable a plurality of users across the World Wide Web (WWW) to interact with each other while exercising, playing game or performing any other activity through the system. Additionally, the system may be utilized as a plug-in for various other machines such as an input sensor device that may detect various parameters related to activities of the user Further, embodiments of the present invention facilitate achieving fully convincing life-like photorealistic representations of the real world. Further, the present system facilitates overlaying objects or game characters into a real-life video and making them appear to be moving correctly within the same environment as is depicted in the video file. Furthermore, the present invention provides an external control of the objects or game characters, similar to video game-like control of the objects or game characters.

Further, the present invention facilitates utilization of a real-life video for making a simulation or video game, thereby saving lot of time and cost of designing and building the 3D environments for video games. Further, the present invention facilitates allowing a user to control the objects or game characters independently of the movement of the video Furthermore, the present invention facilitates leveraging modern technologies such as internet, video games, live online multiplayer gaming, performance data analysis and sharing through social networking websites, in fitness and health sector. Specifically, the present invention facilitates leveraging modern technologies to particular exercise on indoor cardio equipment such as treadmill, elliptical, cycle, rower etc.

Further, in case of a screen placed in front of machines along with some form of processor may host a software application (system application) with video games that may be triggered by the user's exercise motions, and one that interacts with other users live during the game or simulation, shares (sends and receives) information across social networks and online. The application may also store and analyze data about the users' performance and provide a graphical representation of the user's performance for motivating the user. Further, the user may be facilitated to post their performance's representation on social networks such as Facebook, LinkedIn, Twitter and the like.

Additionally, the present invention provides various other features to facilitate the users to perform various functionalities such as the users may select their avatars, may tag other users, receive and transmit activities feed and updates from social networks and so on. Further, various embodiments provided by the present disclosure may provide vista for users to explore various other new features. Also, a user may find other users (may be friends, relatives) through online interactions and can take part in common activities. Hence, the present invention motivating users to exercise more effectively, and enhancing entertainment while performing such fitness activities.

It may be appreciated by a person skilled in the art that the present invention is not limited to the above-mentioned embodiments. Further, various other embodiments may also be implemented through the features provided by the system. Also, the usage of terminology such as 'first user', 'second user' may not be considered a restrictive aspect of the present invention as such terminologies are used just for the purpose of better explanation. It may be appreciated by a person skilled in the art that the invention is not limited to the advantages as mentioned here above. Further many other advantages may be understood in light of the description given above without departing from the scope of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions that execute on the computers or other programmable data processing translators create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, minicomputers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of visualizing controllable virtual 3D objects within a real-world video clip using a transparent 3D scene generated using the real-world video clip, comprising:
    extracting point cloud coordinates information, camera movement coordinates information, and path coordinates information from the real-world video clip;
    translating the point cloud coordinates information into 3D coordinates;
    generating a 3D environment that comprises at least one controllable virtual 3D object and a 3D transparent scene including at least one transparent 3D occlusion object that replicates an object from the real-world video clip, wherein the at least one transparent 3D occlusion object is at least one of static and dynamic based on the real-world video clip and placed in the 3D environment according to the 3D coordinates;
    generating 3D space locations of the at least one transparent 3D occlusion object within the 3D environment based on depth information of the object that the at least one transparent 3D occlusion object replicates in the real-world video clip, wherein the depth information is obtained from the point cloud coordinates information, camera movement coordinates information, and path coordinates information;
    selecting frames from the real-world video clip to render as a background layer of the 3D environment based upon a speed input using a 3D game engine;
    moving the at least one controllable virtual 3D object within the 3D environment independently of the speed input using the 3D game engine; and
    rendering the 3D environment based upon 3D space locations of the at least one controllable virtual 3D object within the 3D environment and the 3D space locations of the at least one transparent 3D occlusion object in the 3D transparent scene using the 3D game engine so that portions of at least one controllable virtual 3D object that are located behind a transparent 3D occlusion object based on the 3D space locations are occluded by the background layer.

2. The method of claim 1, wherein moving the at least one controllable virtual 3D object within the 3D environment is partly based on information received from one or more devices located at different networked locations.

3. The method of claim 1 further comprising obtaining and displaying a browser layer overlaid on the background layer of the video clip, the browser layer used to render at least one of a menu control, image, or video file.

4. The method of claim 1 further comprising rendering a different real-world video within the background layer when a user changes a direction of a path in the real-world video.

5. The method of claim 1, wherein movement of the at least one controllable virtual 3D object within the 3D environment is guided by a path obtained from the real-world video.

6. The method of claim 1, wherein the at least one transparent 3D occlusion object is either statically positioned or dynamically moving within the 3D environment.

7. The method of claim 1, wherein the background layer is one of a plurality of layers of the video clip and the plurality of layers of the video clip are synched in the 3D environment.

8. The method of claim 1 further comprising providing one or more functionalities selected from the group consisting of point systems, characters, and sound effects for rendering within the 3D environment.

9. The method of claim 1 further comprising overlaying a map that provides a real-world location of the real-world video being rendered within the background layer and providing a location of the at least one controllable virtual 3D object within the map in real-time.

10. The method of claim 1, wherein the at least one controllable virtual 3D object is an avatar of a user, wherein the avatar moves based on activities of the user.

11. The method of claim 1 further comprising extracting object coordinates information from the real-world video clip that provides depth information used in rendering the 3D environment.

12. The method of claim 1 wherein the speed input causes the 3D game engine to select frames from the real-world video clip at a rate corresponding to a speed of movement through the scene captured by the real-world video clip.

13. The method of claim 12 further comprising maintaining a pitch of the sound in the real-world video clip when adjusting the rate at which frames are selected from the real-world video clip in response to a change in the speed input.

14. The method of claim 1 further comprising moving a controllable virtual 3D object to avoid hitting a transparent 3D occlusion object based on 3D space locations.

15. A system for of visualizing controllable virtual 3D objects within a real-world video clip using a transparent 3D scene generated using the real-world video clip, comprising:
    memory; and
    one or more processors configured by processor executable instructions stored in the memory to render the video clip, the one or more processors being further configured by the processor executable instructions to:
        extract point cloud coordinates information, camera movement coordinates information, and path coordinates information from the real-world video clip;
        translate the point cloud coordinates information into 3D coordinates;
        generate a 3D environment that comprises at least one controllable virtual 3D object and a 3D transparent scene including at least one transparent 3D occlusion object that replicates an object from the real-world video clip, wherein the at least one transparent 3D occlusion object is at least one of static and dynamic based on the real-world video clip and placed in the 3D environment according to the 3D coordinates;
        generate 3D space locations of the at least one transparent 3D occlusion object within the 3D environment based on depth information of the object that the at least one transparent 3D occlusion object replicates in the real-world video clip, wherein the depth information is obtained from the point cloud coordinates information, camera movement coordinates information, and path coordinates information;
select frames from the real-world video clip to render as a background layer of the 3D environment based upon a speed input using a 3D game engine;
move the at least one controllable virtual 3D object within the 3D environment independently of the speed input using the 3D game engine; and
render the 3D environment based upon 3D space locations of the at least one controllable virtual 3D object within the 3D environment and the 3D space locations of the at least one transparent 3D occlusion object in the 3D transparent scene using the 3D game engine so that portions of at least one controllable virtual 3D object that are located behind a transparent 3D occlusion object based on the 3D space locations are occluded by the background layer.

16. The system of claim 15, wherein moving the at least one controllable virtual 3D object within the 3D environment is partly based on information received from one or more devices located at different networked locations.

17. The system of claim 15, wherein the instructions when executed further configure the one or more processors to obtain and display an HTML browser layer overlaid on the background layer of the video clip, the HTML browser layer used to render at least one of a menu control, image, or video file.

18. The system of claim 15, wherein the instructions when executed further configure the one or more processors to render a different real-world video clip within the background layer when a user changes a direction of a path in the real-world video.

19. The system of claim 15, wherein movement of the at least one controllable virtual 3D object within the 3D environment is guided by a path obtained from the real-world video.

20. The method of claim 1 further comprising translating the camera movement coordinates information and the point cloud coordinates information into the 3D coordinates.

* * * * *